(12) United States Patent
Buma

(10) Patent No.: US 7,766,344 B2
(45) Date of Patent: Aug. 3, 2010

(54) DEVICE FOR CHANGING DISTANCE BETWEEN WHEEL AND VEHICLE BODY, AND SYSTEM INCLUDING THE DEVICE

(75) Inventor: Shuuichi Buma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 515 days.

(21) Appl. No.: 11/761,833

(22) Filed: Jun. 12, 2007

(65) Prior Publication Data

US 2007/0290473 A1    Dec. 20, 2007

(30) Foreign Application Priority Data

Jun. 14, 2006   (JP)   ............... 2006-164373

(51) Int. Cl.
*B60G 17/016* (2006.01)
*B60G 21/055* (2006.01)

(52) U.S. Cl. ............... 280/5.511; 280/5.5; 280/5.502; 280/5.506; 280/5.508; 280/5.51; 280/124.106; 280/124.107; 280/124.13; 280/124.149; 280/142.152

(58) Field of Classification Search ............ 280/5.5, 280/5.502, 5.506, 5.508, 5.51, 5.511, 124.106, 280/124.107, 124.13, 124.149, 124.152
See application file for complete search history.

(56) References Cited

U.S. PATENT DOCUMENTS

| | | | | |
|---|---|---|---|---|
| 4,132,431 A | * | 1/1979 | Von Der Ohe | ......... 280/124.166 |
| 4,146,249 A | * | 3/1979 | Paul | ...................... 280/124.15 |
| 4,249,753 A | * | 2/1981 | Froumajou | .................. 280/790 |
| 5,098,116 A | | 3/1992 | Edahiro et al. | |
| 6,354,607 B1 | * | 3/2002 | Kawashima et al. | ..... 280/5.511 |
| 6,357,543 B1 | * | 3/2002 | Karpik | ...................... 180/182 |
| 6,361,033 B1 | * | 3/2002 | Jones et al. | .................. 267/187 |
| 6,467,784 B1 | * | 10/2002 | Kim | ................... 280/124.106 |
| 6,830,256 B2 | * | 12/2004 | Bryant | ................ 280/124.106 |
| 7,005,816 B2 | * | 2/2006 | Hio et al. | ..................... 318/375 |

(Continued)

FOREIGN PATENT DOCUMENTS

FR    2 789 042 A1    8/2000

(Continued)

*Primary Examiner*—Toan C To
*Assistant Examiner*—Barry Gooden, Jr.
(74) *Attorney, Agent, or Firm*—Oblon, Spivak, McClelland, Maier & Neustadt, L.L.P.

(57) ABSTRACT

An adjuster device includes (a) a shaft held by a vehicle body; (b) an arm extending from the shaft in a direction intersecting an axial direction of the shaft; (c) an actuator causing one of rotation of the shaft and axial movement of the shaft in the axial direction; and (d) a motion converter converting the one of the rotation of the shaft and the axial movement of the shaft, into the other of the rotation of the shaft and the axial movement of the shaft. The arm is connected at a distal end portion thereof to one of at least one suspension arm, so as to enable the rotation of the shaft to cause change in a vertical distance between a wheel and the vehicle body. The shaft is connected to one of the at least one suspension arm or to an axle carrier, so as to enable the axial movement of the shaft to cause change in an alignment of the wheel. Also disclosed is an adjusting system including the adjuster device.

21 Claims, 34 Drawing Sheets

U.S. PATENT DOCUMENTS

| | | | |
|---|---|---|---|
| 7,134,672 B2* | 11/2006 | Beishline et al. | 280/5.502 |
| 7,270,335 B2* | 9/2007 | Hio et al. | 280/5.5 |
| 7,270,336 B2* | 9/2007 | Fujimori | 280/5.511 |
| 7,275,750 B2* | 10/2007 | Suchta et al. | 280/5.511 |
| 7,287,759 B2* | 10/2007 | Uchiyama et al. | 280/5.511 |
| 7,427,073 B2* | 9/2008 | Won | 280/5.507 |
| 7,530,586 B2* | 5/2009 | Tardy-Tuch et al. | 280/124.137 |
| 7,594,670 B2* | 9/2009 | Dundon | 280/124.152 |
| 2003/0122336 A1* | 7/2003 | Zadok | 280/124.106 |
| 2003/0184037 A1* | 10/2003 | Zadok | 280/124.106 |
| 2004/0007845 A1* | 1/2004 | Reineck | 280/124.107 |
| 2004/0140630 A1* | 7/2004 | Beishline et al. | 280/5.501 |
| 2004/0217569 A1* | 11/2004 | Gradu et al. | 280/124.107 |
| 2005/0067798 A1* | 3/2005 | Uchiyama et al. | 280/5.511 |
| 2005/0082781 A1* | 4/2005 | Germain et al. | 280/124.106 |
| 2005/0110228 A1* | 5/2005 | Fujimori | 280/5.511 |
| 2005/0253350 A1* | 11/2005 | Suchta et al. | 280/124.106 |
| 2006/0163832 A1* | 7/2006 | Tardy-Tuch et al. | 280/124.106 |
| 2006/0208448 A1* | 9/2006 | Dundon | 280/124.152 |
| 2006/0273539 A1* | 12/2006 | Barth et al. | 280/124.107 |
| 2007/0114732 A1* | 5/2007 | Dellacha | 280/5.52 |
| 2007/0176375 A1* | 8/2007 | Barth et al. | 280/5.5 |
| 2007/0262550 A1* | 11/2007 | Pavuk | 280/124.107 |
| 2008/0258412 A1* | 10/2008 | Kesselgruber | 280/5.506 |
| 2008/0277891 A1* | 11/2008 | Adams et al. | 280/124.106 |
| 2009/0008887 A1* | 1/2009 | Buma | 280/5.511 |
| 2009/0058020 A1* | 3/2009 | Ersoy et al. | 280/5.511 |
| 2009/0091094 A1* | 4/2009 | Sano | 280/5.511 |
| 2009/0273147 A1* | 11/2009 | Inoue et al. | 280/5.51 |

FOREIGN PATENT DOCUMENTS

| | | |
|---|---|---|
| JP | 63-103763 | 5/1988 |
| JP | 2001-63338 | 3/2001 |

* cited by examiner

FIG.30
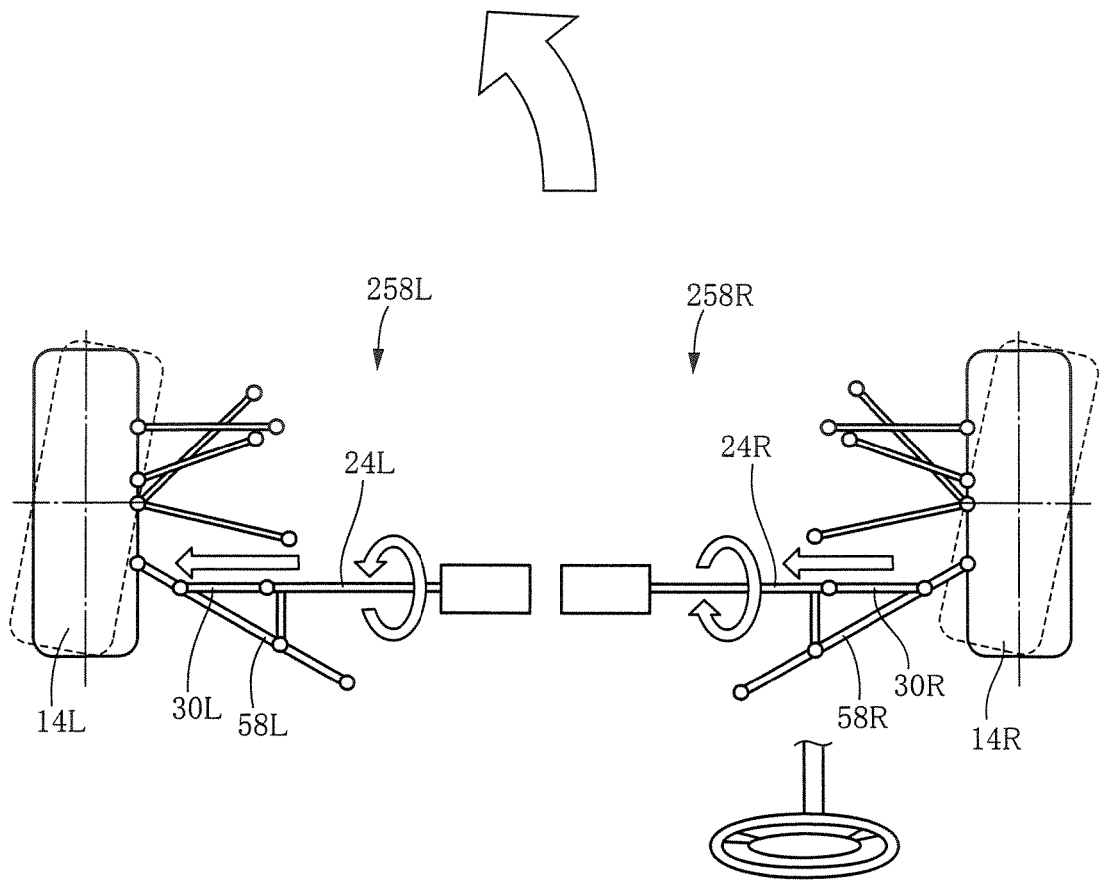
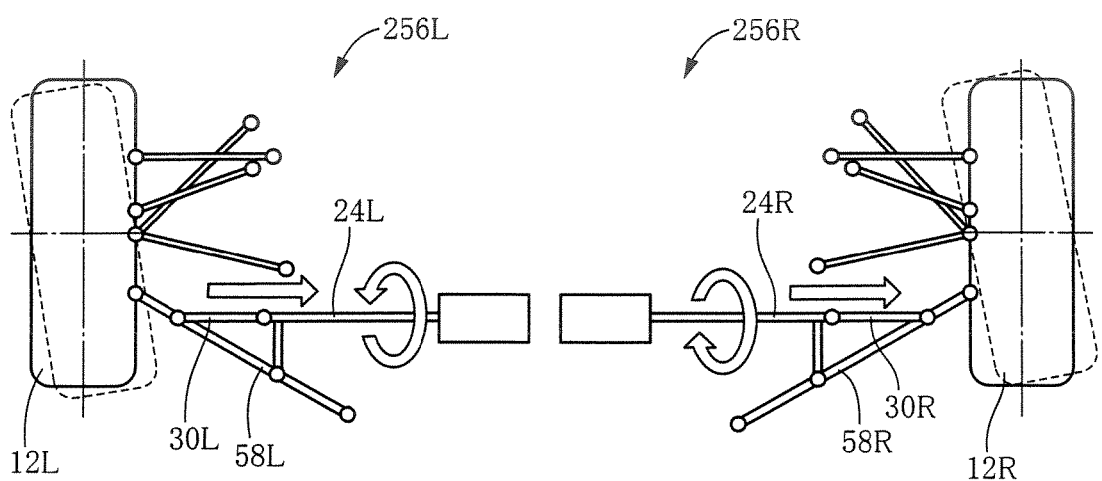

DEVICE FOR CHANGING DISTANCE BETWEEN WHEEL AND VEHICLE BODY, AND SYSTEM INCLUDING THE DEVICE

This application is based on Japanese Patent Application No. 2006-164373 filed on Jun. 14, 2006, the content of which is incorporated hereinto by reference.

BACKGROUND OF THE INVENTION

1. Field of the Invention

The present invention relates to an adjuster device for adjusting a distance between a wheel and a body of the vehicle, and also to an adjusting system including the adjuster device.

2. Discussion of Related Art

In recent years, there have been begun studies on a wheel-body distance adjusting system, as disclosed in JP-2001-63338A, which includes a pair of wheel-body distance adjuster devices that are provided for respective right and left wheels of a vehicle, wherein each of the wheel-body distance adjuster devices is capable of suitably adjusting a distance (hereinafter simply referred to as "wheel-body distance" where appropriate) between a corresponding one of the right and left wheels and a body of the vehicle. In this adjusting system, it is possible to restrain or reduce a roll of the vehicle body, by increasing the distance between one of the right and left wheels and the vehicle body while reducing the distance between the other of the right and left wheels and the vehicle body.

SUMMARY OF THE INVENTION

A suspension device, which is to be installed on the vehicle, is arranged to change a wheel alignment (such as a toe angle and a camber angle of the wheel) when the wheel-body distance is changed. In case of the use for a common vehicle, the suspension device is designed such that an understeer tendency of the vehicle is increased by the change in the wheel alignment and such that an amount of the increase of the understeer tendency is dependent on an amount of the change in the wheel alignment. There may be a case where the wheel-body distance adjusting system as disclosed in the above-identified Japanese Unexamined Patent Application Publication is used with the thus designed suspension device. In such a case, since the wheel-body distance adjusting system is capable of effectively reducing a roll of the vehicle body, namely, restraining change in the wheel-body distance, the change in the toe and camber angles of the wheel is somewhat restrained thereby possibly making it impossible to obtain a desired turning characteristic of the vehicle. This is merely one example of problems encountered in the conventional system. That is, in the wheel-body distance adjusting system and the wheel-body distance adjuster device as a component of the adjusting system, in which the problems are encountered, there is still room for improvement for increasing the utility.

The present invention was made in the light of the background art discussed above. It is therefore an object of the invention to provide a wheel-body distance adjuster device and a wheel-body distance adjusting system having a high serviceability in the practical use.

This object may be achieved according to the principle of this invention, which provides an adjuster device for a vehicle that has a suspension device including (i) an axle carrier rotatably holding a wheel of the vehicle and (ii) at least one suspension arm interconnecting the axle carrier and a body of the vehicle, the adjuster device including: (a) a shaft held by the body of the vehicle, so as to be rotatable about an axis thereof relative to the body of the vehicle and movable in an axial direction thereof relative to the body of the vehicle; (b) an arm connected at a proximal end portion thereof to the shaft, unrotatably about the axis of the shaft relative to the shaft, and extending from the shaft in a direction intersecting the axial direction of the shaft; (c) an actuator causing one of rotation of the shaft about the axis and axial movement of the shaft in the axial direction; and (d) a motion converter converting the one of the rotation of the shaft and the axial movement of the shaft, into the other of the rotation of the shaft and the axial movement of the shaft, wherein the arm is connected at a distal end portion thereof to one of the at least one suspension arm, so as to enable the rotation of the shaft to cause change in a vertical distance between the wheel and the body of the vehicle, and wherein the shaft is connected to one of the at least one suspension arm or to the axle carrier, so as to enable the axial movement of the shaft to cause change in an alignment of the wheel. The principle of the invention also provides an adjusting system including: a pair of right-side and left-side adjuster devices each provided by the above-described adjuster device; and a controller controlling the pair of right-side and left-side adjuster devices.

In the adjuster device according to the present invention, the vertical distance between the wheel and the body of the vehicle, i.e., the wheel-body distance can be increased and reduced, and the wheel alignment can be changed according to an amount of the change in the wheel-body distance. It is therefore possible to adjust running characteristics of the vehicle, by suitably changing the wheel-body distance and the wheel alignment. Further, in the adjusting system including the pair of adjuster devices each provided by the above-described adjuster device, the pair of adjuster devices are provided for the respective right and left wheels of the vehicle, and are controlled for making it possible to control not only attitude of the vehicle body and height of the vehicle but also the running characteristics of the vehicle such as turning characteristic and straight-running stability.

VARIOUS MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) An adjuster device for a vehicle that has a suspension device including (i) an axle carrier rotatably holding a wheel of the vehicle and (ii) at least one suspension arm interconnecting the axle carrier and a body of the vehicle, the adjuster device including: (a) a shaft held by the body of the vehicle, so as to be rotatable about an axis thereof relative to the body of the vehicle and movable in an axial direction thereof relative to the body of the vehicle; (b) an arm connected at a proximal end portion thereof to the shaft, unrotatably about the axis of the shaft relative to the shaft, and extending from the shaft in a direction intersecting the axial direction of the shaft; (c) an actuator causing one of rotation of the shaft about the axis and axial movement of the shaft in the axial direction; and (d) a motion converter converting the one of the rotation of the shaft and the axial movement of the shaft, into the other of the rotation of the shaft and the axial movement of the shaft, wherein the arm is connected at a distal end portion thereof to one of the at least one suspension arm, so as to enable the rotation of the shaft to cause change in a vertical distance between the wheel and the body of the vehicle, and wherein the shaft is connected to one of the at least one suspension arm or to the axle carrier, so as to enable the axial movement of the shaft to cause change in an alignment of the wheel.

In the present adjuster device, when the arm is rotated about the axis of the shaft together with rotation of the shaft about the axis, the above-described one of the at least one suspension arm (to which the arm is directly or indirectly connected at its distal end portion) is vertically moved so as to change the vertical distance between the wheel and the body of the vehicle. In other words, a rotational force forcing the shaft to be rotated about its axis acts as a force forcing the above-described one of the at least one suspension arm to be pivoted vertically, whereby the vertical distance between the wheel and the body of the vehicle is selectively increased and reduced. Where four adjuster devices each provided by the present adjuster device are disposed for respective four wheels of the vehicle so as to adjust respective vertical distances each of which is between a corresponding one of the four wheels and the vehicle body, it is possible to restrain or reduce change of attitude of the vehicle body that could be caused by an external force acting on the vehicle, for example, in the event of a roll or pitch of the vehicle body. Further, in addition to the reduction in change of attitude of the vehicle body, it is also possible to adjust a height of the vehicle.

In the present adjuster device, not only the vertical distance (hereinafter refereed to as "wheel-body distance", where appropriate) between the wheel and the vehicle body but also an alignment of the wheel can be changed. Described in detail, the shaft is axially moved together with rotation of the shaft that causes change in the wheel-body distance. Since the shaft is connected to one of the at least one suspension arm or the axle carrier, the axial movement of the shaft causes the wheel to be tilted or inclined, namely, the axial movement of the shaft causes the alignment of the wheel to be changed, owing to compliance of the suspending device. Each of the rotation of the shaft and the axial movement of the shaft may be caused either directly by the actuator or indirectly by the actuator through the motion converter. Where the actuator is arranged to cause the rotation of the shaft, the motion converter is arranged to convert the rotation of the shaft into the axial movement of the shaft. In this arrangement, the rotation of the shaft is caused directly by the actuator while the axial movement of the shaft is caused by the actuator through the motion converter. Where the actuator is arranged to cause the axial movement of the shaft, the motion converter is arranged to convert the axial movement of the shaft into the rotation of the shaft. In this arrangement, the rotation of the shaft is caused by the actuator through the motion converter while the axial movement of the shaft is caused directly by the actuator. In either of these arrangements, an axial force as well as the above-described rotational force is applied to the shaft, and the axial force forcing the shaft to be moved in its axial direction acts as a force forcing the wheel to be tilted or inclined, whereby the wheel alignment is changed.

The term "wheel alignment" indicates a geometrical relationship between the wheel and the body of the vehicle, and can be represented by various angles such as a toe angle, a camber angle, a caster angle and a kingpin angle of the wheel. Since the running characteristics of the vehicle are considerably influenced by the wheel alignment, it is possible to change cornering or turning characteristic and straight-running characteristic of the vehicle, by changing the angles such as the toe and camber angles, as described below. In the present adjuster device, therefore, by selectively increasing and reducing the wheel-body distance, the wheel alignment as well as the attitude of the vehicle body and the height of the vehicle can be suitably changed by a degree that corresponds to an amount of the change in the wheel-body distance, thereby making it possible to adjust the running characteristics of the vehicle.

The "motion converter" defined in this mode (1) is not limited to any particular motion converter. However, the motion converter is preferably provided by a screw mechanism as described below, for example. The motion converter may be constructed such that a ratio of an amount of the axial movement of the shaft to an amount of the rotation of the shaft is set according to a desired ratio of an amount (degree) of change in the wheel alignment to an amount of change in the wheel-body distance.

The "shaft" may be provided by either a shaft having a high degree of stiffness so as to be little twistable or a shaft having a low degree of stiffness so as to serves as a torsion bar. Where the shaft serving as a torsion bar is employed as the shaft, it is possible to somewhat alleviate a shock which is applied to the adjuster device (more precisely, applied to the actuator) and which is generated when the wheel-body distance is changed due to an external force applied to the vehicle, since the applied shock can be absorbed by torsion of the shaft serving as the torsion bar. The "arm" may be provided by either a member that is formed integrally with the shaft or a member that is formed independently of the shaft and connected to the shaft.

The "actuator" is not limited to any particular actuator, as long as it is capable of causing the above-described one of the rotation and axial movement of the shaft. For example, the actuator may be provided by a cylinder-type actuator that is operable by a pressurized working fluid such as working oil, or an electrically operated actuator that is operable by driving of an electric motor. Where the electrically operated actuator is employed as the actuator, the electric motor may be either a rotational motor or a linear motor.

Where the preset adjuster device is provided for a front wheel as a steered wheel, the "axle carrier" may be provided by a steering knuckle. Where the shaft is connected to one of the at least one suspension arm, the one of the at least one suspension arm to which the shaft is connected may be either the same to or different from one of the at least one suspension arm to which the arm is connected.

(2) The adjuster device according to mode (1), wherein the actuator causes the rotation of the shaft, and includes (d-1) a housing held by the body of the vehicle, (d-2) a motor held by the housing, and (d-3) a speed reducer held by the housing and reducing a speed of rotation of the motor while transmitting the rotation of the motor to the shaft.

In this mode (2), the speed reducer included in the actuator is not limited to any particular speed reducer, and may be constituted by any one of various speed reducers such as a harmonic gear set (that is also called "harmonic drive" or "strain wave gearing") and a planetary gear set. For enabling the motor to be made compact in size, it is preferable that the speed reducer has a relatively high speed ratio (relatively high reduction ratio), i.e., a relatively high ratio of an operation amount of the motor to an operation amount of the actuator. In view of this, it is preferable that the speed reducer is constituted by the harmonic gear set in the adjuster device of this mode (2). It is noted that the shaft may be held by the vehicle body through an arrangement in which the shaft is held by the housing of the actuator such that the shaft is rotatable and axially movable relative to the housing of the actuator.

(3) The adjuster device according to mode (1) or (2), wherein the motion converter includes an external thread and an internal thread that are held in engagement with each other, and wherein the external thread is provided by one of a first threaded portion that is included in the shaft and a second threaded portion that is unmovable and unrotatable relative to the body of the vehicle, while the internal thread is provided by the other of the first threaded portion and the second threaded portion.

In this mode (3) in which a screw mechanism is employed in the motion converter, the above-described one of the rotation and axial movement of the shaft can be converted into the above-described other of the rotation and axial movement of the shaft. Further, a direction of the axial movement of the shaft during the rotation of the shaft in a predetermined direction can be dependent on which one of a right-hand screw and a left-hand screw provides each of the first and second threaded portions. The suitable ratio of the amount (degree) of change in the wheel alignment to the amount of change in the wheel-body distance can be established by suitably determining a lead (pitch) of the external and internal threads that are provided by one and the other of the first and second threaded portions. It is preferable that the screw mechanism is provided by a ball screw mechanism, for minimizing a friction generated between the external and internal threads during operation of the screw mechanism.

(4) The adjuster device according to any one of modes (1)-(3), wherein the motion converter converts the one of the rotation of the shaft in a roll reducing direction and the axial movement of the shaft in a understeer-tendency increasing direction, into the other of the rotation of the shaft in the roll reducing direction and the axial movement of the shaft in the understeer-tendency increasing direction, wherein the vertical distance between the wheel and the body of the vehicle is changed such that a roll of the body of the vehicle is reduced, by the rotation of the shaft in the roll reducing direction, and wherein the alignment of the wheel is changed such that an understeer tendency of the vehicle is increased, by the axial movement of the shaft in the understeer-tendency increasing direction.

During turning of the vehicle, a roll of the vehicle body is caused by a roll moment acting on the vehicle body. That is, during turning of the vehicle during which one of right and left wheels as an inside wheel is positioned between a center of the turning of the vehicle and the other of the right and left wheels as an outside wheel, the vertical distance between the inside wheel and the vehicle body is increased while the vertical distance between the outside wheel and the vehicle body is reduced. The adjuster device is arranged to reduce the vertical distance between the corresponding wheel and the vehicle body when the corresponding wheel is the inside wheel, and to increase the vertical distance between the corresponding wheel and the vehicle body when the corresponding wheel is the outside wheel, so as to restrain change in the wheel-body distance during turning of the vehicle. The adjuster device of this mode (4) is constructed such that, when the shaft is rotated in the roll reducing direction causing the wheel-body distance to be changed in a manner that reduces the roll of the vehicle body, the shaft is axially moved in the understeer-tendency increasing direction causing the alignment of the wheel to be changed in a manner that increases the understeer tendency of the vehicle. Therefore, the adjuster device of this mode (4) is capable of restraining change in the wheel-body distance during turning of the vehicle, without failing to assure a desired degree of the understeer tendency. It is noted that the term "increase in the understeer tendency" should be interpreted to encompass also transition from an oversteer tendency to the understeer tendency and reduction in the oversteer tendency.

(5) The adjuster device according to any one of modes (1)-(4), provided for a front wheel as the wheel of the vehicle, so as to change the vertical distance between the front wheel and the body of the vehicle and the alignment of the front wheel, wherein the motion converter converts the one of the rotation of the shaft in a vertical-distance increasing direction and the axial movement of the shaft in a first direction, into the other of the rotation of the shaft in the vertical-distance increasing direction and the axial movement of the shaft in the first direction, and to convert the one of the rotation of the shaft in a vertical-distance reducing direction and the axial movement of the shaft in a second direction, into the other of the rotation of the shaft in the vertical-distance reducing direction and the axial movement of the shaft in the second direction, wherein the vertical distance is increased by the rotation of the shaft in the vertical-distance increasing direction, and is reduced by the rotation of the shaft in the vertical-distance reducing direction, wherein at least one of a toe angle and a camber angle of the front wheel as the alignment of the wheel is changed by the axial movement of the shaft in the first direction, such that front and rear portions of the front wheel are displaced outwardly and inwardly in a lateral direction of the vehicle, respectively, where the toe angle is changed, and such that upper and lower portions of the front wheel are displaced outwardly and inwardly in the lateral direction, respectively, where the camber angle is changed, and wherein at least one of the toe angle and the camber angle of the front wheel as the alignment of the wheel is changed by the axial movement of the shaft in the second direction, such that the front and rear portions of the front wheel are displaced inwardly and outwardly in the lateral direction of the vehicle, respectively, where the toe angle is changed, and such that the upper and lower portions of the front wheel are displaced inwardly and outwardly in the lateral direction, respectively, where the camber angle is changed.

(6) The adjuster device according to any one of modes (1)-(4), provided for a rear wheel as the wheel of the vehicle, so as to change the vertical distance between the rear wheel and the body of the vehicle and the alignment of the rear wheel, wherein the motion converter converts the one of the rotation of the shaft in a vertical-distance increasing direction and the axial movement of the shaft in a first direction, into the other of the rotation of the shaft in the vertical-distance increasing direction and the axial movement of the shaft in the first direction, and to convert the one of the rotation of the shaft in a vertical-distance reducing direction and the axial movement of the shaft in a second direction, into the other of the rotation of the shaft in the vertical-distance reducing direction and the axial movement of the shaft in the second direction, wherein the vertical distance is increased by the rotation of the shaft in the vertical-distance increasing direction, and is reduced by the rotation of the shaft in the vertical-distance reducing direction, wherein at least one of a toe angle and a camber angle of the front wheel as the alignment of the wheel is changed by the axial movement of the shaft in the first direction, such that front and rear portions of the front wheel are displaced inwardly and outwardly in a lateral direction of the vehicle, respectively, where the toe angle is changed, and such that upper and lower portions of the front wheel are displaced inwardly and outwardly in the lateral direction, respectively, where the camber angle is changed, and wherein at least one of the toe angle and the camber angle of the front wheel as the alignment of the wheel is changed by the axial movement of the shaft in the second direction, such that the front and rear portions of the front wheel are displaced outwardly and inwardly in the lateral direction of the vehicle, respectively, where the toe angle is changed, and such that the upper and lower portions of the front wheel are displaced outwardly and inwardly in the lateral direction, respectively, where the camber angle is changed.

In each of the adjuster device of the mode (5) provided for the front wheel and the adjuster device of the mode (6) provided for the rear wheel, the toe angle or the camber angle of the wheel is changed in a manner specifically described above, which reduces a roll of the vehicle body caused by turning of the vehicle and increases the understeer tendency of the vehicle during the turning of the vehicle.

(7) An adjusting system including: a pair of right-side and left-side adjuster devices each provided by the adjuster device defined in mode (1); and a controller controlling the pair of right-side and left-side adjuster devices, wherein the right-side adjuster device is provided for a right wheel as the wheel of the vehicle, so as to change the vertical distance between the right wheel and the body of the vehicle and the alignment of the right wheel, wherein the left-side adjuster device is provided for a left wheel as the wheel of the vehicle, so as to change the vertical distance between the left wheel and the body of the vehicle and the alignment of the left wheel, and wherein the controller controls the actuator of each of the pair of right-side and left-side adjuster devices, for thereby changing the vertical distance between the right wheel and the body, the alignment of the right wheel, the vertical distance between the left wheel and the body and the alignment of the left wheel.

In the present adjusting system including the pair of right-side and left-side adjuster devices each provided by the adjuster device defined in the above-described mode (1), it is possible to increase and reduce one and the other of the vertical distance between the right wheel and the vehicle body and the vertical distance between the left wheel and the vehicle body, respectively, and also to increase or reduce both of the vertical distance between the right wheel and the vehicle body and the vertical distance between the left wheel and the vehicle body. In other words, the right-side and left-side adjuster devices can be controlled such that positions of the right and left wheels relative to the vehicle body are displaced in respective directions that are same or opposite to each other. Therefore, the present adjusting system makes it possible to control attitude of the vehicle body and height of the vehicle, and also to change the wheel alignment so as to adjust the running characteristics of the vehicle.

(8) The adjusting system according to mode (7), being capable of executing a roll reduction control for reducing a roll of the body of the vehicle, during turning of the vehicle during which one of the right and left wheels as an inside wheel is positioned between a center of the turning of the vehicle and the other of the right and left wheels as an outside wheel, wherein the pair of right-side and left-side adjuster devices are controlled by the controller, during execution of the roll reduction control, such that the vertical distance between the inside wheel and the body of the vehicle is restrained from being increased and such that the vertical distance between the outside wheel and the body of the vehicle is restrained from being reduced.

The adjuster system of this mode (8) is capable of functioning as a stabilizer system arranged to exhibit a roll reduction effect that is variable depending on a running state of the vehicle. During turning of the vehicle, one and the other of the vertical distance between the right wheel and the vehicle body and the vertical distance between the left wheel and the vehicle body are suitably increased and reduced, respectively, thereby making it possible to suitably reduce a roll of the vehicle body and adjust turning characteristic of the vehicle.

(9) The adjusting system according to mode (8), wherein the motion converter of each of the pair of right-side and left-side adjuster devices converts, during execution of the roll reduction control, the one of the rotation of the shaft of the each of the adjuster devices in a roll reducing direction and the axial movement of the shaft of the each of the adjuster devices in a understeer-tendency increasing direction, into the other of the rotation in the roll reducing direction and the axial movement in the understeer-tendency increasing direction, wherein the vertical distance between the right wheel and the body of the vehicle and the vertical distance between the left wheel and the body of the vehicle are changed such that the roll of the body of the vehicle is reduced, by the rotation of the shaft of each of the adjuster devices in the roll reducing direction, and wherein the alignment of the right wheel and the alignment of the left wheel are changed such that an understeer tendency of the vehicle is increased, by the axial movement of the shaft of each of the adjuster devices in the understeer-tendency increasing direction.

In the adjusting system, each of the adjuster devices is controlled such that, when the shaft is rotated in the roll reducing direction causing the wheel-body distance to be changed in a manner that reduces the roll of the vehicle body, the shaft is axially moved in the understeer-tendency increasing direction causing the alignment of the wheel to be changed in a manner that increases the understeer tendency of the vehicle. Therefore, the adjusting system of this mode (9) is capable of reducing the roll of the vehicle body during turning of the vehicle, without failing to assure a desired degree of the understeer tendency.

(10) The adjusting system according to mode (8) or (9), being capable of executing a vehicle-height adjustment control for adjusting a height of the vehicle, wherein the controller controls, during execution of the vehicle-height adjustment control, the pair of right-side and left-side adjuster devices such that the vertical distance between the right wheel and the body of the vehicle and the vertical distance between the left wheel and the body of the vehicle are both selectively increased and reduced.

In the adjusting system of this mode (10), the vertical distance between the right wheel and the body of the vehicle and the vertical distance between the left wheel and the body of the vehicle are changed to be both increased or reduced, thereby making it possible to adjust, for example, change in height of the vehicle and running characteristics of the vehicle. Specifically described, where each of the right-side and left-side adjuster devices is constructed to displace the front and rear portions of the corresponding wheel inwardly and outwardly, respectively, in the lateral direction of the vehicle or to displace the upper and lower portions of the corresponding wheel inwardly and outwardly, respectively, in the lateral direction of the vehicle, while increasing the distance between the corresponding wheel and the vehicle body, it is possible to increase straight running stability of the vehicle while increasing both of the distance between the right wheel and the vehicle body and the vertical distance between the left wheel and the vehicle body. The adjusting system equipped with the thus constructed right-side and left-side adjuster devices is advantageously incorporated in a vehicle that is arranged to automatically adjust change in the vehicle height caused by change in weight of luggage loaded on the vehicle and weight of passenger riding on the vehicle. It is noted that the "vehicle-height adjustment control" may be executed for adjusting a height of only one of a front-wheel side portion and a rear-wheel side portion of the vehicle in which the right-side and left-side adjuster devices are provided, or alternatively, executed for adjusting a height of an entirety of the vehicle that includes not only the one of the front-wheel and rear-wheel side portions but also the other of the front-wheel and rear-wheel side portions.

(11) The adjusting system according to any one of modes (8)-(10), further including a second adjuster device in addition to first adjuster devices as the right-side and left-side adjuster devices, wherein the first adjuster devices are provided for respective rear right and left wheels of the vehicle, so as to change the vertical distance between the rear right wheel and the body of the vehicle, the vertical distance between the rear left wheel and the body of the vehicle and the alignments of the rear right and left wheels, wherein the second adjuster device is provided for front right and left wheels of the vehicle, so as to change a front-right vertical distance as the vertical distance between the front right wheel and the body of the vehicle and a front-left vertical distance as the vertical distance between the front left wheel and the body of the vehicle, such that one of the front-right vertical distance and the front-left vertical distance is increased while the other of the front-right vertical distance and the front-left vertical distance is reduced, and wherein the controller controls, during execution of the roll reduction control, the second adjuster device such that the vertical distance between one of the front right and left wheels as the inside wheel and the body of the vehicle is restrained from being increased and such that the vertical distance between the other of the front right and left wheels as the outside wheel and the body of the vehicle is restrained from being reduced.

In the adjusting system of this mode (11), the pair of first adjuster devices are provided for the respective rear right and left wheels of the vehicle, while the second adjuster device is provided for the front right and left wheels of the vehicle so as to exhibit a roll reduction effect that is variable depending on a running state of the vehicle. In this adjusting system, while a roll of the vehicle body is suitably reduced, the alignment of each of the rear right and left wheels is changed for making it possible to adjust the turning characteristic of the vehicle. Since each of the rear wheels is not steered by a steering operation while each of the front wheels is steered by the steering operation, it is possible to effectively adjust the turning characteristics, by changing the alignment of each of the rear wheels as in this adjusting system.

(12) The adjusting system according to mode (11), wherein the motion converter of each of the first adjuster devices converts, during execution of the roll reduction control, the one of the rotation of the shaft of the each of the first adjuster devices in a roll reducing direction and the axial movement of the shaft of the each of the first adjuster devices in a understeer-tendency increasing direction, into the other of the rotation in the roll reducing direction and the axial movement in the understeer-tendency increasing direction, wherein the vertical distance between the rear right wheel and the body of the vehicle and the vertical distance between the rear left wheel and the body of the vehicle are changed such that the roll of the body of the vehicle is reduced, by the rotation of the shaft of each of the first adjuster devices in the roll reducing direction, and wherein the alignment of the rear right wheel and the alignment of the rear left wheel are changed such that an understeer tendency of the vehicle is increased, by the axial movement of the shaft of each of the first adjuster devices in the understeer-tendency increasing direction, the adjusting system being capable of executing a turning assist control for assisting turning of the vehicle, during the turning of the vehicle during which one of the front right and left wheels as a front inside wheel is positioned between the center of the turning of the vehicle and the other of the front right and left wheels as a front outside wheel, wherein the first adjuster devices are controlled by the controller during execution of the turning assist control, to axially move the shaft of each of the first adjuster devices in an oversteer-tendency increasing direction that is opposite to the understeer-tendency increasing direction, whereby the alignment of the rear right wheel and the alignment of the rear left wheel are changed such that an oversteer tendency of the vehicle is increased, and wherein the second adjuster device is controlled by the controller during the execution of the turning assist control, to reduce the vertical distance between the front inside wheel and the body of the vehicle and to increase the vertical distance between the front outside wheel and the body of the vehicle, for reducing the roll of the body of the vehicle that is increased by the first adjuster devices during the execution of the turning assist control.

The adjusting system of this mode (12) is constructed for the purpose of reducing a turning radius of the vehicle, by increasing the oversteer tendency during turning of the vehicle. Therefore, the vehicle provided with this adjusting system is capable of turning with a reduced turning radius, without provision of 4WS (four wheel steering system) or other system exclusively serving to reduce the turning radius. It is noted that the term "increase in the oversteer tendency" should be interpreted to encompass also transition from the understeer tendency to the oversteer tendency and reduction in the understeer tendency.

In this adjusting system, during execution of the turning assist control, the shaft of each of the pair of first adjuster devices (provided for the respective rear wheels) is rotated in a direction opposite to the above-described roll reducing direction. Specifically described, the pair of first adjuster devices are controlled to increase the vertical distance between one of the rear right and left wheels as the rear inside wheel and the vehicle body and to reduce the vertical distance between the other of the rear right and left wheels as the rear outside wheel and the vehicle body. That is, during execution of the turning assist control, the roll of the vehicle body is caused or increased by the first adjuster devices. However, in this adjusting system, the second adjuster device (provided for the front wheels) is controlled to reduce the roll of the vehicle body that is caused or increased by the first adjuster devices that are controlled as described above. For example, in anticipation of occurrence or increase of the roll of the vehicle body due to the oversteer tendency that is increased by the first adjuster device, it is possible to reduce the vertical distance between one of the front right and left wheels as the front inside wheel and the vehicle body and to increase the vertical distance between the other of the front right and left wheels as the front outside wheel and the vehicle body, so as to effectively reduce the roll of the vehicle body, with utilization of torsion stiffness of the vehicle body itself. It is noted that the turning assist control and the above-described roll reduction control can be executed either selectively or together with each other.

(13) The adjusting system according to mode (12), wherein the controller causes the turning assist control to be executed based on at least one of a running speed of the vehicle and an operating amount of a steering operating member.

In the adjusting system of this mode (13), the turning radius of the vehicle can be reduced, for example, by taking account of a state of turning of the vehicle, thereby making it possible to suitably adjust the turning characteristic of the vehicle. Specifically described, the turning assist control may be executed when the running speed of the vehicle is low, as described below. Further, the turning assist control may be executed when the operating amount of the steering operating member is large.

(14) The adjusting system according to mode (12) or (13), wherein the controller allows the turning assist control to be executed only when the running speed of the vehicle is lower than a lower threshold value.

The adjusting system of this mode (14) is capable of reducing the turning radius during turning of the vehicle at a low running speed of the vehicle, while assuring stability of the vehicle during running at a high speed.

(15) The adjusting system according to any one of modes (12)-(14), wherein the controller controls the first adjuster devices such that each of the alignment of the rear right wheel and the alignment of the rear left wheel is changed by a degree that is dependent on at least one of a running speed of the vehicle and an operating amount of a steering operating member, during the execution of the turning assist control.

In the adjusting system of this mode (15), a degree of the oversteer tendency can be increased, for example, by taking account of a state of turning of the vehicle. Specifically described, the wheel alignment may be changed by a degree that corresponds to an amount of increase in the operating amount of the steering operating member, so that the oversteer tendency is increased by a degree that corresponds to the amount of increase in the operating amount of the steering operating member. Further, the wheel alignment may be changed by a degree that corresponds to an amount of reduction in the vehicle running speed, so that the oversteer tendency is increased by a degree that corresponds to the amount of reduction in the vehicle running speed.

(16) The adjusting system according to mode (15), wherein the controller controls the first adjuster devices such that each of the alignment of the rear right wheel and the alignment of the rear left wheel is changed by a degree that corresponds to an amount of increase in the operating amount of the steering operating member.

The adjusting system of this mode (16) is constructed to establish a turning performance of the vehicle satisfying demand of a vehicle operator who is likely to desire to reduce the turning radius of the vehicle when the operating angle or amount of the steering operating member (e.g., steering wheel) is large.

(17) The adjusting system according to any one of modes (11)-(16), wherein the second adjuster device includes: a stabilizer bar that is connected at respective opposite end portions to one of the at least one suspension arm of a front right suspension device as the suspension device that is provided for the front right wheel and to one of the at least one suspension arm of a front left suspension device as the suspension device that is provided for the front left wheel; and a stabilizer actuator changes stiffness of the stabilizer bar against roll of the body of the vehicle.

(18) The adjusting system according to mode (17), wherein the stabilizer bar is provided by a pair of stabilizer bar members, wherein the stabilizer bar members include: respective torsion bar portions each of which extends in a lateral direction of the vehicle; and respective arm portions each of which extends in a direction intersecting a corresponding one of the torsion bar portions, from the corresponding torsion bar portion, to be connected to the one of the at least one suspension arm of a corresponding one of the front right and left suspension devices, and wherein the stabilizer actuator rotates the torsion bar portions of the respective stabilizer bar members relative to each other, so as to change the stiffness of the stabilizer bar against the roll of the body of the vehicle.

(19) The adjusting system according to mode (18), wherein the stabilizer actuator of the second adjuster device includes: a housing; a motor held by the housing; and a speed reducer held by the housing and reducing a speed of rotation of the motor while transmitting the rotation of the motor to one of the torsion bar portions of the pair of stabilizer bar members via an output portion of the speed reducer, wherein the other of the torsion bar portions is connected to the housing, unrotatably relative to the housing, and wherein the one of the torsion bar portions is connected to the output portion of the speed reducer, unrotatably relative to the output portion.

In each of the adjusting systems of the modes (17)-(19), the second adjuster device is provided by a stabilizer device arranged to exhibit a roll reduction effect that is variable depending on a running state of the vehicle, namely, is provided by a device equipped with the single actuator by which the vertical distance between the front right wheel and the vehicle body and the vertical distance between the front left wheel and the vehicle body are changed relative to each other. The roll of the vehicle body during turning of the vehicle can be effectively reduced by any one of the adjusting systems of the modes (17)-(19).

(20) The adjusting system according to any one of modes (11)-(16), wherein the second adjuster device includes a pair of right-side and left-side units that are provided for the front right and left wheels, respectively, so as to change the front-right vertical distance and the front-left vertical distance, respectively, wherein the right-side and left-side units include: ($\alpha$) respective shafts each of which is held by the body of the vehicle, so as to be rotatable about an axis thereof relative to the body of the vehicle; ($\beta$) respective arms each of which is connected at a proximal end portion thereof to a corresponding one of the shafts, unrotatably about the axis of the corresponding one of the shafts relative to the corresponding shaft, and extending from the corresponding shaft in a direction intersecting the axial direction of the corresponding shaft; and ($\gamma$) respective actuators each of which causes rotation of the corresponding shaft about the axis, and wherein the actuators are controlled by the controller such that the one of the front-right vertical distance and the front-left vertical distance is increased while the other of the front-right vertical distance and the front-left vertical distance is reduced.

(21) The adjusting system according to mode (20), wherein each of the actuators includes ($\gamma$-1) a housing held by the body of the vehicle, ($\gamma$-2) a motor held by the housing, and ($\gamma$-3) a speed reducer held by the housing and reducing a speed of rotation of the motor while transmitting the rotation of the motor to a corresponding one of the shafts.

In each of the adjusting systems of the modes (20) and (21), the second adjuster device includes the pair of right-side and left-side units which are provided for the front right and left wheels, respectively, and which are capable of adjusting the distance between the front right wheel and the vehicle body and the distance between the front left wheel and the vehicle body, independently of each other. The right-side and left-side units are operable, under control of the controller, in cooperation with each other. The roll of the vehicle body during turning of the vehicle can be effectively reduced by either one of the adjusting systems of the modes (20) and (21). It is noted that, in each of the adjusting systems of the modes (20) and (21) in which the four vertical distances from the respective four wheels to the vehicle body can be controlled independently of each other, the pair of first adjuster devices and the pair of right-side and left-side units of the second adjuster device can be controlled in a manner that reduces a pitch of the vehicle body and also in a manner that increases or reduces all the four wheels so as to change the height of the vehicle.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 30 is a view showing directions of the rotational and axial forces applied to the shaft of each of the wheel-body distance adjuster devices and also a direction of change in a toe angle of each wheel when a roll reduction control is executed during left turn of the vehicle;

DETAILED DESCRIPTION OF THE PREFERRED EMBODIMENTS

There will be described embodiments of the present invention, by reference to the accompanying drawings. It is to be understood that the present invention is not limited to the following embodiments, and may be otherwise embodied with various changes and modifications, such as those described in the foregoing "VARIOUS MODES OF THE INVENTION", which may occur to those skilled in the art.

(A) First Embodiment

[Construction of Wheel-Body Distance Adjusting System]

(i) Overall Construction of the System

Figure 1:
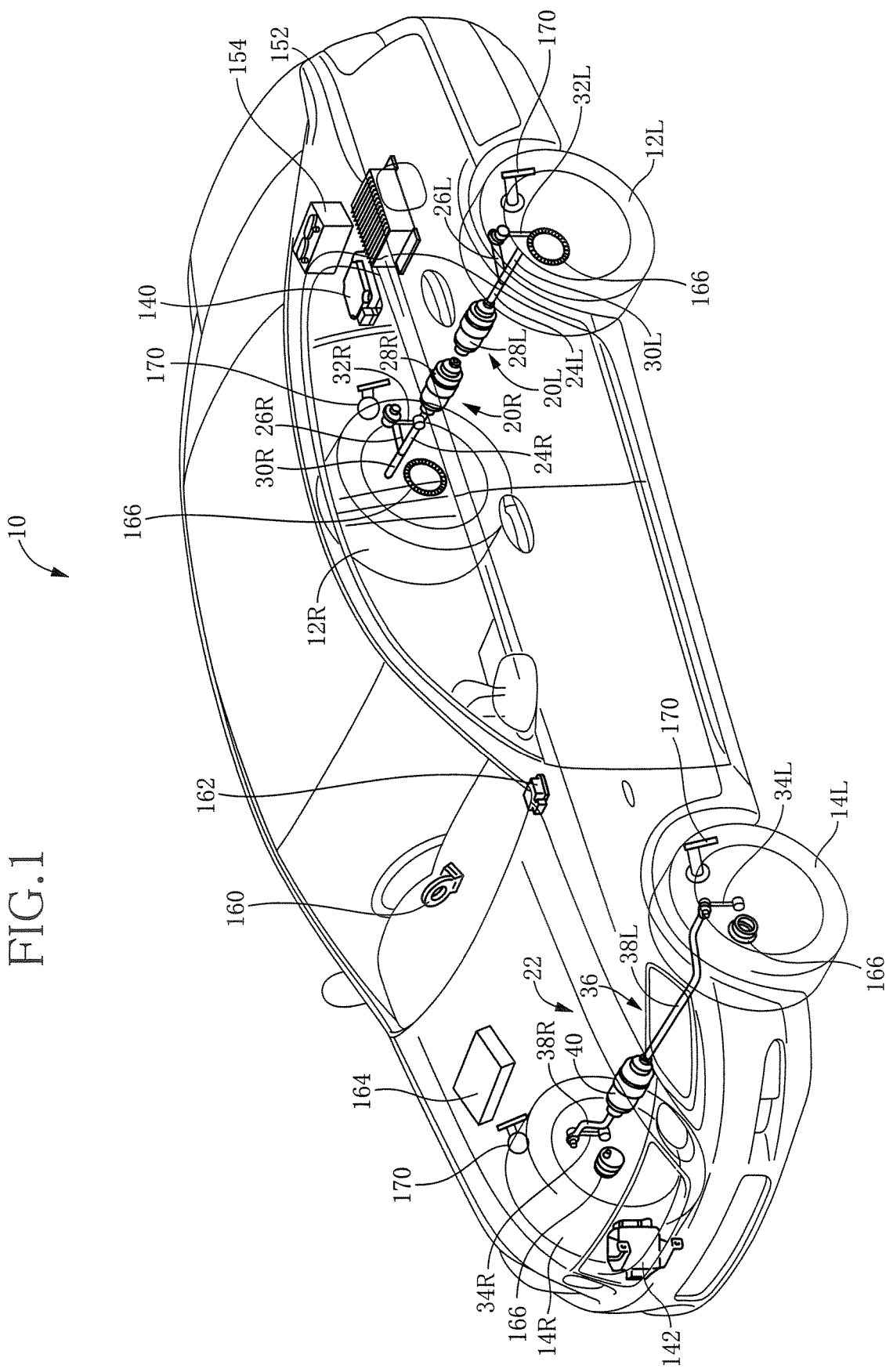
FIG. 1 is a view schematically showing an overall construction of a wheel-body distance adjusting system according to a first embodiment of the invention.
Figure 2:
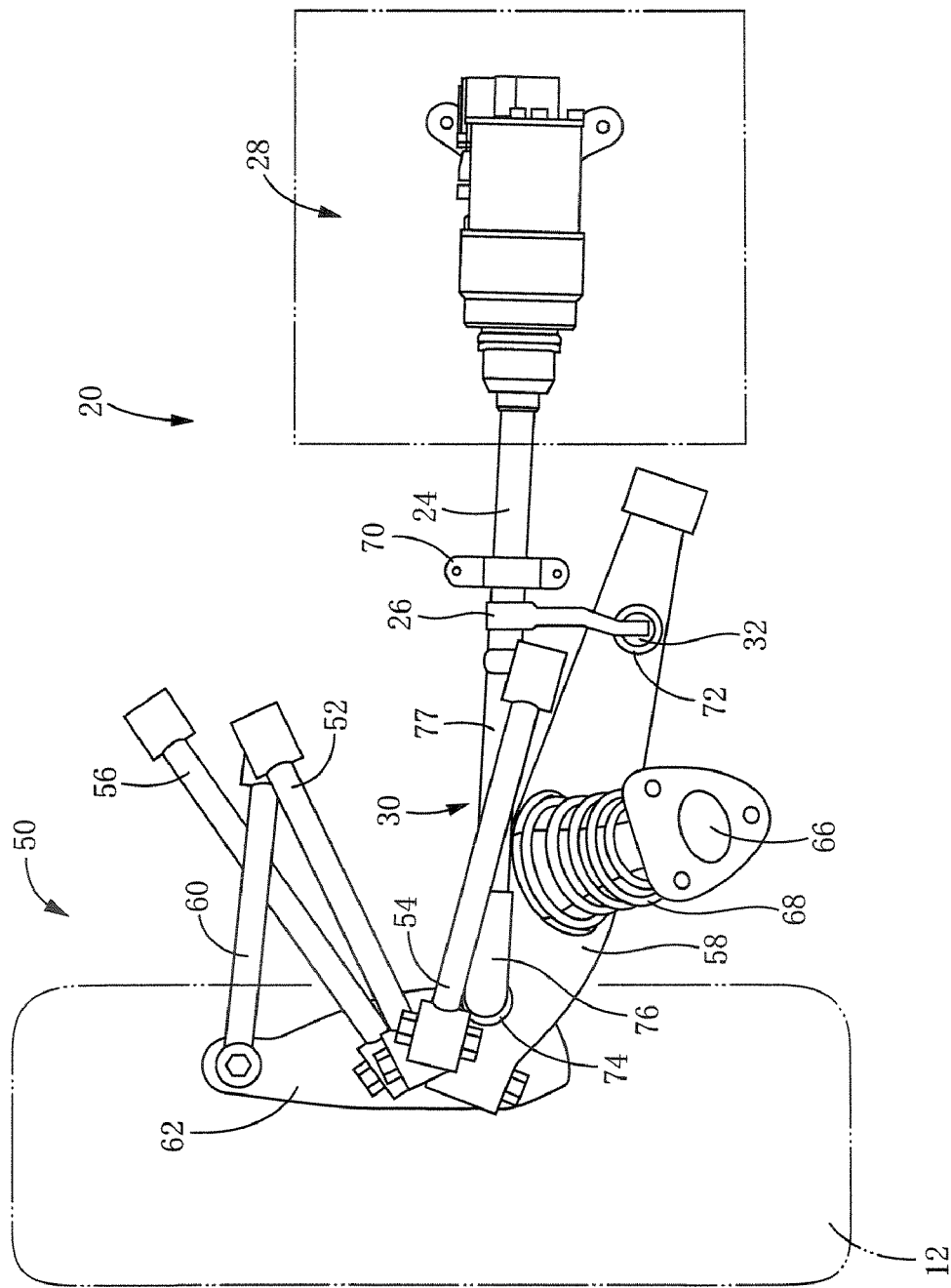
FIG. 2 is a view schematically showing a wheel-body distance adjuster device included in the adjusting system of FIG. 1, and a suspension device connected to the adjuster device.
Figure 5:
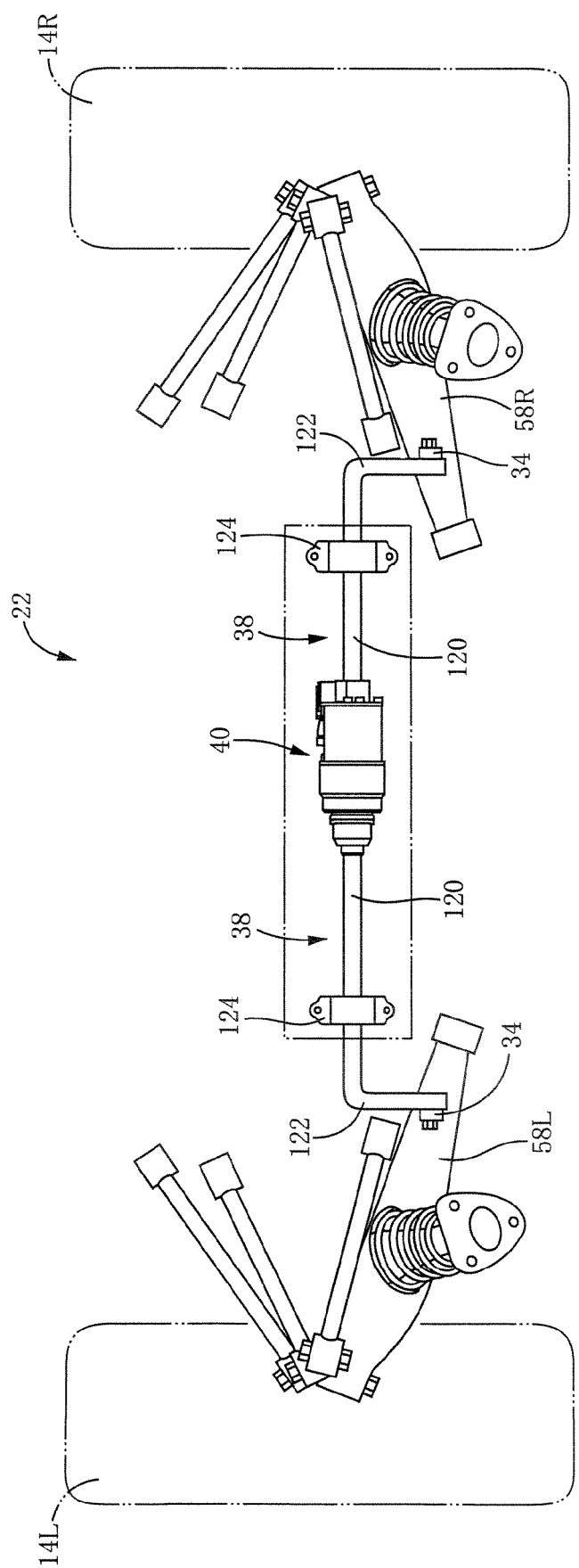
FIG. 5 is a view schematically showing a stabilizer device included in the adjusting system of FIG. 1.

FIG. 1 schematically shows a wheel-body distance adjusting system 10 constructed according to a first embodiment of the invention. The adjusting system 10 includes a pair of first adjuster devices in the form of two wheel-body distance adjuster devices 20 that are provided for respective rear right and left wheels 12 of a vehicle and also a second adjuster device in the form of a stabilizer device 22 that is provided for front right and left wheels 14 of the vehicle. As shown in FIG. 2, each of the adjuster devices 20 includes: a shaft 24; an arm 26 which is connected to the shaft 24 and which extends from the shaft 24 in a direction intersecting an axial direction of the shaft 24; and an actuator 28 operable to actuate or rotate the shaft 24 about it axis. The shaft 24 is held at one of its axially opposite end portions by the actuator 28, and is connected at the other of the axially opposite end portions to a suspension arm (that holds a corresponding one of the rear right and left wheels 12) via a tie rod 30. Further, the arm 26 is connected at its end portion to the suspension arm via a link rod 32. On the other hand, as shown in FIG. 5, the stabilizer device 22 includes a stabilizer bar 36 that is connected at its opposite end portions to suspension arms (that hold the respective front right and left wheels 14) via respective link rods 34. The stabilizer bar 36 is provided by a pair of stabilizer bar members 38 which are independent of each other and which are connected to an actuator 40 such that the stabilizer bar members 38 are rotatable relative to each other. As is apparent from FIG. 1, the adjuster device 20, shaft 24, arm 26, actuator 28, stabilizer bar member 38, tie rod 30, link rod 32 and link rod 34 are provided for each of the rear right and left wheels 12R, 12L or each of the front right and left wheels 14R, 14L of the vehicle. In the following description, each of the adjuster device 20, shaft 24, arm 26, actuator 28, stabilizer bar member 38, tie rod 30, link rod 32 and link rod 34 is referred together with one of reference signs R, L indicative of the respective right and left wheels, where it should be clarified which one of the right and left wheels the referred device or component is provided for.

(ii) Construction of Suspension Device

In the vehicle equipped with the present adjusting system 10, four suspension devices 50 are provided for the respective four wheels 12, 14. Since the front suspension devices 50 provided for the front wheels 14 as steered wheels and the rear suspension devices 50 provided for the rear wheels 12 as non-steered wheels can be considered substantially identical in construction with each other, only the rear suspension devices 50 will be described, for simplifying the description. Each suspension device 50 of independent type is provided by a multi-link suspension, and is equipped with an arm assembly that includes a total of five suspension arms, i.e., a first upper arm 52, a second upper arm 54, a first lower arm 56, a second lower arm 58 and a toe control arm 60. Each of the five suspension arms 52, 54, 56, 58, 60 is connected at one of its longitudinal end portions to a body of the vehicle, pivotably relative to the vehicle body, and is connected at the other longitudinal end portion to an axle carrier 62. Each of the wheels 12 is held by the axle carrier 62 so as to be rotatable about its axle. When each wheel 12 and the vehicle body are vertically displaced toward or away from each other, each of the five suspension arms 52, 54, 56, 58, 60 is pivoted about the above-described end portion (i.e., vehicle-body-side end portion), whereby the above-described other end portion (wheel-side end portion) of each of the five suspension arms 52, 54, 56, 58, 60 is vertically displaced relative to the vehicle body. The second lower arm 58 is connected to a portion of the axle carrier 62 that is located on the rear and lower side of an axle holding portion of the axle carrier 62 that holds the axle of the wheel 12. Further, each axle carrier 62 is pressed or pulled in its axial direction by the toe control arm 60 that is connected to the axle carrier 62, when the corresponding wheel 12 and the vehicle body are vertically displaced toward or away from each other. The suspension device 50 is further equipped with a shock absorber 66 and a suspension spring 68 that are interposed between the second lower arm 58 and a mount portion of a tire housing. That is, the suspension device 50 is arranged to generate a damping force for absorbing vibrations caused by the displacement of the wheel 12 and the vehicle body toward and away from each other, while elastically interconnecting the wheel 12 and the vehicle body. It is noted that the suspension device 50 and five suspension arms 52, 54, 56, 58, 60 are provided for each of the four wheels of the vehicle. In the following description, each of the suspension device 50 and five suspension arms 52, 54, 56, 58, 60 is referred together with one of reference signs FR, FL, RR, RL indicative of the respective front right, front left, rear right and rear left wheels, where it should be clarified which one of the four wheels the referred device or arm is provided for.

(iii) Construction of Adjuster Device

Figure 3:
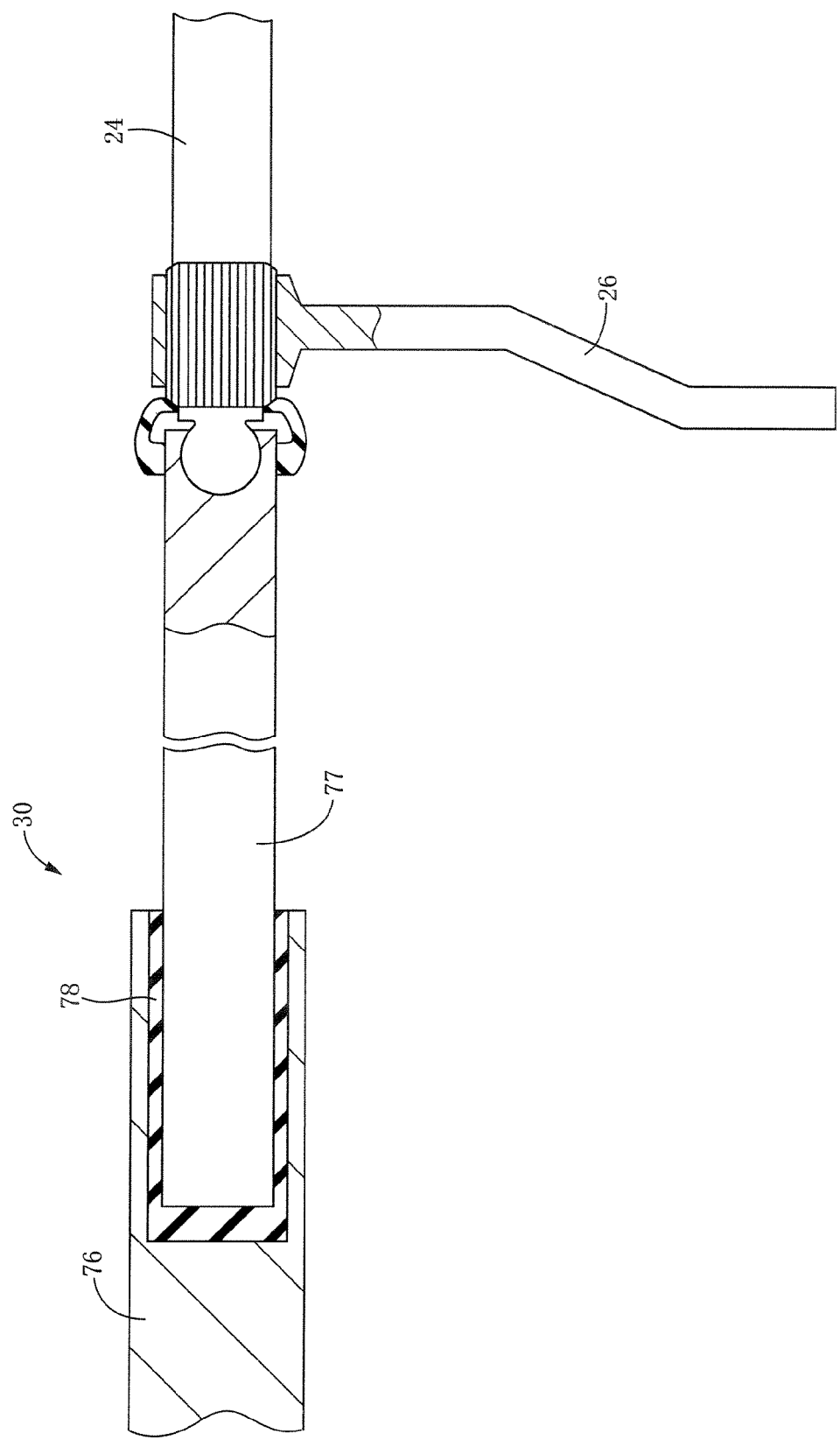
FIG. 3 is a view, partially in cross section, showing an arrangement for connection of the wheel-body distance adjuster device of FIG. 2 with the suspension device.

As shown in FIG. 2, the shaft 24 of the adjuster device 20 extends substantially in a width or lateral direction of the vehicle, and is held by the actuator 28 that is fixedly disposed substantially in a widthwise central portion of the vehicle body and a retainer 70 that is fixed to the vehicle body, such that the shaft 24 is rotatable and movable in its axial direction relative to the vehicle body. As shown in FIG. 3, the arm 26 has a proximal end portion having a hole in which a wheel-side end portion of the shaft 24 is introduced. The shaft 24 is serrated on the outer circumferential surface of its wheel-side end portion, so as to be held in engagement with an inner circumferential surface of the hole formed in the proximal end portion of the arm 26 that is also serrated. Owing to the serration engagement, the shaft 24 and the arm 26 are connected to each other, such that the arm 26 is unrotatable about the axis of the shaft 24 relative to the shaft 24 and unmovable in the axial direction of the shaft 24 relative to the shaft 24. The arm 26 is connected at its distal end portion to the second lower arm 58 through the link rod 32 that extends in a vertical direction. Described specifically, a link-rod connection portion 72 is provided in the second lower arm 58, and the link rod 32 is connected at its opposite end portions to the link-rod connection portion 72 and the distal end portion of the arm 26, respectively. The link rod 32 is connected to the link-rod connection portion 72 and the distal end portion of the arm 26 through respective ball joints, so as to be rockable relative to the link-rod connection portion 72 and the arm 26. On the other hand, the shaft 24 is connected at its wheel-side end portion (at which the shaft 24 is connected to the arm 26) to the second lower arm 58 via the tie rod 30 that extends substantially in the lateral direction of the vehicle. Described specifically, the tie rod 30 is provided by a first tie-rod member 76 having a fitting hole and a second tie-rod member 77 fitted in the fitting hole of the first tie-rod member 76. The first tie-rod member 76 is rockably connected at its end portion, through a ball joint, to a tie-rod connection portion 74 that is provided in a wheel-side portion of the second lower arm 58. As shown in FIG. 3, a tubular damper member 78, which has a bottom wall and is made of a rubber, is fixedly fitted in the fitting hole of the first tie-rod member 76. The second tie-rod member 77 is fixedly fitted at its end portion in the tubular damper member 78, and is connected at its another end portion to the wheel-side end portion of the shaft 24 through a ball joint, so as to be rotatable relative to the shaft 24.

Figure 4:
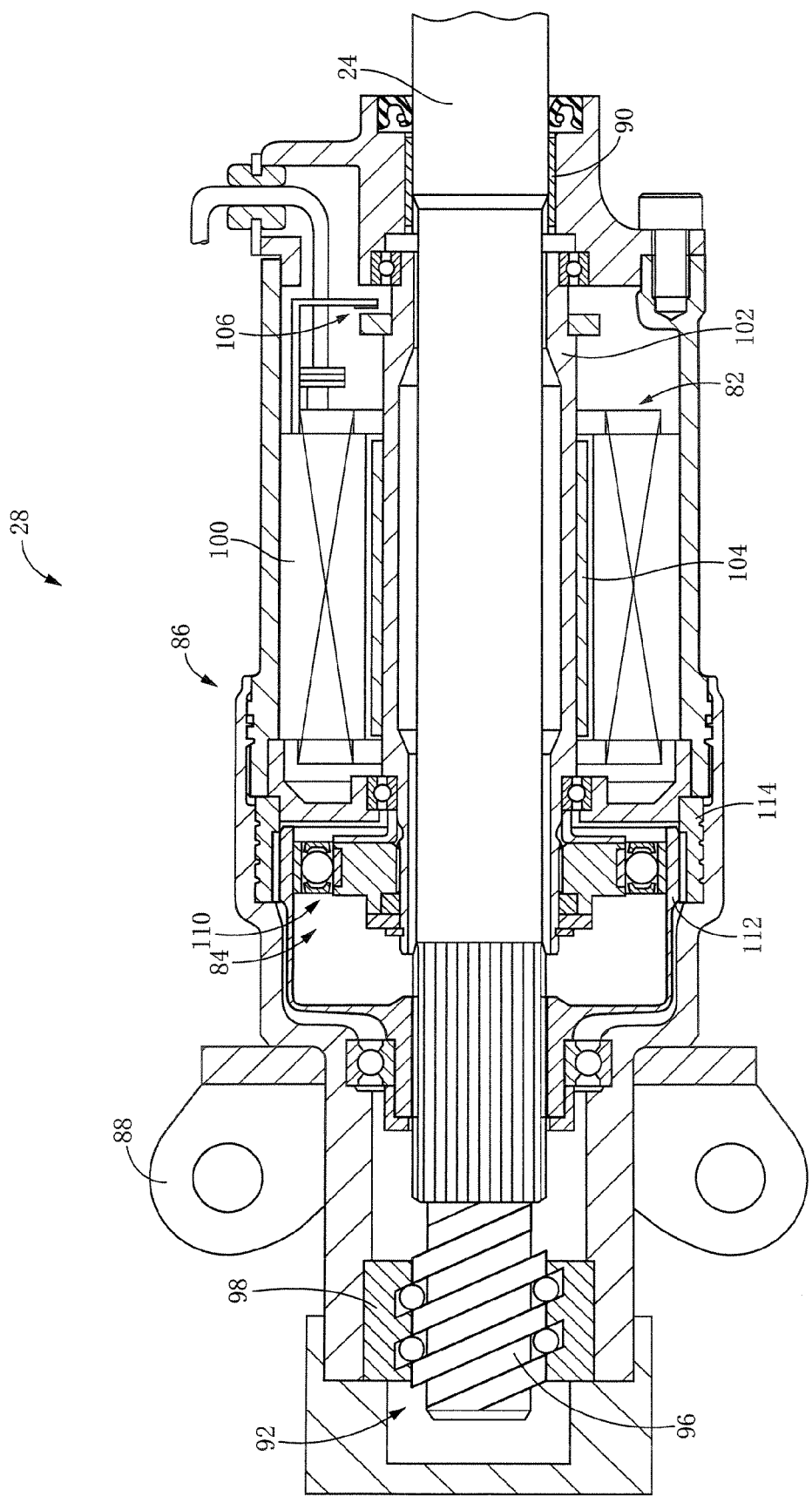
FIG. 4 is a view, partially in cross section, showing an actuator as a component of the wheel-body distance adjuster device of FIG. 2.

As shown in FIG. 4, the actuator 28 of the adjuster device 20 includes an electric motor 82 as a drive source, and a speed reducer 84 arranged to reduce a rotational speed of the electric motor 82 while outputting a torque or rotational force of the electric motor 82. The electric motor 82 and the speed reducer 84 are disposed within a housing 86 as an outer shell member of the actuator 28. The housing 86 is fixedly attached to the vehicle body through an attachment member 88 that is fixed to an end portion of the housing 86. The shaft 24 is arranged to extend throughout the housing 86 and project out from another end portion of the housing 86. The shaft 24 is supported by the housing 86 such that the shaft 24 is rotatable relative to the housing 86 and axially unmovable relative to the housing 86. The shaft 24 is connected, at its portion that is located within the housing 86, to the speed reducer 84. A bearing bushing 90 is provided to support an axially intermediate portion of the shaft 24, so that the shaft 24 is rotatably held by the housing 86 through the bearing bushing 90. The shaft 24 is rotatably held by the housing 86 also through a ballscrew mechanism 92 that is established by an external thread and an internal thread that are held in engagement with each other via bearing balls interposed therebetween. The external thread is provided by an externally threaded portion 96 (first threaded portion) corresponding to an end portion of the shaft 24 that is located within the housing 86. The internal thread is provided by a nut 98 (second threaded portion) fixed in a portion of an inner circumferential surface of the housing 86 that is opposed to the externally threaded portion 96 of the shaft 24 in a radial direction of the shaft 24.

The electric motor 82 includes a plurality of coils 100 that are fixedly disposed on a circumference along an inner surface of a circumferential wall of the housing 86, a motor shaft 102 that is provided by a hollow member rotatably held by the housing 86, and a permanent magnet 104 which is fixed to an outer circumferential surface of the motor shaft 102 and which is radially opposed to the coils 100. The electric motor 82 is provided by a three-phase DC brushless motor, so that each of the coils 100 serves as a stator while the permanent magnet 104 serves as a rotor. An angular position sensor 106 is provided in the housing 86, so as to detect an angular position of the motor shaft 102, i.e., an angular position of the electric motor 82. The angular position sensor 106 is constituted principally by a rotary encoder, and outputs a signal that is used in controlling the actuator 28, namely, controlling the adjuster device 20.

The speed reducer 84 is provided by a harmonic gear set (which is also called "harmonic drive™" or "strain wave gearing"), and includes a wave generator 110, a flexible gear (flexspline) 112 and a ring gear (circular spline) 114. The wave generator 110 includes an elliptic cam and a ball bearing fitted on an outer circumferential surface of the elliptic cam, and is fixed to an end portion of the motor shaft 102. The flexible gear 112 is provided by a cup-shaped member having a circumferential wall portion that is elastically deformable, and a plurality of teeth formed on its outer circumferential surface. The teeth are located in one of axially opposite end portions of the flexible gear 112 that is close to an opening end of the cup-shaped flexible gear 112. The flexible gear 112 is connected to a gear connection portion of the shaft 24, so as to be held by the shaft 24. Described more specifically, the shaft 24 is arranged to extend throughout the motor shaft 102 provided by the hollow member. The above-described gear connection portion of the shaft 24 projects out from the motor shaft 102, and extends through a hole formed through a bottom wall of the cup-shaped flexible gear 112 that serves as an output portion of the speed reducer 84. The gear connection portion of the shaft 24 is serrated on its outer circumferential surface so as to be held in engagement with an inner circumferential surface of a hole formed through a bottom wall of the cup-shaped flexible gear 112 that is also serrated. Owing to the serration engagement, the shaft 24 and the flexible gear 112 are connected to each other, and are unrotatable and axially unmovable relative to each other. The ring gear 114 is provided by a ring member fixed to the housing 86, and has a plurality of teeth formed on its inner circumferential surface. In the present embodiment, the number of the teeth of the ring gear 114 is 402, while the number of the teeth of the flexible gear 112 is 400. The flexible gear 112 is fitted at its circumferential wall portion on the wave generator 110, and is elastically deformed to have an elliptic shape. The flexible gear 112 meshes, at two portions thereof that lie substantially on a long axis of the elliptic shape, with the ring gear 114, while not meshing at the other portions thereof with the ring gear 114. In the thus constructed speed reducer 84, while the wave generator 110 is rotated by a single rotation (by 360°), namely, while the motor shaft 102 of the electric motor 82 is rotated by a single rotation, the flexible gear 112 and the ring gear 114 are rotated relative to each other by an amount corresponding to two teeth, i.e., a difference therebetween with respect to the number of teeth.

The shaft 24 is rotated by the electric motor 82, and the arm 26 is pivoted about its proximal end portion by the rotation of the shaft 24. As a result of pivot motion of the arm 26, the distal end portion 26 is moved in the vertical direction, so as to press down or pull up the second lower arm 58 relative to the vehicle body, thereby increasing or reducing a distance (hereinafter referred to as "wheel-body distance") between the wheel 12 and the vehicle body. That is, the rotational force applied to the shaft 24 acts as a force causing the second lower arm 58 to be vertically pivoted, i.e., a force causing change in the wheel-body distance. In the adjuster device 20, the above-described rotational force is controlled by controlling the actuation of the actuator 28, so as to suitably change a magnitude of the force causing change in the wheel-body distance. It is noted that the shaft 24 serves as a torsion bar, so that the shaft 24 is somewhat twisted when being rotated for changing the wheel-body distance.

As the shaft 24 is rotated, the shaft 24 is moved in its axial direction, owing to the ballscrew mechanism 92. In other words, the rotational force applied to the shaft 24 is converted into an axial force applied to the shaft 24, which forces the shaft 24 to be moved in the axial direction. That is, the ballscrew mechanism 92 serves as a motion converter.

In the adjuster device 20, when the wheel-body distance is increased or reduced by application of an external force to the wheel, for example, during running of the vehicle on a poor-conditioned road, the shaft 24 serving as the torsion bar is twisted thereby making it possible to alleviate shock applied to the actuator 28. When the rear wheel 12 receives an external force acting in right or left direction (i.e., in the lateral direction of the vehicle), for example, in the event of contact of the wheel 12 with a curb, the second lower arm 58 is moved in its longitudinal direction. In this instance, the tubular damper member 78 included in the tie rod 30 serves to alleviate shock applied to the actuator 28.

(iv) Construction of Stabilizer Device

The stabilizer device 22 is constituted by elements, many of which are substantially identical with those of the above-described adjuster device 20. In the following description as to the stabilizer device 22, the same reference numerals as used in the description of the adjuster device 20 are used to identify the same or similar elements, and redundant description of these elements will not be provided. As shown in FIG. 5, each of the pair of stabilizer bar members 38 includes a torsion bar portion 120 which extends substantially in the lateral direction of the vehicle, and an arm portion 122 which is contiguous to the torsion bar portion 120 and which extends in a direction intersecting the torsion bar portion 120, e.g., substantially in a forward direction of the vehicle. The torsion bar portion 120 of each of the stabilizer bar members 38 is held, at its portion that is close to the arm portion 122, by a retainer 124 that is fixed to the vehicle body, such that the torsion bar portions 120 of the respective stabilizer bar members 38 are rotatable and unmovable in the axial direction, and are substantially coaxial with each other. The torsion bar portion 120 of each stabilizer bar member 38 is connected at one of its opposite end portions (that is remote from the arm portion 122) to the actuator 40. Meanwhile, the arm portion 122 of each stabilizer bar member 38 is connected at one of its opposite end portions (that is remote from the torsion bar portion 120) to the second lower arm 46 via the link rod 34.

Figure 6:
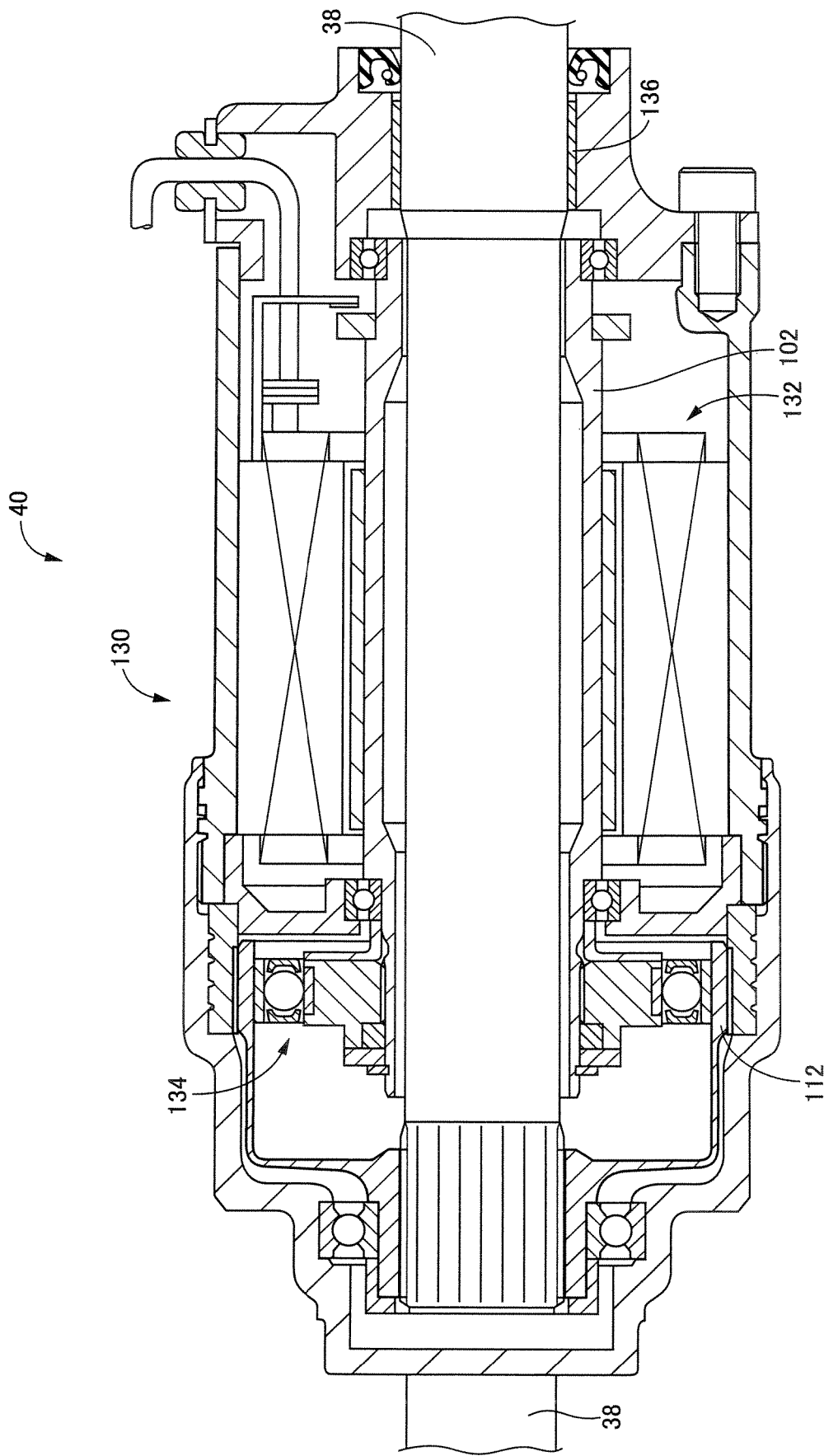
FIG. 6 is a view, partially in cross section, showing an actuator as a component of the stabilizer device of FIG. 5.

As shown in FIG. 6, the actuator 40 of the stabilizer device 22 includes a substantially cylindrical-shaped housing 130, and an electric motor 132 and a speed reducer 134 which are identical in construction with the above-described electric motor 82 and speed reducer 84 and which are disposed within the housing 130. One of the pair of stabilizer bar members 38 is fixedly connected to a corresponding one of the opposite ends of the housing 130. The other stabilizer bar member 38 is introduced in the housing 130 through the other end of the housing 130, and is held by the housing 130 rotatably and axially unmovably relative to the housing 130. Described in detail, the other stabilizer bar member 38 introduced in the housing 130 extends through the hollow motor shaft 102 of the motor 132. An axial end portion of the other stabilizer bar member 38 is located within the housing 130, and is serrated on its outer circumferential surface so as to be held in engagement with an inner circumferential surface of a hole formed through a bottom wall of a cup-shaped flexible gear 112 of the speed reducer 134 that is also serrated, whereby the other stabilizer bar member 38 and the flexible gear 112 are connected to each other, unrotatably and axially unmovably relative to each other. The other stabilizer bar member 38 is rotatably held at its axially intermediate portion by the housing 130 through a bearing bushing 136.

The pair of stabilizing bar members 38 are rotated relative to each other by the electric motor 132, and the arm portions 122 are pivoted relative to each other, with the torsion bar portions 120 being somewhat twisted. As a result of pivot motions of the arm portions 122 of the respective stabilizing bar members 38, one of a front right wheel-body distance (i.e., the distance between the front right wheel 14 and the vehicle body) and a front left wheel-body distance (i.e., the distance between the front left wheel 14 and the vehicle body) is increased while the other of the front right wheel-body distance and front left wheel-body distance is reduced. In other words, one of the front right wheel-body distance and front left wheel-body distance is increased while the other of the front right wheel-body distance and front left wheel-body distance is increased, owing to reactions generated as a result of twisting or torsion of the torsion bar portions 120 of the respective stabilizing bar members 38. That is, the stabilizer device 22 serves as a wheel-body distance opposite adjuster device that is capable of adjusting the front right wheel-body distance and the front left wheel-body distance in respective opposite senses, namely, displacing positions of the front right and left wheels 14 relative to the vehicle body in respective directions opposite to each other.

(v) Construction of Controller

In the present adjusting system 10, as shown in FIG. 1, an adjuster electronic control unit (adjuster ECU) 140 is provided for controlling the two adjuster devices 20, while a stabilizer electronic control unit (stabilizer ECU) 142 is provided for controlling the stabilizer device 22. Described specifically, the adjuster ECU 140 is operable to control operations of the actuators 28 of the respective adjuster devices 20, and includes two inverters 144 serving as drive circuits for the electric motors 82 of the respective actuators 28 and a rear-wheel controller 146 that is constituted principally by a computer including CPU, ROM and RAM. Meanwhile, the stabilizer ECU 142 is operable to control operation of the actuator 40 of the stabilizer device 22, and includes an inverter 148 serving as a drive circuit for the motor 132 of the actuator 40 and a front-wheel controller 150 that is constituted principally by a computer including CPU, ROM and RAM (see FIG. 20). The inverters 144, 148 are connected to a buttery 154 via a converter 152. The inverters 144 are connected to the electric motors 82 of the respective adjuster devices 20, while the inverter 148 is connected to the electric motor 132 of the stabilizer devices 22. The converter 152 is capable of increasing voltage of an electric power that is supplied from the buttery 154, and the electric power is supplied from the buttery 154 to the electric motors 82, 132 via the respective inverters 144, 148. Since each of the electric motors 80, 132 is driven by a constant voltage, an amount of the electric power supplied to each of the electric motors 80, 132 is changed by changing an amount of electric current supplied to each of the electric motors 80, 132. That is, the force generated by each of the electric motors 80, 132 is dependent on the amount of the supplied electric current, which can be changed, for example, by a PWM (pulse width modulation) control performed by a corresponding one of the inverters 144, 148. In the PWM control, each of the inverters 144, 148 is arranged to suitably control a duty ratio, i.e., a ratio of pulse ON time to a sum of the pulse ON time and pulse OFF time.

Figure 20:
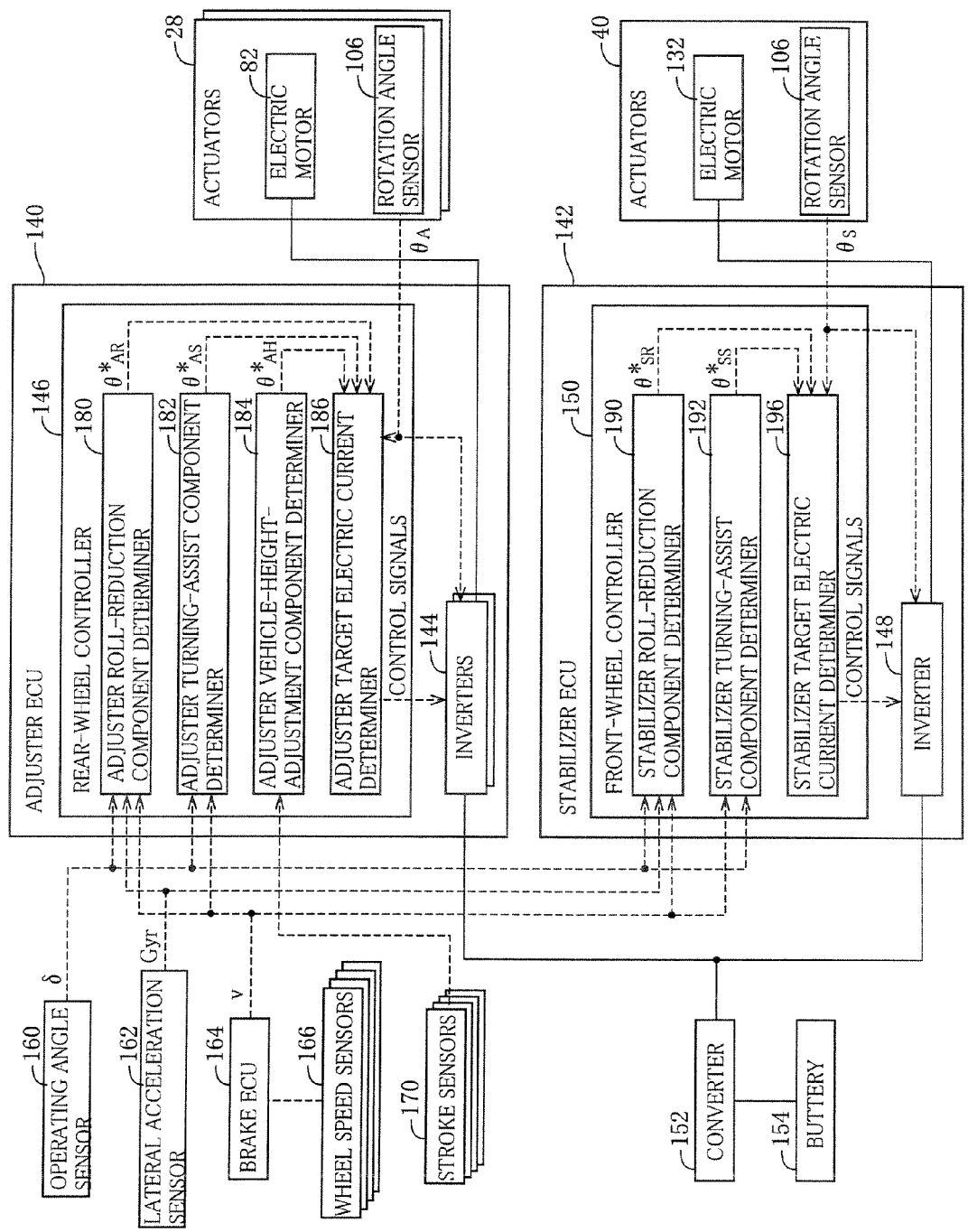
FIG. 20 is a block diagram showing various functional portions of a controller for controlling the wheel-body distance adjusting system of FIG. 1.
Figure 21:
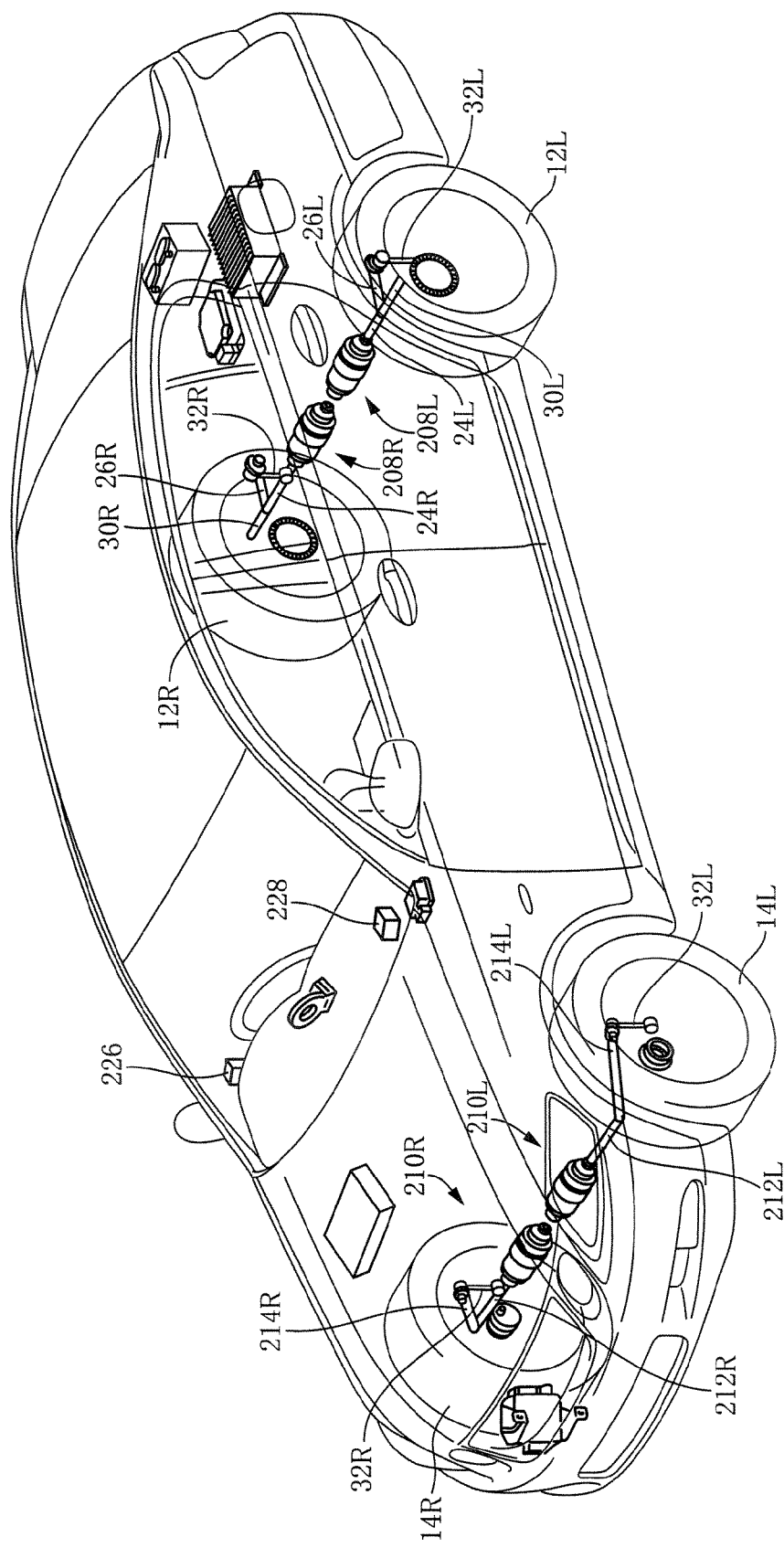
FIG. 21 is a view schematically showing an overall construction of a wheel-body distance adjusting system according to a second embodiment of the invention.

To the front-wheel controller 150 of the stabilizer ECU 142, there are connected an operating angle sensor 160, a lateral acceleration sensor 162 and a brake electronic control unit (brake ECU) 164 in addition to the above-described angular position sensors 106, as shown in FIG. 20. The operating angle sensor 160 is arranged to detect an operating angle of a steering wheel as a steering operating member, i.e., an operating amount (as a kind of a steering amount) of the steering wheel. The lateral acceleration sensor 162 is arranged to detect an actual acceleration of the vehicle as measured in the lateral direction of the vehicle. To the brake ECU 164 as a controller of a brake system of the vehicle, there are connected four wheel speed sensors 166 each of which is provided to detect a rotational speed of a corresponding one of the four wheels 12, 14, so that the brake ECU 164 has a function of estimating a running speed of the vehicle based on the values detected by the four wheel speed sensors 166. The front-wheel controller 150 is connected to the brake ECU 164, so as to obtain an estimated value of the running speed from the brake ECU 164, as needed. Further, the front-wheel controller 150 is connected to the inverter 148, so as to control the stabilizer device 22 by controlling the inverter 148. It is noted that the ROM included in the computer of the front-wheel controller 150 stores therein programs and various data used for controlling the stabilizer device 22.

To the rear-wheel controller 146 of the adjuster ECU 140, there are connected four stroke sensors 170 in addition to the above-described angular position sensors 106, operating angle sensor 160, lateral acceleration sensor 162 and brake ECU 164. Each of the four stroke sensors 170 is arranged to detect a distance between a corresponding one of the wheels 12, 14 and the vehicle body. Further, the rear-wheel controller 146 is connected to the inverters 144, so as to control the adjuster devices 20 by controlling the respective inverters 144. The ROM included in the computer of the rear-wheel controller 146 stores therein programs and various data used for controlling the adjuster devices 20. It is noted that the rear-wheel controller 146 and the front-wheel controller 150 can be brought into communication with each other. The adjuster ECU 140 and the stabilizer ECU 142 cooperate with each other to constitute a controller of the present adjusting system 10.

[Functions of Wheel-Body Distance Adjusting System]

(i) Roll Reduction Control

In the present adjusting system 10, the two adjuster devices 20 can be controlled to be operated to increase one of a distance (hereinafter referred to as "rear right wheel-body distance" where appropriate) between the rear right wheel 12 and the vehicle body and a distance (hereinafter referred to as "rear left wheel-body distance" where appropriate) between the rear left wheel 12 and the vehicle body and to reduce the other of the rear right wheel-body distance and the rear left wheel-body distance. That is, the pair of adjuster devices 20 can generate forces for displacing positions of the respective rear right and left wheels 12 relative to the vehicle body in respective opposite directions. On the other hand, the stabilizer device 22 is operated to increase one of a distance (hereinafter referred to as "front right wheel-body distance" where appropriate) between the front right wheel 14 and the vehicle body and a distance (hereinafter referred to as "front left wheel-body distance" where appropriate) between the front left wheel 14 and the vehicle body and to reduce the other of the front right wheel-body distance and the front left wheel-body distance. That is, the stabilizer device 22 can generate a force for displacing positions of the respective front right and left wheels 14 relative to the vehicle body in respective opposite directions. In the present adjusting system 10, during turning of the vehicle, a roll reduction control is executed for restraining or reducing a roll of the vehicle body, by cooperation of the above-described operations of the two adjuster devices 20 and the stabilizer device 22. Described specifically, in the roll reduction control that is executed to restrain or reduce the roll of the vehicle body caused by turning of the vehicle, the adjuster device 20 provided for the rear inside wheel 12 (i.e., one of the rear wheels 12 that is positioned between a center of the turning of the vehicle and the other of the rear wheels 12) is controlled to generate a force for reducing a distance (hereinafter referred to as "rear inside wheel-body distance" where appropriate) between the rear inside wheel 12 and the vehicle body, while the adjuster device 20 provided for the rear outside wheel 12 is controlled to generate a force for increasing a distance (hereinafter referred to as "rear outside wheel-body distance" where appropriate) between the rear outside wheel 12 and the vehicle body, such that the generated forces have magnitudes that are dependent on a magnitude of the a roll moment resulting from the turning of the vehicle. Meanwhile, the stabilizer device 22 is controlled to generate a force for reducing a distance (hereinafter referred to as "front inside wheel-body distance" where appropriate) between the front inside wheel 14 and the vehicle body, and increasing a distance (hereinafter referred to as "front outside wheel-body distance" where appropriate) between the front outside wheel 14 and the vehicle body, such that the generated force has a magnitude that is dependent on the magnitude of the roll moment resulting from the turning of the vehicle.

(ii) Change of Wheel Alignment by Suspension Geometry

Each of the suspension devices 50 constructed as described above causes a wheel alignment (such as a toe angle and a camber angle) of a corresponding one of the wheels 12, 14 to be changed owing to motions of the respective five arms 52, 54, 56, 58, 60 resulting from the displacement of the vehicle body and the corresponding wheel toward or away from each other. Described specifically, when the wheel-body distance is increased, the toe angle of each of the front wheels 14 is changed in an inward direction thereof (that causes front and rear portions of the wheel to be displaced inwardly and outwardly in the lateral direction of the vehicle, respectively), the camber angle of each of the front wheels 14 is changed in a negative direction thereof (that causes upper and lower portions of the wheel to be displaced inwardly and outwardly in the lateral direction of the vehicle, respectively), the toe angle of each of the rear wheels 12 is changed in an outward direction thereof (that causes the front and rear portions of the wheel to be displaced outwardly and inwardly in the lateral direction of the vehicle, respectively), and the camber angle of each of the rear wheels 12 is changed in a positive direction thereof (that causes the upper and lower portions of the wheel to be displaced outwardly and inwardly in the lateral direction of the vehicle, respectively). On the other hand, when the wheel-body distance is reduced, the toe angle of each of the front wheels 14 is changed in the outward direction thereof, the camber angle of each of the front wheels 14 is changed in the positive direction thereof, the toe angle of each of the rear wheels 12 is changed in the inward direction thereof, and the camber angle of each of the rear wheels 12 is changed in the negative direction thereof. Since each of the suspension devices 50 has a suspension geometry as described above, when the vehicle turns right or left, the toe angle and the camber angle of the front inside wheel 14 are changed in the inward direction and the negative direction, respectively, the toe angle and the camber angle of the rear inside wheel 12 are changed in the outward direction and the positive direction, respectively, the toe angle and the camber angle of the front outside wheel 14 are changed in the outward direction and the positive direction, respectively, and the toe angle and the camber angle of the rear outside wheel 12 are changed in the inward direction and the negative direction, respectively. Owing to the changes in the toe and camber angles of each wheel, the vehicle is given an understeer tendency as its turning characteristic.

(iii) Change of Wheel Alignment by Adjuster Device

However, in the vehicle equipped with the present adjusting system 10, since the roll reduction control is executed, as described above, for stabilizing posture of the vehicle body during turning of the vehicle, the distance between each of the wheels 12, 14 and the vehicle body is restrained from being changed. The execution of the roll reduction control leads to reduction in the understeer tendency as the turning characteristic that is dependent on the above-described suspension geometry. In view of this, the present adjusting system 10 is arranged to change the wheel alignment of each of the rear wheels 12 in such a manner that restrains the reduction in the understeer tendency, while restraining change in the distance between each of the rear wheels 12 and the vehicle body. Specifically, as described above, the rotational force applied to the shaft 24 of each of the adjuster devices 20 is converted by the ballscrew mechanism 92 of the adjuster device 20, into the axial force applied to the shaft 24, such that the axial force acts on a corresponding one of the suspension devices 50.

Figure 7A:
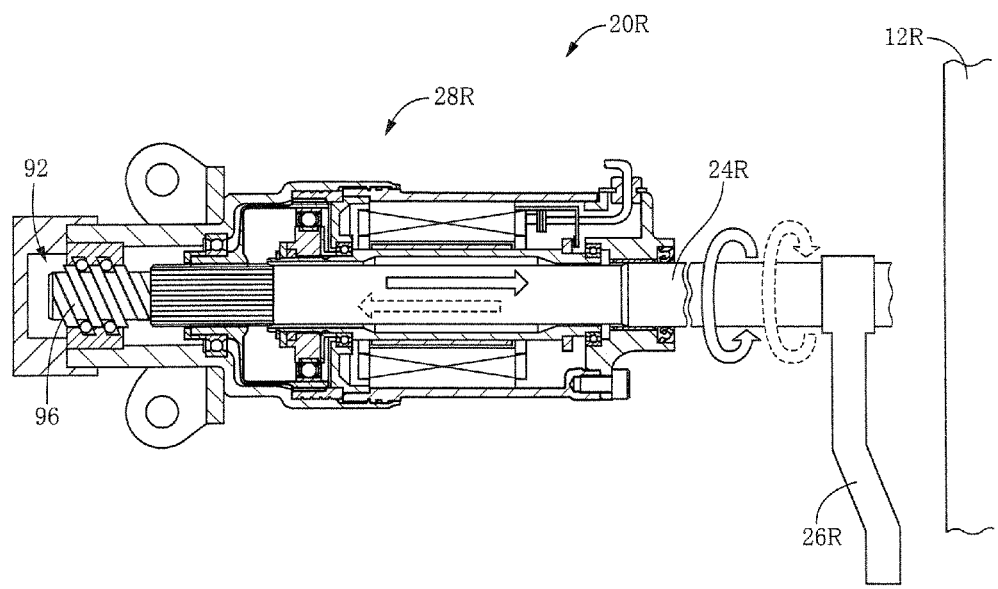
FIG. 7A is a view showing the right-side wheel-body distance adjuster device included in the adjusting system of FIG. 1, and indicating a relationship between directions of rotation and axial movement of a shaft as a component of the adjuster device.
Figure 7B:
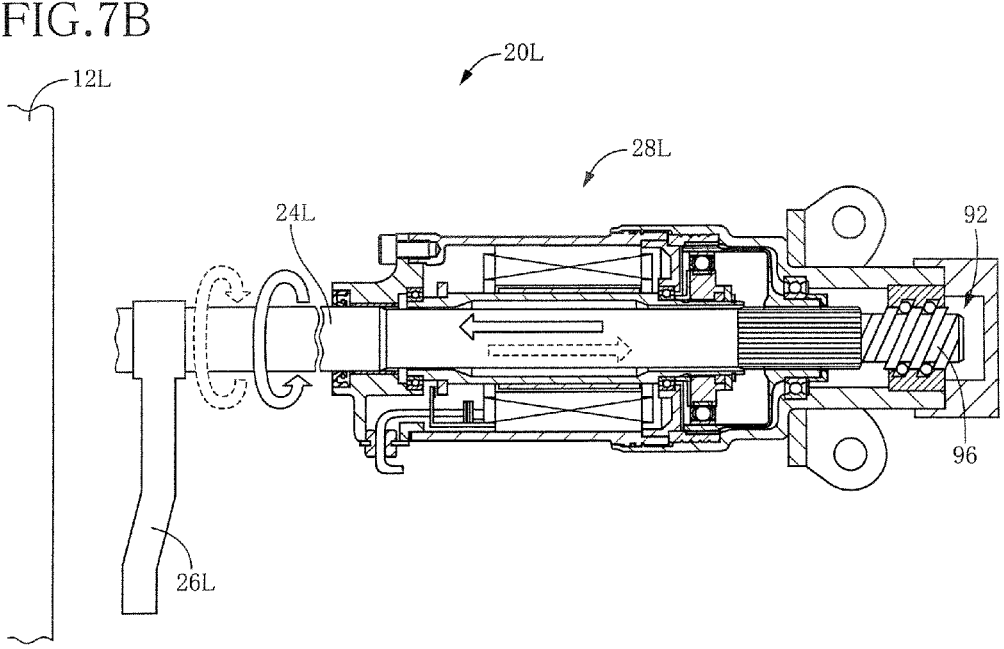
FIG. 7B is a view showing the left-side wheel-body distance adjuster device included in the adjusting system of FIG. 1, and indicating a relationship between directions of rotational force and axial force applied to a shaft as a component of the adjuster device.

FIG. 7A shows the right-side adjuster device 20R provided for the rear right wheel 12R, while FIG. 7B shows the left-side adjuster device 20L provided for the rear left wheel 12L. As is apparent from FIG. 7A, the externally threaded portion 96 of the ballscrew mechanism 92 of the right-side adjuster device 20R is provided by a right-hand screw. Meanwhile, as is apparent from FIG. 7B, the externally threaded portion 96 of the ballscrew mechanism 92 of the left-side adjuster device 20L is provided by a left-hand screw. When the distal end portion of the arm 26 is displaced downwardly for generating the rotational force acting on the shaft 24 in a direction (as indicated by arrows of solid lines in FIGS. 7A and 7B) that causes increase in the wheel-body distance, the axial force acts on the shaft 24 in a direction toward the wheel 12 (as indicated by arrows of solid lines in FIGS. 7A and 7B). On the other hand, when the distal end portion of the arm 26 is displaced upwardly for generating the rotational force acting on the shaft 24 in a direction (as indicated by arrows of broken lines in FIGS. 7A and 7B) that causes reduces in the wheel-body distance, the axial force acts on the shaft 24 in a direction away from the wheel 12 (as indicated by arrows of broken lines in FIGS. 7A and 7B). The second lower arm 58 is moved in the direction in which the axial force acts on the shaft 24, whereby the toe and camber angles of the wheel 12 are changed. That is, the suspension device 50 has compliance by which the toe and camber angles of the wheel 12 are changed depending on the direction of the axial force acting on the second lower arm 58 of the suspension device 50.

Figure 8:
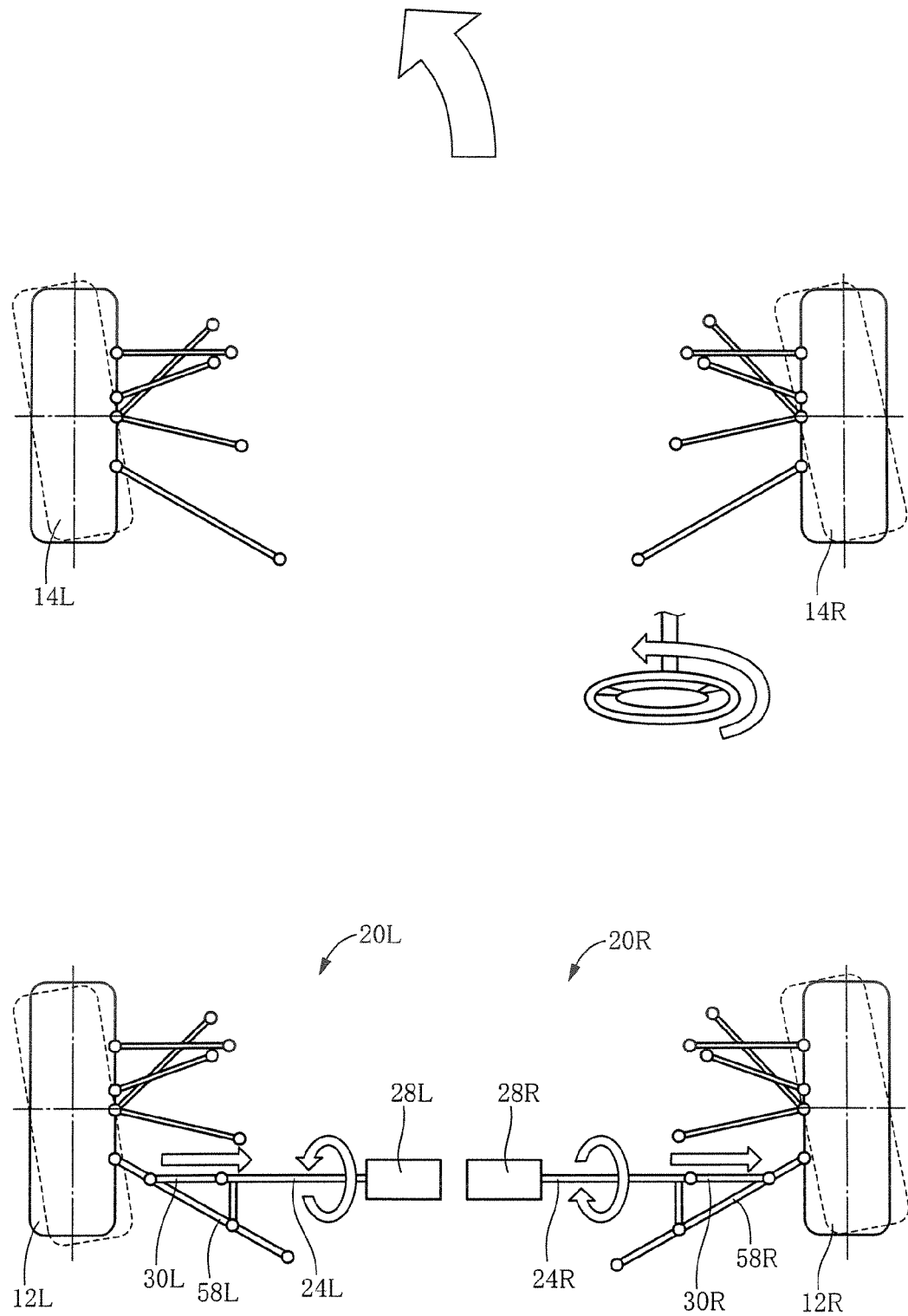
FIG. 8 is a view showing directions of the rotational and axial forces applied to the shaft of each of the right-side and left-side wheel-body distance adjuster devices and also a direction of change in a toe angle of each rear wheel when a roll reduction control is executed during left turn of the vehicle.
Figure 9:
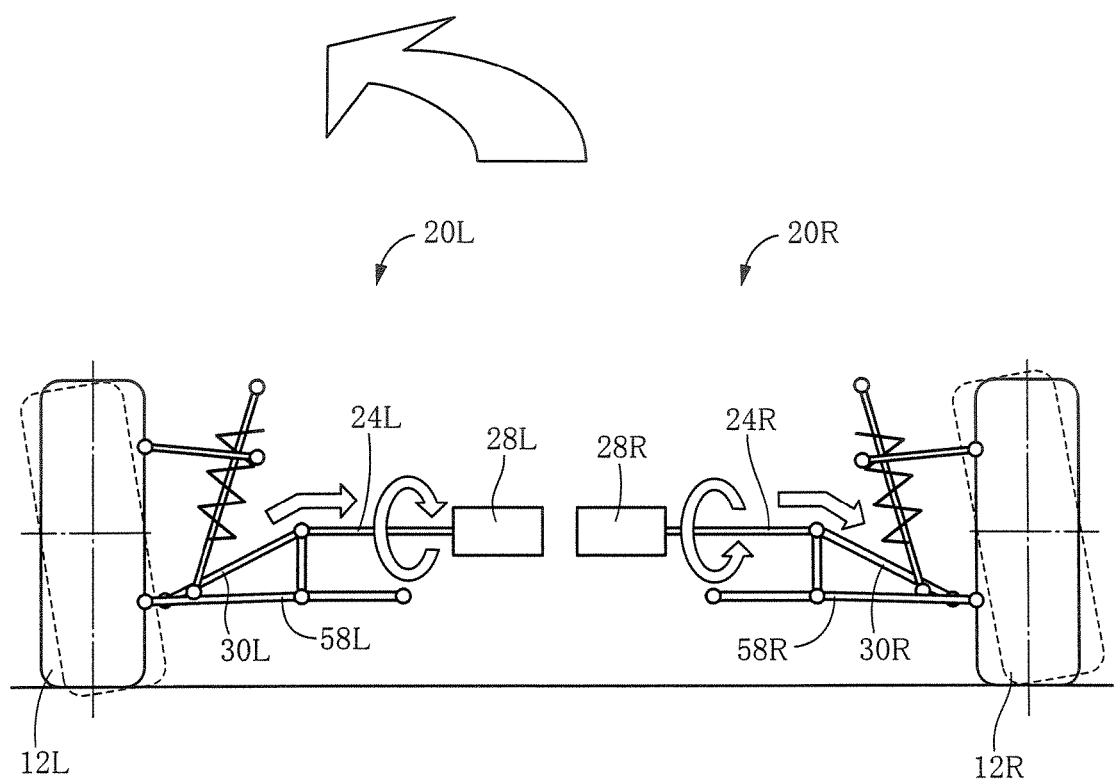
FIG. 9 is a view showing directions of the rotational and axial forces applied to the shaft of each of the right-side and left-side wheel-body distance adjuster devices and also a direction of change in a camber angle of each rear wheel when the roll reduction control is executed during the left turn of the vehicle.

FIG. 8 shows directions of the rotational and axial forces applied to each of the shafts 24R, 24L and also a direction of change in the toe angle of each of the rear right and left wheels 12R, 12L when the roll reduction control is executed during left turn of the vehicle. FIG. 9 shows directions of the rotational and axial forces applied to each of the shafts 24R, 24L and also a direction of change in the camber angle of each of the rear right and left wheels 12R, 12L when the roll reduction control is executed during left turn of the vehicle. As is apparent from FIGS. 8 and 9, during the left turn of the vehicle, the toe angle and the camber angle of the rear right wheel 12R are changed in the inward direction and in the negative direction, respectively, with application of the axial force to the shaft 24R in a direction indicated by arrow, while the toe angle and the camber angle of the rear left wheel 12L are changed in the outward direction and in the positive direction, respectively, with application of the axial force to the shaft 24L in a direction indicated by arrow. During right turn of the vehicle, the toe and camber angles of the rear right wheel 12R and toe and camber angles of the rear left wheel 12L are changed in respective directions that are opposite to those during the left turn of the vehicle. That is, each of the adjuster devices 20 is arranged to change the wheel alignment of a corresponding one of the rear wheels 12 in such a manner that increases the understeer tendency of the vehicle.

As described above, in the vehicle equipped with the present adjusting system 10, the understeer tendency based on the suspension geometry is reduced by the roll reduction control that is executed for the purpose of stabilizing posture of the vehicle body. However, as is clear from the above description, the reduction of the understeer tendency is sufficiently compensated by the above-described change in the wheel alignment of each rear wheel 12, which change is caused by the above-described axial force. Therefore, by employing the present adjusting system 10, it is possible to maintain the understeer tendency as the turning characteristic of the vehicle while satisfactorily reducing the roll of the vehicle body. Even in a case where the understeer tendency is not established as the turning characteristic by the suspension geometry per se, the understeer tendency can be established by the present adjusting system 10.

(iv) Turning Assist Control

There is a case where the vehicle is required to have a reduced turning radius so as to increase a turnability of the vehicle, particularly, during turning at a low running speed of the vehicle. In such a particular situation, typically, during U-turn of the vehicle, the present adjusting system 10 executes a turning assist control for assisting the turning of the vehicle by increasing an oversteer tendency of the vehicle. In execution of the turning assist control, each of the adjuster devices 20 is operated in a direction opposite to a direction of the operation in execution of the roll reduction control. That is, the adjuster devices 20 are controlled such that the axial force acts on each of the shafts 24R, 24L in a direction opposite to a direction of the axial force in execution of the roll reduction control.

However, when each of the adjuster devices 20 as the first adjuster devices is controlled to be operated in the direction opposite to the direction of the operation in execution of the roll reduction, each of the adjuster devices 20 generates a force changing the right wheel-body distance and left wheel-body distance in a manner that causes or increases the roll of the vehicle body. However, in the present adjusting system 10, the stabilizer device 22 as the second adjuster device (provided for the front wheels 14) is controlled to reduce the roll of the vehicle body that is caused or increased by the adjuster devices 20 that are controlled as described above. Specifically, the stabilizer device 22 is controlled to generate a force which reduces the vertical distance between the front inside wheel and the vehicle body and which increases the vertical distance between the front outside wheel and the vehicle body. That is, in execution of the turning assist control, the pair of adjuster devices 20 are controlled to generate the force that increases the vertical distance between the rear inside wheel and the vehicle body and the force that reduces the vertical distance between the rear outside wheel and the vehicle body so as to increase the oversteer tendency, while the stabilizer device 22 is controlled to generate the force which reduces the vertical distance between the front inside wheel and the vehicle body and which increases the vertical distance between the front outside wheel and the vehicle body. A magnitude of the force generated by the stabilizer device 22 is determined based on amounts of the respective forces generated by the adjuster devices 20.

Figure 10:
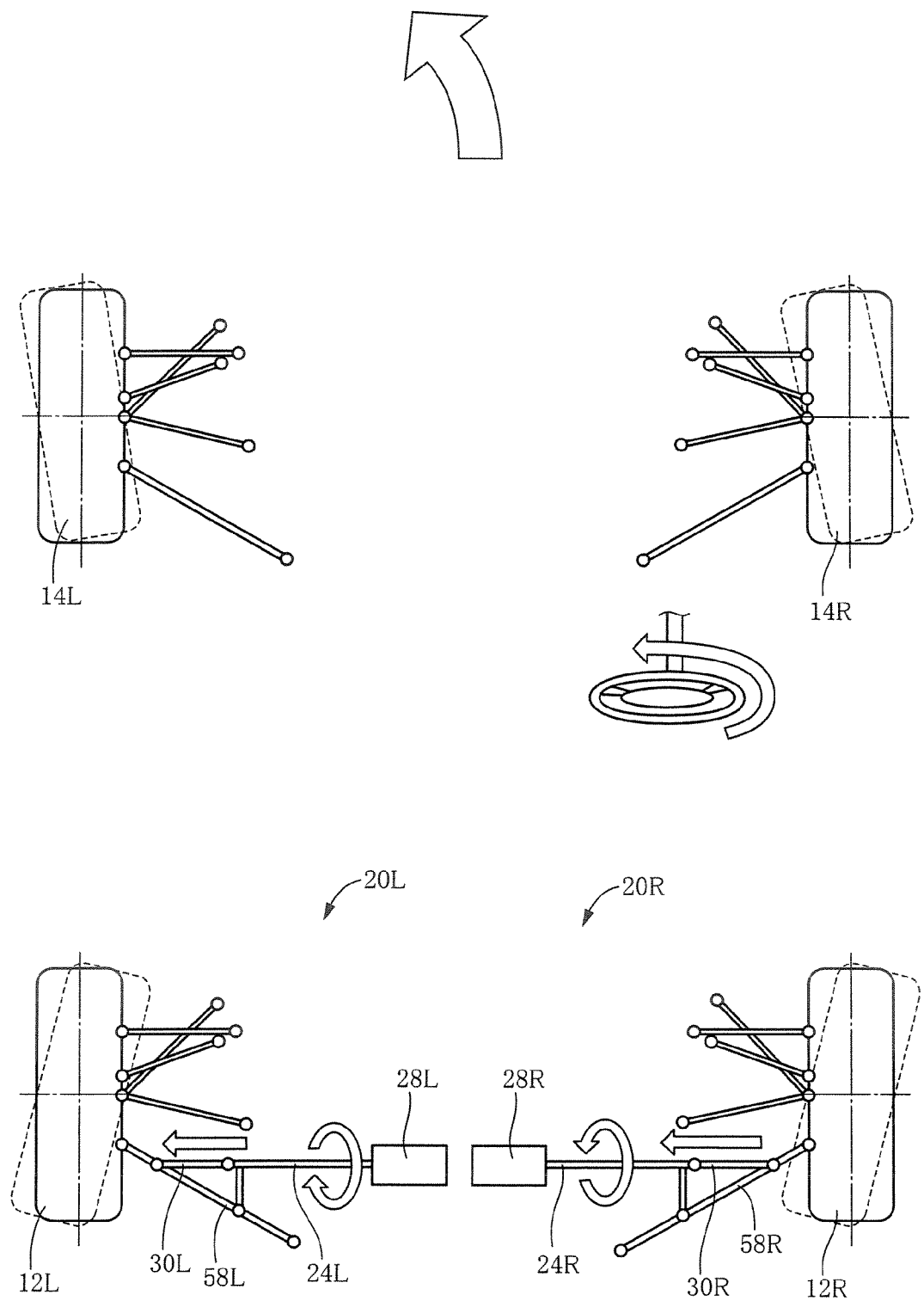
FIG. 10 is a view showing directions of the rotational and axial forces applied to the shaft of each of the right-side and left-side wheel-body distance adjuster devices and also a direction of change in the toe angle of each rear wheel when a turning assist control is executed during left turn of the vehicle.
Figure 11:
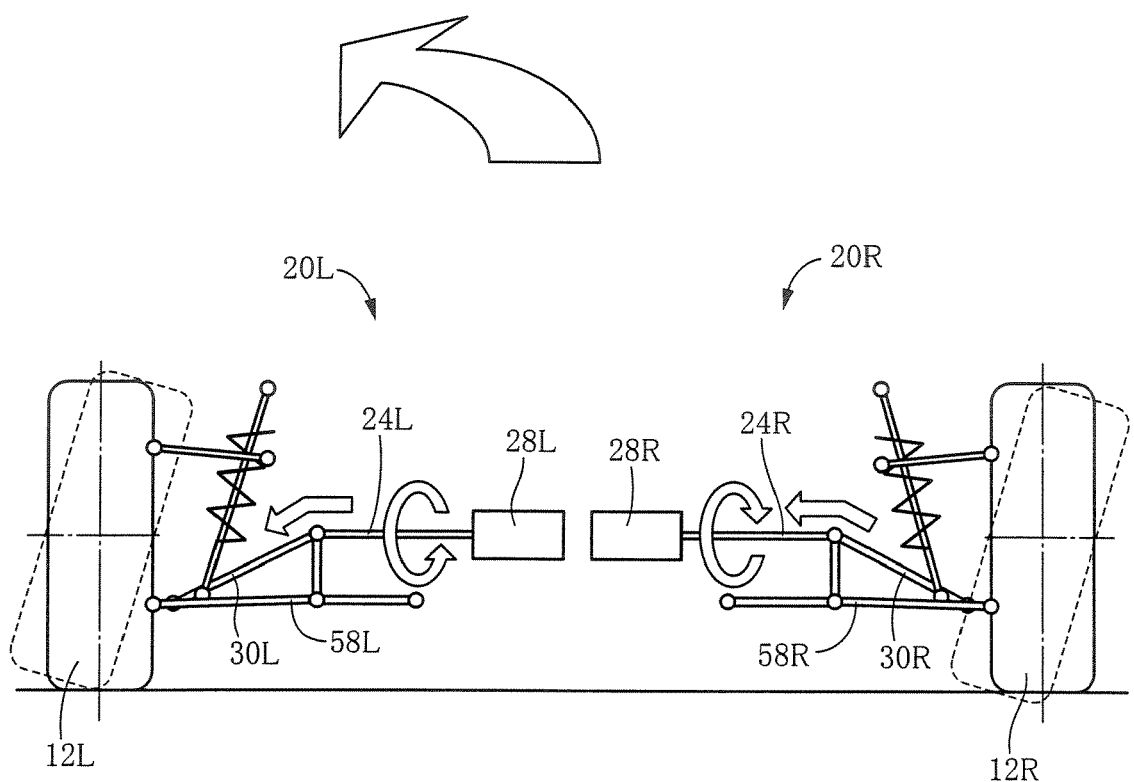
FIG. 11 is a view showing directions of the rotational and axial forces applied to the shaft of each of the right-side and left-side wheel-body distance adjuster devices and also a direction of change in the camber angle of each rear wheel when the turning assist control is executed during the left turn of the vehicle.

FIGS. 10 and 11 shows change of each wheel of the vehicle when the turning assist control is executed during left turn of the vehicle. FIG. 10 shows directions of the rotational and axial forces applied to the shaft 24 of each of the adjuster devices 20 and also a direction of change in the toe angle of each rear wheel 12, while FIG. 11 shows the directions of the rotational and axial forces applied to the shaft 24 of each of the adjuster devices 20 and also a direction of change in the camber angle of each rear wheel 12. As is apparent from FIGS. 10 and 11, during left turn of the vehicle, with the axial force applied to the shaft 24 of the adjuster devices 20, the toe angle of the rear right wheel 12R is changed in an outward direction thereof (that causes front and rear portions of the wheel to be displaced outwardly and inwardly in the lateral direction of the vehicle, respectively), the toe angle of the rear left wheel 12L is changed in an inward direction thereof (that causes the front and rear portions of the wheel to be displaced inwardly and outwardly in the lateral direction of the vehicle, respectively), the camber angle of the rear right wheel 12R is changed in a positive direction thereof (that causes upper and lower portions of the wheel to be displaced outwardly and inwardly in the lateral direction of the vehicle, respectively), and the camber angle of the rear left wheel 12L is changed in a negative direction thereof (that causes the upper and lower portions of the wheel to be displaced inwardly and outwardly in the lateral direction of the vehicle, respectively). It is noted that, during right turn of the vehicle, the toe and camber angles of each rear wheel 12 are changed in respective directions each opposite to that during left turn of the vehicle, whereby the oversteer tendency is increased also during right turn of the vehicle.

(v) Vehicle-Height Adjustment Control

The pair of adjuster devices 20 are operable, under control of the adjuster ECU 140, to selectively increase and reduce both of the rear right wheel-body distance and the rear left wheel-body distance. That is, the adjuster devices 20 are capable of generating forces by which positions of the rear right and left wheels 12 relative to the vehicle body are displaced in respective directions that are same to each other. In the vehicle on which the present adjusting system 10 is installed, front seats are located generally on an upper side of an intermediate position between the front wheels 14 and the rear wheels 12, rear seats are located generally on an upper side of the rear wheels 12, and a luggage room is located generally on an upper rear side of the rear wheels 12. Due to such locational relationships among the front and rear seats, luggage room and front and rear wheels 14, 12, the vehicle body is not substantially inclined in a pitch or longitudinal direction of the vehicle when a passenger rides on or gets off either one of the front seats of the vehicle. However, the vehicle body is inclined forwardly or rearwardly in the longitudinal direction when a passenger rides on or gets off either one of the rear seats of the vehicle or when luggage is introduced into or taken out from the luggage room, resulting in considerable change in the rear right wheel-body distance or rear left wheel-body distance. In view of this, for the purpose of coping with the inclination of the vehicle body in the longitudinal direction, the present adjusting system 10 executes a vehicle-height adjustment control for adjusting the height of a rear portion of the vehicle, by controlling the adjuster devices 20 such that positions of the rear right and left wheels relative to the vehicle body are displaced in same direction. Described specifically, when there is change in weights of luggage and passenger loaded on the vehicle, the adjuster devices 20 are controlled to generate respective forces for increasing or reducing both of the rear right wheel-body distance and the rear left wheel-body distance, for thereby restraining or reducing the forward or rearward inclination of the vehicle body. In this instance, a magnitude of each of the forces generated by the adjuster devices 20 is dependent on a difference between the height of the rear portion of the vehicle (hereinafter referred to as "rear wheel-body distance" where appropriate) and the height of a front portion of the vehicle (hereinafter referred to as "front wheel-body distance", where appropriate).

Figure 12:
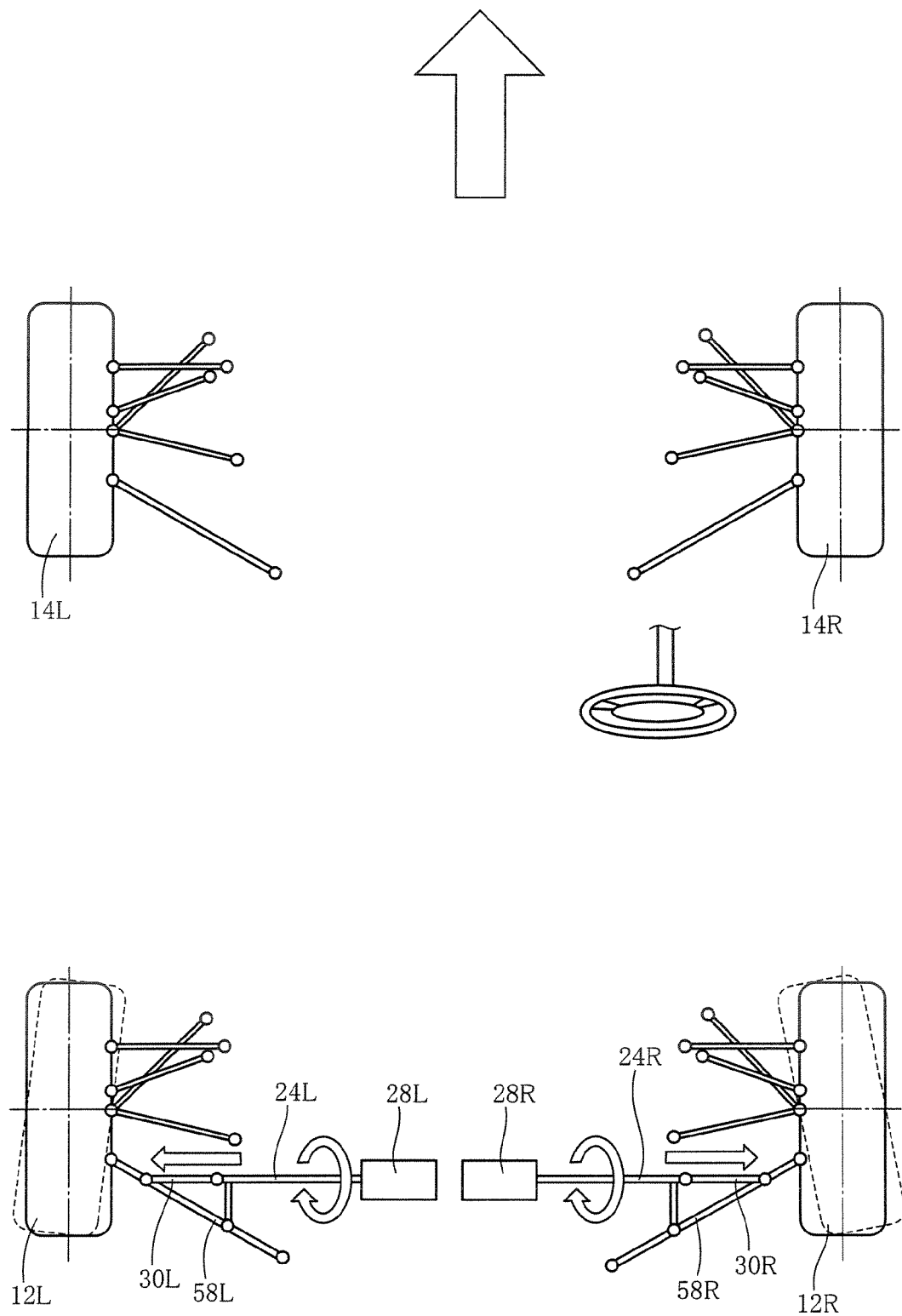
FIG. 12 is a view showing directions of the rotational and axial forces applied to the shaft of each of the right-side and left-side wheel-body distance adjuster devices and also a direction of change in the toe angle of each rear wheel when a vehicle-height adjustment control is executed during straight running of the vehicle.
Figure 13:
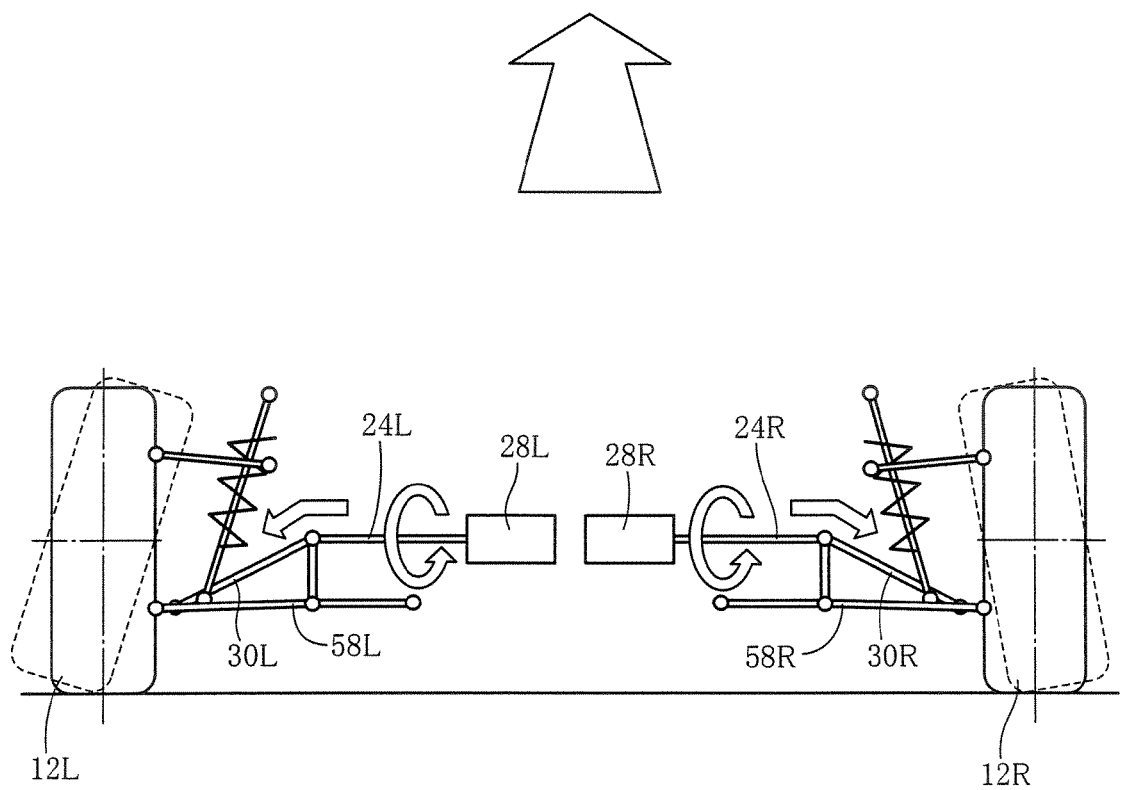
FIG. 13 is a view showing directions of the rotational and axial forces applied to the shaft of each of the right-side and left-side wheel-body distance adjuster devices and also a direction of change in the camber angle of each rear wheel when the vehicle-height adjustment control is executed during the straight running of the vehicle.

In the execution of the vehicle-height adjustment control, the rear wheel-body distance is adjusted by causing the forces (generated by the adjuster devices 20) to force the rear wheels 12 and the vehicle body away from each other, from a reference state in which the luggage weight and the passenger weight are supposedly minimized, so that the rear wheel-body distance is made larger than that in the reference state. That is, in the execution of the vehicle-height adjustment control, each of the forces generated by the adjuster devices 20 is directed in a rebound direction that causes the rear wheel-body distance to be increased. While the rear wheel-body distance is made larger than that in the reference state in the execution of the vehicle-height adjustment control, the alignment of each rear wheel 12 is changed, as shown in FIGS. 12 and 13. Specifically described, the toe angle and the camber angle of each of the rear right and left wheels 12R, 12L are changed in the inward direction and in the negative direction, respectively, with application of the axial force to each of the shafts 24R, 24L, whereby straight running stability of the vehicle can be increased.

[Control of Wheel-Body Distance Adjusting System]

(i) Outline of Control

As described above, in the present adjusting system 10, the pair of adjuster devices 20 and the stabilizer device 22 are controlled for executing the roll reduction control, the vehicle-height adjustment control and the turning assist control. It is therefore possible to execute a total adjusting control incorporating these three controls. In each of the adjuster devices 20 under the execution of the total adjusting control, the actuator 28 is controlled based on various factors such as the roll moment acting on the vehicle body, the difference between the rear wheel-body distance and the front wheel-body distance, and the operating amount of the steering operating member, such that the shaft 24 is rotated by a suitable amount, for thereby appropriately producing the force that changes a corresponding one of the rear right wheel-body distance and the rear left wheel-body distance. On the other hand, in the stabilizer device 22 under the execution of the total adjusting control, the actuator 40 is controlled based on various factors such as the roll moment acting on the vehicle body and the operating amount of the steering operating member, such that the stabilizer bar members 38 are rotated relative to each other by a suitable amount, for thereby appropriately producing the force that changes the front right wheel-body distance and the front left wheel-body distance. Since the amount of rotation of the shaft 24 of each adjuster device 20 is dependent on the angular position of the electric motor 82, the motor 82 is controlled in the execution of the adjusting control such that an actual angular position of the motor 82 is substantially equalized to a target angular position which is predetermined according to a desired magnitude of the generated force. Similarly, since the amount of relative rotation of the stabilizer bar members 38 of the stabilizer device 22 is dependent on the angular position of the electric motor 132, the motor 132 is controlled in the execution of the adjusting control such that an actual angular position of the motor 132 is substantially equalized to a target angular position which is predetermined according to a desired magnitude of the generated force. The forces for changing the rear right, rear left, front right and front left wheel-body distances are dependent on the direction and magnitude of the rotational forces produced by the motors 82, 132, i.e., an amount of the electric power supplied to the motors 82, 132. Therefore, each of the motors 82, 132 is controlled with the electric power being supplied by an appropriate amount.

In the present adjusting control, the above-described target angular position $\theta^*$ of each of the motors 82, 132 is determined based on a roll-reduction component $\theta^*_R$ of the target angular position, a turning-assist component $\theta^*_S$ of the target angular position and a vehicle-height-adjustment component $\theta^*_H$ of the target angular position, which are target angular-position components directed to the respective roll reduction, turning assist and vehicle-height adjustment controls. That is, the target angular-position components are determined individually from each other, and then the target angular position $\theta^*$ of each of the motors 82, 132 is determined based on the determined target angular-position components.

In the following description, the angular position $\theta$ of each of the electric motors 82, 132 represents an angular amount (that is an accumulated value and accordingly can exceed 360°) by which each of the motors 82, 132 is deviated from its reference angular position ($\theta=0°$) in a reference state in which the vehicle is stationary on a flat road. In the motor 82 of each adjuster device 20, a positive (+) value of the angular position $\theta_A$ means that the motor 82 is rotated from the reference angular position in a direction that increases the wheel-body distance, while a negative (−) value of the angular position $\theta_A$ means that the motor 82 is rotated from the reference angular position in the direction that reduces the wheel-body distance. In the motor 132 of the stabilizer device 22, a positive (+) value of the angular position $\theta_S$ means that the motor 132 is rotated from the reference angular position in a direction that reduces the front right wheel-body distance and increases the front left wheel-body distance, while a negative (−) value of the angular position $\theta_S$ means that the motor 132 is rotated from the reference angular position in a direction that increases the front right wheel-body distance and reduces the front left wheel-body distance.

(ii) Determination of Roll-Reduction Component

In the roll reduction control, the roll-reduction component $\theta^*_R$ of the target angular position of each of the motors 82, 132 of the two adjuster devices 20 and the stabilizer device 22 is determined based on the lateral acceleration serving as an index of the roll moment acting on the vehicle body. Described in detail, a parameter value Gy* of the lateral acceleration (that is used as a parameter in the control) is determined, on the basis of an estimated value Gyc of the lateral acceleration estimated based on the operating angle δ of the steering wheel and the running speed V of the vehicle and also a measured value Gyr of the lateral acceleration, and according to the following expression:

$$Gy^* = K_A \cdot Gyc + K_B \cdot Gyr \tag{1}$$

where "$K_A$", "$K_B$" represents gains.

Figure 14A:
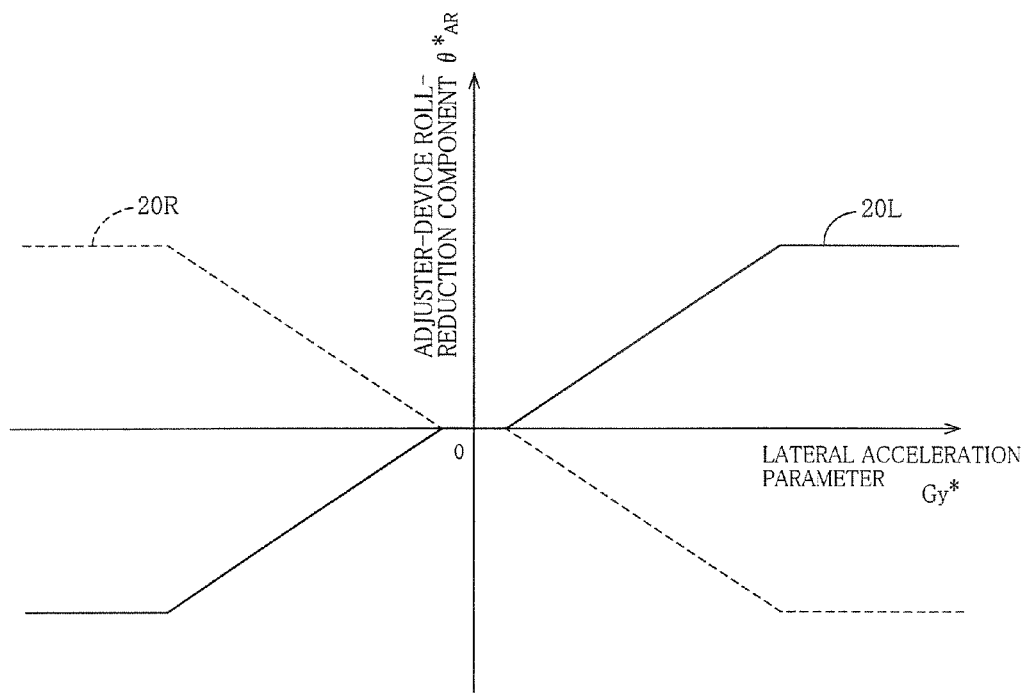
FIG. 14A is a data map representative of a relationship between a lateral acceleration parameter value Gy* and a roll-reduction component $\theta_{AR}$ of a target angular position of a motor in the wheel-body distance adjuster device.
Figure 14B:
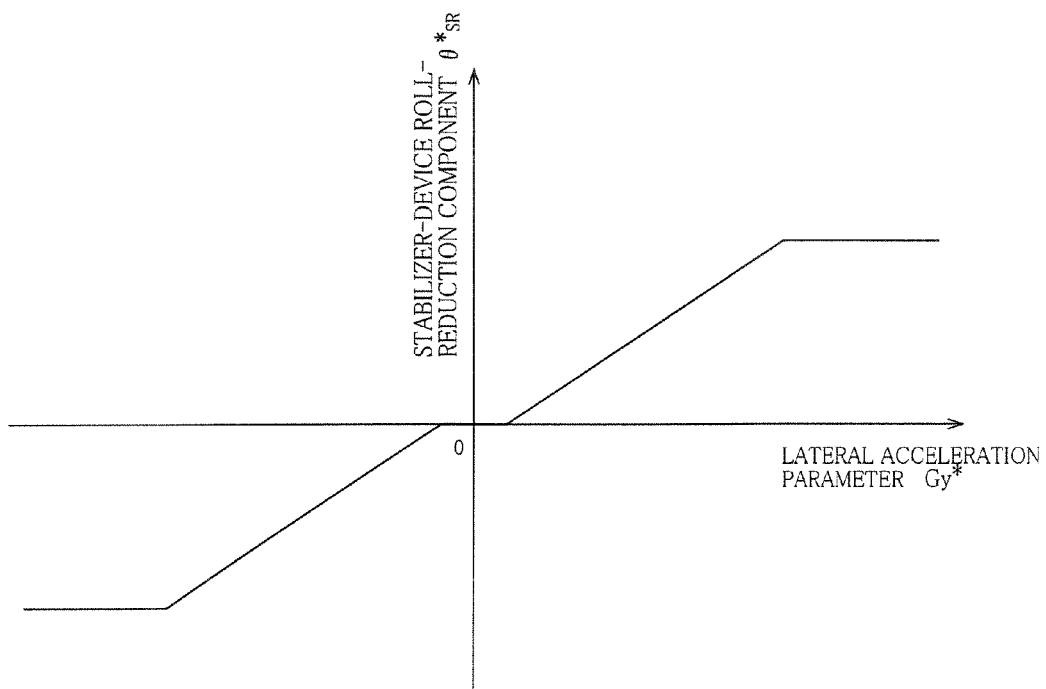
FIG. 14B is a data map representative of a relationship between the lateral acceleration parameter value Gy* and a roll-reduction component $\theta^*_{SR}$ of a target angular position of a motor in the stabilizer device.

The roll-reduction component $\theta^*_R$ of the target angular position is determined based on the lateral acceleration parameter value Gy* that is determined as described above. The adjuster ECU 140 stores a data map indicative of relationship between the roll-reduction component $\theta^*_{AR}$ of the target angular position of the motor 82 of each adjuster device 20 and the lateral acceleration parameter value Gy*, so that the roll-reduction component $\theta^*_{AR}$ can be determined with reference to the data map, which is conceptually shown in FIG. 14A. In FIG. 14A, solid line corresponds to the adjuster device 20L provided in the rear left wheel 12L, while broken line corresponds to the adjuster device 20R provided in the rear right wheel 12R. The stabilizer ECU 142 stores a data map indicative of relationship between the roll-reduction component $\theta^*_{SR}$ of the target angular position of the motor 132 of the stabilizer device 22 and the lateral acceleration parameter value Gy*, so that the roll-reduction component $\theta^*_{SR}$ can be determined with reference to the data map, which is conceptually shown in FIG. 14B. It is noted that the lateral acceleration parameter value Gy* is positive when the vehicle turns right, and is negative when the vehicle turns left.

(iii) Determination of Vehicle-Height Adjustment Component

Figure 15:
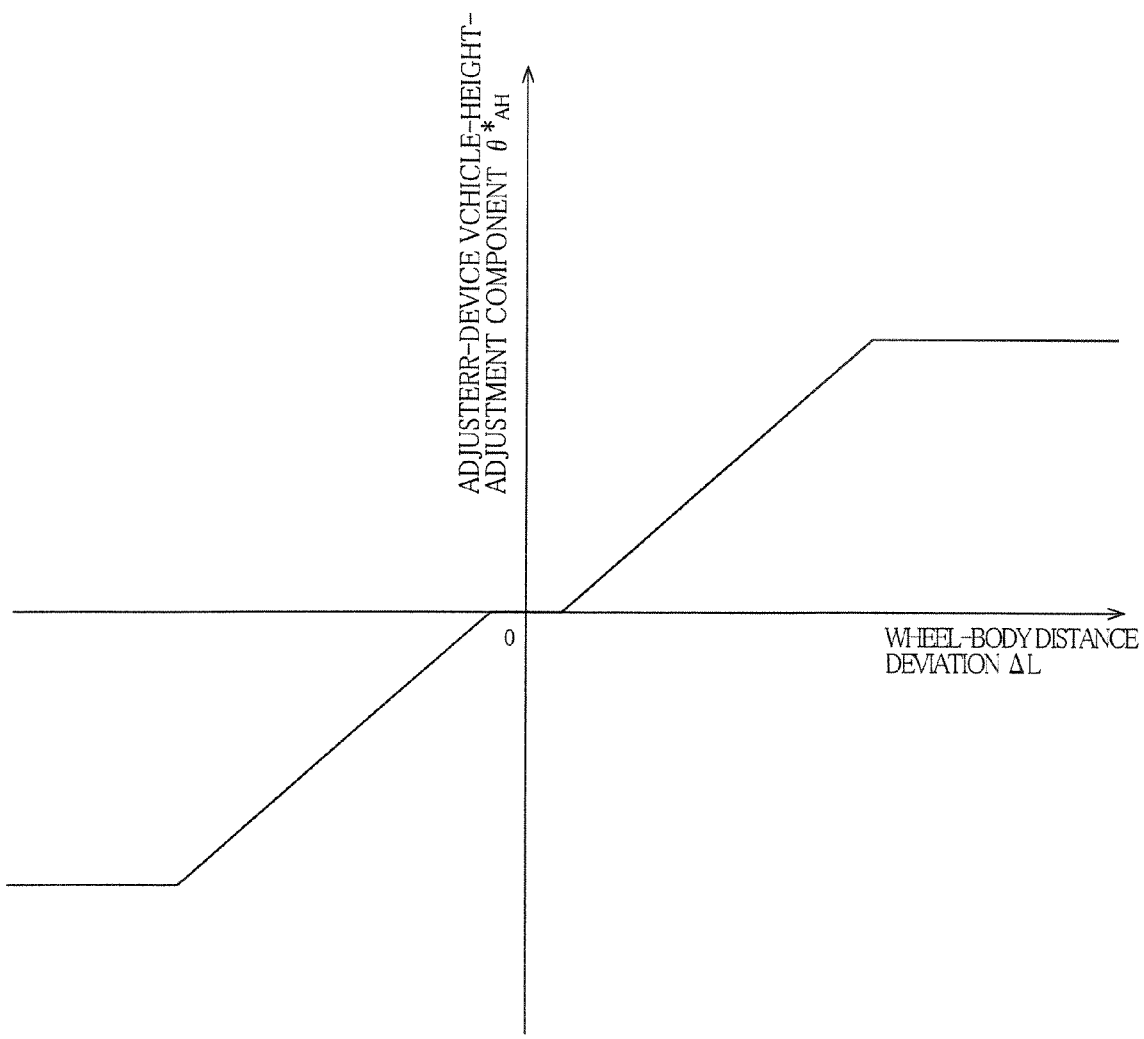
FIG. 15 is a data map representative of a relationship between a wheel-body distance deviation ΔL and a vehicle-height-adjustment component $\theta^*_{AH}$ of the target angular position of the motor in the wheel-body distance adjuster device.

In the vehicle-height adjustment control, the vehicle-height-adjustment component $\theta^*_{AH}$ of the target angular position of the motor 82 of each adjuster device 20 is determined based on the difference between the rear wheel-body distance and the front wheel-body distance. Described in detail, the rear right, rear left, front right and front left wheel-body distances are detected as actual distances L by the respective stroke sensors 170, and a deviation ΔL of each of the actual rear right and left wheel-body distances L from an average L* of the actual front right and left wheel-body distances L is calculated. The vehicle-height-adjustment component $\theta^*_{AH}$ of the target angular position of the motor 82 of each adjuster device 20 is determined based on the deviation ΔL of a corresponding one of the actual rear right and left wheel-body distances L. The adjuster ECU 140 stores a data map indicative of relationship between the vehicle-height-adjustment component $\theta^*_{AH}$ of the target angular position and the distance deviation ΔL, which is conceptually shown in FIG. 15, so that the vehicle-height-adjustment component $\theta^*_{AH}$ can be determined with reference to the data map.

While the posture of the vehicle body is being changed, for example, by a roll or pitch of the vehicle body, it is difficult to accurately detect change in the posture of the vehicle body caused by change in the luggage weight and the passenger weight. In the present adjusting system 10, therefore, the vehicle-height adjustment control is executed such that the rear wheel-body distance is allowed to be changed by the vehicle-height adjustment control only when the posture of the vehicle body is not being changed. Specifically described, the vehicle-height adjustment control is executed with a condition that the above-described distance deviation ΔL is not changed for a predetermined length of time, namely, the distance deviation ΔL is maintained for the predetermined length of time. If the condition is satisfied, the vehicle-height-adjustment component $\theta^*_{AH}$ is changed. If the condition is not satisfied, the vehicle-height-adjustment component $\theta^*_{AH}$ remains as it is at the moment.

(iv) Determination of Turning Assist Component of Target Angular Position

In the vehicle-height adjustment control, the turning-assist component $\theta^*_S$ of the target angular position of each of the motors 82, 132 of the two adjuster devices 20 and the stabilizer device 22 is determined based on the operating amount of the steering operating member and the running speed of the vehicle. Described in detail, a basic turning-assist component $\theta c_S$ of the target angular position of each of the motors 82, 132 of the two adjuster devices 20 and the stabilizer device 22 is first determined based on the operating angle δ of the steering wheel. Specifically, the adjuster ECU 140 stores a data map indicative of relationship between the basic turning-assist component $\theta c_{AS}$ of the target angular position of the motor 82 of each adjuster devices 20 and the operating angle δ of the steering wheel, so that the basic turning-assist component $\theta c_{AS}$ can be determined with reference to the data map, which is conceptually shown in FIG. 16A. The stabilizer ECU 142 stores a data map indicative of relationship between the basic turning-assist component $\theta c_{SS}$ of the target angular position of the motor 132 of the stabilizer device 22 and the operating angle δ of the steering wheel, so that the basic turning-assist component $\theta c_{SS}$ can be determined with reference to the data map, which is conceptually shown in FIG. 16B.

Figure 16A:
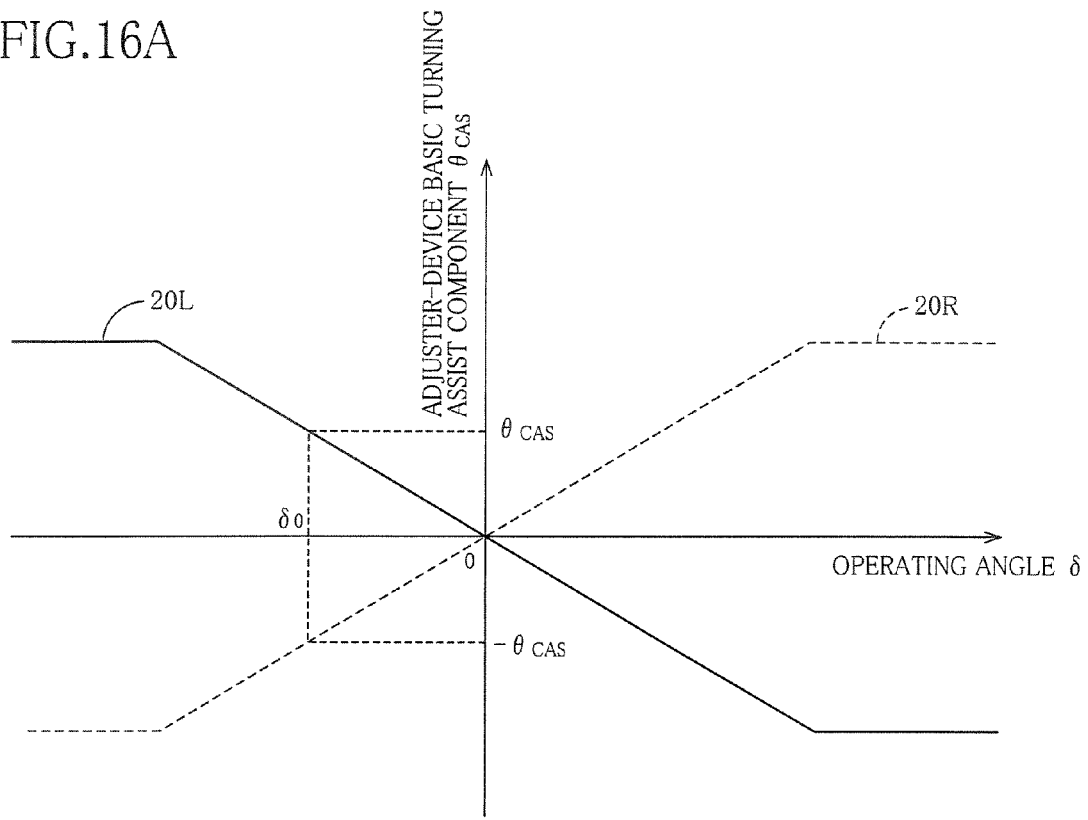
FIG. 16A is a data map representative of a relationship between an operating angle δ of a steering wheel and a basic turning assist component $\theta_{CAS}$ of the target angular position of the motor in the wheel-body distance adjuster device.

In FIG. 16A, solid line corresponds to the adjuster device 20L provided in the rear left wheel 12L, while broken line corresponds to the adjuster device 20R provided in the rear right wheel 12R. Generally, the operating angle δ of the steering wheel is positive when the vehicle turns right, and is negative when the vehicle turns left. For example, during a left turn of the vehicle, for increasing the oversteer tendency, the basic turning-assist component $\theta c_{AS}$ of the target angular position of the motor 82 of the adjuster device 20L (provided for the rear left wheel 12L) is determined based on the operating angle δ of the steering wheel such that the force generated by the adjuster device 20L is directed in the direction that increases the vertical distance between the rear left wheel 12L as the inside wheel and the vehicle body, while the basic turning-assist component $\theta c_{AS}$ of the target angular position of the motor 82 of the adjuster device 20R (provided for the rear right wheel 12R) is determined based on the operating angle δ of the steering wheel such that the force generated by the adjuster device 20R is directed in the direction that reduces the vertical distance between the rear right wheel 12R as the outside wheel and the vehicle body.

Figure 16B:
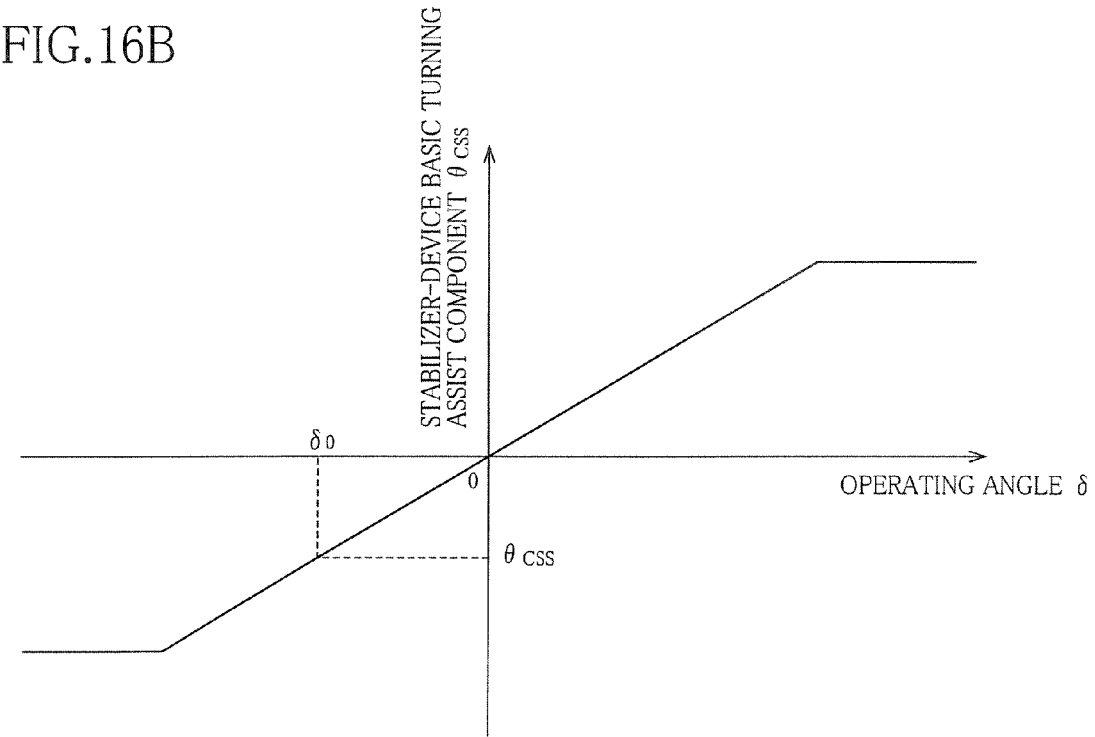
FIG. 16B is a data map representative of a relationship between the operating angle δ of the steering wheel and a basic turning assist component $\theta_{CSS}$ of the target angular position of the motor in stabilizer device.

When the pair of adjuster devices 20 generate the respective forces that change the respective wheel-body distances, the basic turning-assist component $\theta c_{SS}$ of the target angular position of the motor 132 of the stabilizer device 22 (provided for the front wheels 14) is determined based on the operating angle δ of the steering wheel, as shown in FIG. 16B, such that the force generated by the stabilizer device 22 is directed in the direction which reduces the vertical distance between the front left wheel 14L as the inside wheel and the vehicle body and which increases the vertical distance between the front right wheel 14R as the outside wheel and the vehicle body, for resisting the forces generated by the adjuster devices 20R, 20L.

After the basic turning-assist component $\theta c_{AS}$ of the target angular position of each of the motors 82 of the adjuster devices 20 has been determined as described above, the turning-assist component $\theta^*_{AS}$ of the target angular position of each of the motors 82 of two adjuster devices 20 is determined on the basis of the determined basic turning-assist component $\theta c_{AS}$ and according to expression (2) given below. After the basic turning-assist component $\theta c_{SS}$ of the target angular position of the motor 132 of the stabilizer device 22 has been determined as described above, the turning-assist component $\theta^*_{SS}$ of the target angular position of the motor 132 of the stabilizer device 22 is determined on the basis of the determined basic turning-assist component $\theta c_{SS}$ and according to expression (3) given below.

$$\theta^*_{AS} = K_v \cdot \theta c_{AS} \quad (2)$$

$$\theta^*_{SS} = K_v \cdot \theta c_{SS} \quad (3)$$

Figure 17:
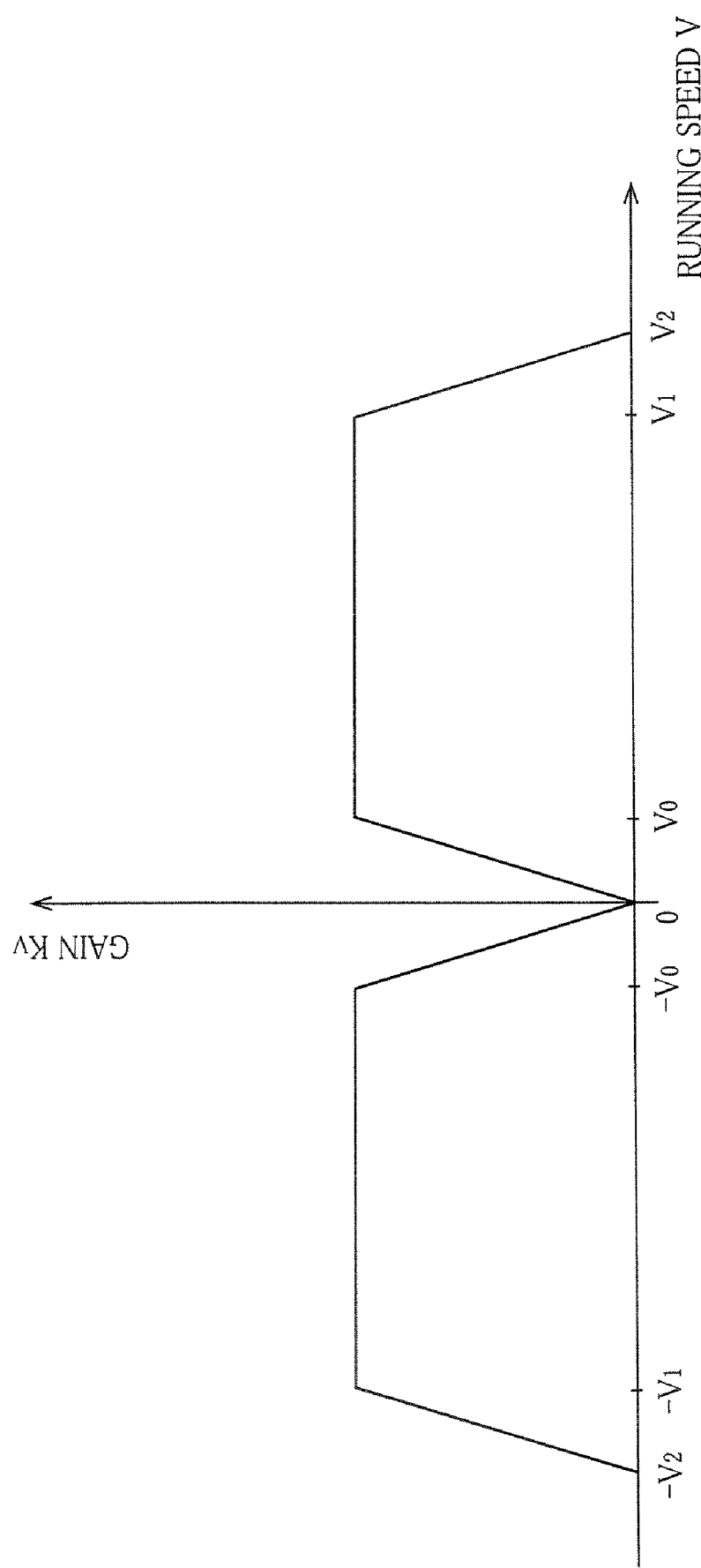
FIG. 17 is a view showing a relationship between a vehicle running speed V and a gain Kv that is dependent on the running speed V.

In the above expressions (2) and (3), Kv represents a gain that is dependent of the vehicle running speed V. As shown in FIG. 17, the gain Kv is increased at a high rate while an absolute value of the vehicle running speed is not lower than 0 (zero) and lower than $V_0$, is held constant while the absolute value of the vehicle running speed is not lower than $V_0$ and lower than $V_1$, is reduced at a high rate while the absolute value of the vehicle running speed is not lower than $V_1$ and lower than $V_2$, and is 0 (zero) while the absolute value of the vehicle running speed is not lower than $V_2$. That is, in the present stabilizing system 10, the turning assist control is executed only in a situation, as the above-described particular situation, in which the vehicle is substantially running at a relatively low speed.

(v) Determination of Target Angular Position of Motor

The target angular position $\theta^*$ of each of the motors 82, 132 of the adjuster devices 20 and the stabilizer device 22 is determined based on the roll-reduction component $\theta^*_R$, turning-assist component $\theta^*_S$ and vehicle-height-adjustment component $\theta^*_H$ of the target angular position, which are determined as described above. Specifically, the target angular position $\theta^*_A$ of each of the motors 82 of the adjuster devices 20 is determined according to expression (4) given below, while the target angular position $\theta^*_S$ of the motor 132 of the stabilizer devices 22 is determined according to expression (5) given below.

$$\theta^*_A = \theta^*_{AR} + \theta^*_{AS} + \theta^*_{AH} \quad (4)$$

$$\theta^*_S = \theta^*_{SR} + \theta^*_{SS} \quad (5)$$

(iv) Determination of Electric Power Supplied to Motor

In control of each of the motors 82, 132, which is made generally based on the target angular position θ* of the motor, the electric power that is to be supplied to the motor is determined as described below. Since a target electric current $i^*_A$ that is to be supplied to each of the motors 82 of the adjuster devices 20 and a target electric current $i^*_S$ that is to be supplied to the motor 132 of the stabilizer devices 22 are determined in substantially the same manner, the following description is made with respect to a target electric current i* that is generic to the target electric current $i^*_A$ and the target electric current $i^*_S$.

The target electric current i* is determined based on the target angular position θ* of the motor and also a deviation Δθ (=θ*−θ) of an actual angular position θ of the motor from the target angular position θ* of the motor. The determination of the supplied electric power is determined based on the angular position deviation Δθ obtained by comparing the target angular position θ* with the actual angular position θ that is fed back from the angular position sensor 106 that is provided in the motor. Specifically, the target electric current i* is determined according to expression (6) given below.

$$i^* = K_1 \cdot \Delta\theta + K_2 \cdot Int(\Delta\theta) \quad (6)$$

A right side of the above expression (6), which is according to a PI control rule, consists of two terms, i.e., a first term and a second term that are a proportional term and an integral term, respectively. "$K_1$", "$K_2$" represent first and second gains, respectively. "Int (Δθ)" represents an integral value of the angular position deviation Δθ.

[Adjusting Control Program]

Figure 18:
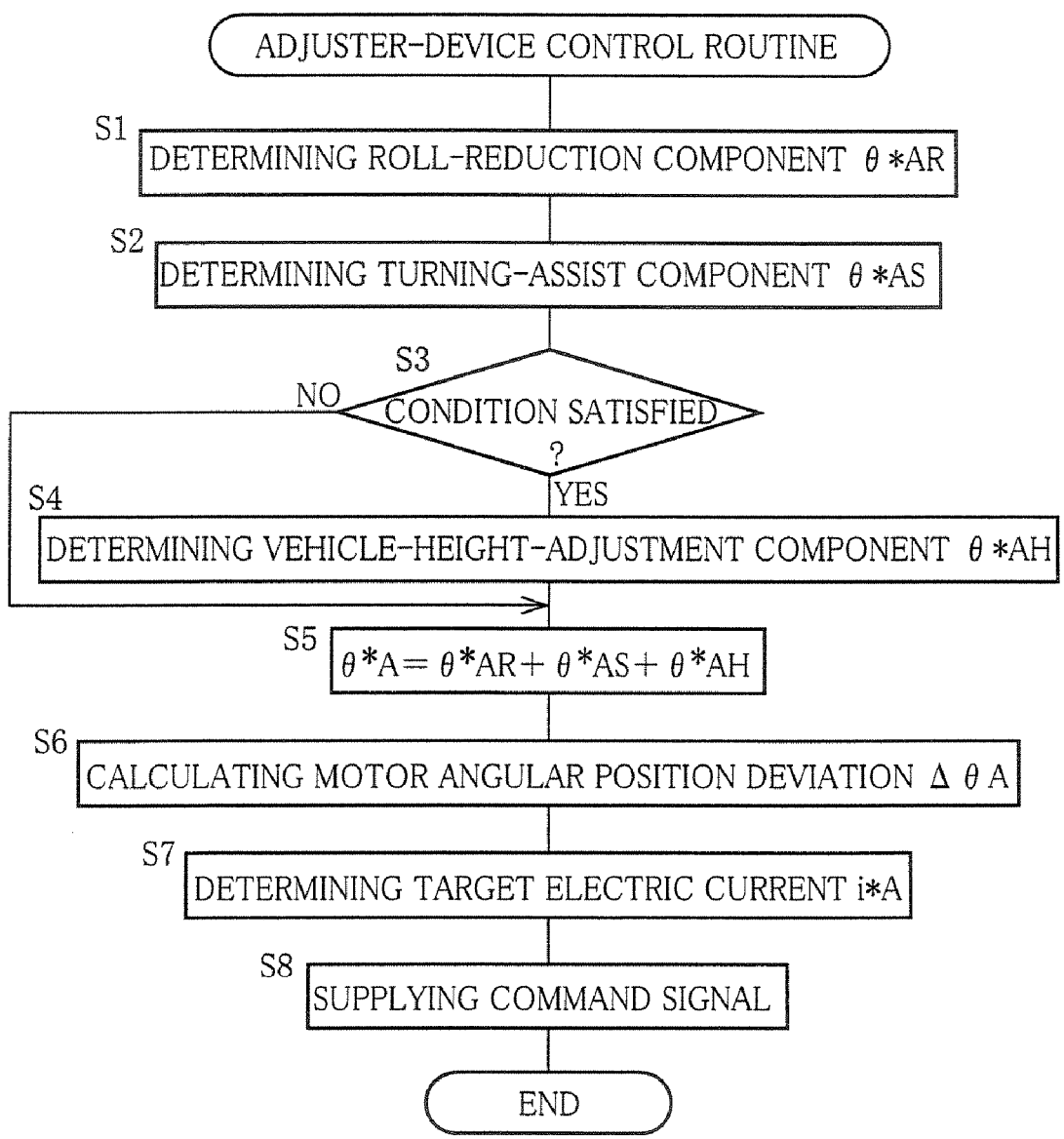
FIG. 18 is a flow chart showing an adjuster device control routine program that is executed in the wheel-body distance adjusting system of FIG. 1.
Figure 19:
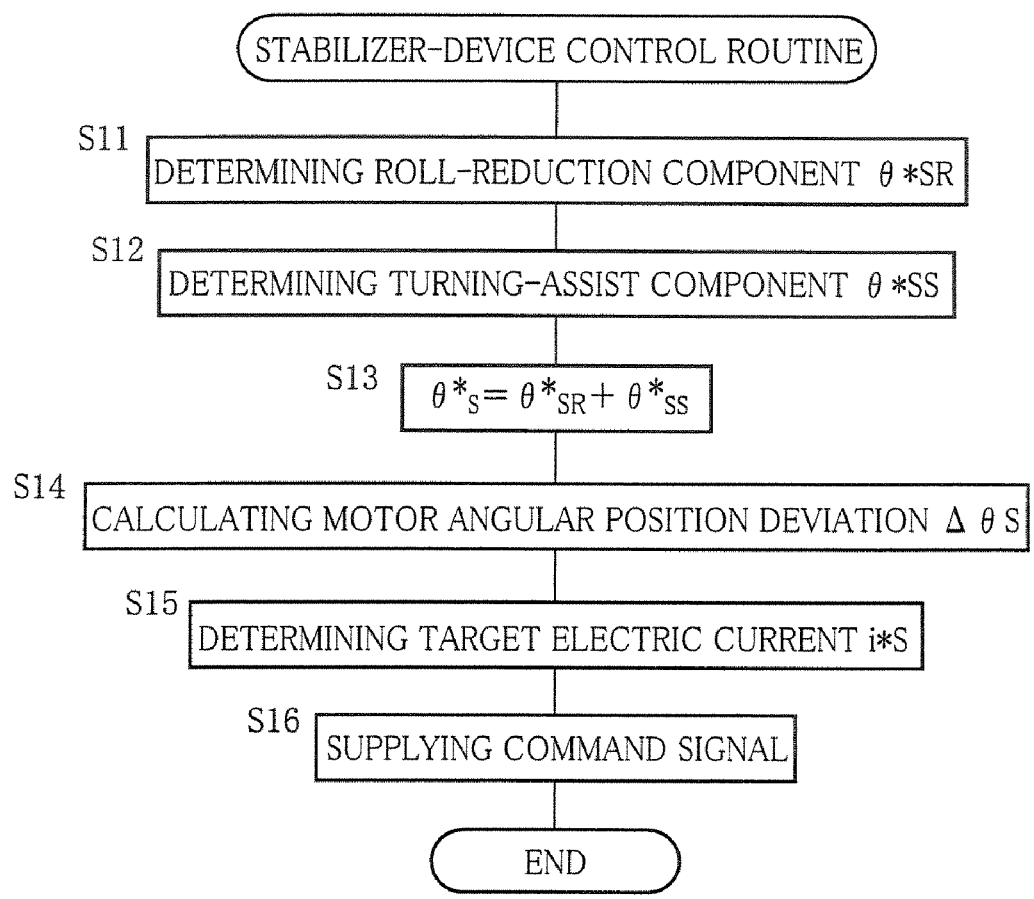
FIG. 19 is a flow chart showing a stabilizer-device control routine program that is executed in the wheel-body distance adjusting system of FIG. 1.

The above-described total adjusting control is executed by the rear-wheel controller 146 and the front-wheel controller 150, in accordance with an adjuster-device control routine program and a stabilizer-device control routine program that are illustrated in respective flow charts of FIGS. 18 and 19. The adjuster-device control routine program is repeatedly executed by the rear-wheel controller 146 at a short time interval (e.g., several tens of milliseconds) during ON state of an ignition switch of the vehicle. Meanwhile, the stabilizer-device control routine program is repeatedly executed by the front-wheel controller 150 at a short time interval (e.g., several tens of milliseconds) during ON state of the ignition switch of the vehicle. Hereinafter, the adjuster-device control routine program and the stabilizer-device control routine program will be described in detail by reference to respective flows chart of FIGS. 18 and 19.

(i) Adjuster-Device Control Routine Program

The adjuster-device control routine program is executed for each of the actuators 28 of the respective two adjuster devices 20. In the following description as to the adjuster-device control routine program, there will be described a procedure made for one of the actuators 28 in execution of the routine program, for simplifying the description.

The adjuster-device control routine program of FIG. 18 is initiated with step S1 of determining the roll-reduction component $\theta^*_{AR}$ of the target angular position $\theta^*_A$ of the motor 82 of the actuator 28, based on the lateral acceleration, for executing the roll reduction control. Step S1 is followed by step S2 that is implemented to determine the turning-assist component $\theta^*_{AS}$ of the target angular position $\theta^*_A$ of the motor 82 based on the operating angle of the steering wheel and the vehicle running speed, for executing the turning assist control. Then, step S3 is implemented to determine whether the above-described condition (for allowing the rear wheel-body distance to be changed by the vehicle-height adjustment control) is satisfied or not. If the above-described condition is satisfied, namely, if the above-described wheel-body distance deviation ΔL is not changed for the predetermined length of time, an affirmative decision (YES) is obtained in step S3, whereby the control flow goes to step S4 in which the vehicle-height-adjustment component $\theta^*_{AH}$ of the target angular position $\theta^*_A$ of the motor 82 is determined based on the wheel-body distance deviation ΔL. If the above-described condition is not satisfied, step S4 is skipped so that the vehicle-height-adjustment component $\theta^*_{AH}$ remains as it is at the moment.

Then, step S5 is implemented to determine the target angular position $\theta^*_A$ of the motor 82 of the actuator 28 of the adjuster device 20 that is defined as a sum of the roll-reduction component $\theta^*_{AR}$, the turning-assist component $\theta^*_{AS}$ and the vehicle-height-adjustment component $\theta^*_{AH}$. Then, in step S6, the angular position deviation $\Delta\theta_A$ of the motor 82 is calculated based on the target angular position $\theta^*_A$ and the actual angular position $\theta_A$ of the motor 82. Step S6 is followed by step S7 in which the target electric current $i^*_A$ is determined according to the above expression (6). One cycle of execution of the adjuster-device control routine of FIG. 18 is completed with step S8 in which a command formulated based on the determined target electric current $i^*_A$ is supplied to the inverter 144.

(ii) Stabilizer-Device Control Routine Program

The stabilizer-device control routine program of FIG. 19 is initiated with step S11 of determining the roll-reduction component $\theta^*_{SR}$ of the target angular position $\theta^*_S$ of the motor 132 of the actuator 40, based on the lateral acceleration, for executing the roll reduction control. Step S11 is followed by step S12 that is implemented to determine the turning-assist component $\theta^*_{SS}$ of the target angular position $\theta^*_S$ of the motor 132 based on the operating angle of the steering wheel and the vehicle running speed, for executing the turning assist control. Then, step S13 is implemented to determine the target angular position $\theta^*_S$ of the motor 132 of the actuator 40 of the stabilizer device 22 that is defined as a sum of the roll-reduction component $\theta^*_{SR}$ and the turning-assist component $\theta^*_{SS}$. Then, in step S14, the angular position deviation $\Delta\theta_S$ of the motor 132 is calculated based on the target angular position $\theta^*_S$ and the actual angular position $\theta_S$ of the motor 132. Step S15 is followed by step S14 in which the target electric current $i^*_S$ is determined according to the above expression (6). One cycle of execution of the stabilizer-device control routine of FIG. 19 is completed with step S16 in which a command formulated based on the determined target electric current $i^*_S$ is supplied to the inverter 148.

[Construction of Controller]

The rear-wheel controller 146 and the front-wheel controller 150 of the present adjusting system 10, which execute the adjuster-device control routine program and the stabilizer-device control routine program, can be considered to include functional portions as shown in FIG. 20, in view of the procedures in the execution of the control routine programs. Described specifically, the rear-wheel controller 146 includes: an adjuster-device roll-reduction component determiner 180, as a functional portion assigned to implement step S1, which is operable to determine the roll-reduction component $\theta^*_{AR}$; an adjuster turning-assist component determiner 182, as a functional portion assigned to implement step S2, which is operable to determine the turning-assist component $\theta^*_{AS}$; an adjuster vehicle-height-adjustment component determiner 184, as a functional portion assigned to implement step S4, which is operable to determine the vehicle-height-adjustment component $\theta^*_{AH}$; and an adjuster target electric current determiner 186, as a functional portion assigned to implement step S7, which is operable to determine the target electric current $i^*_A$. The front-wheel controller 150 includes: a stabilizer roll-reduction component determiner 190, as a functional portion assigned to implement step S11, which is operable to determine the roll-reduction component $\theta^*_{SR}$; a stabilizer turning-assist component determiner 192, as a functional portion assigned to implement step S12, which is operable to determine the turning-assist component $\theta^*_{SS}$; and a stabilizer target electric current determiner 196, as a functional portion assigned to implement step S15, which is operable to determine the target electric current $i^*_S$.

In the present adjusting system 10, the roll reduction control is executed by controlling the pair of adjuster devices 20 and the stabilizer device 22 based on the roll reduction components $\theta^*_{AR}$, $\theta^*_{SR}$ that are determined by the adjuster roll-reduction component determiner 180 and the stabilizer roll-reduction component determiner 190, respectively. The turning assist control is executed by controlling the pair of adjuster devices 20 and the stabilizer device 22 based on the turning-assist components $\theta^*_{AS}$, $\theta^*_{SS}$ that are determined by the adjuster turning-assist component determiner 182 and stabilizer turning-assist component determiner 192, respectively. The vehicle-height adjustment control is executed by controlling the pair of adjuster devices 20 based on the vehicle-height-adjustment component $\theta^*_{AH}$ that is determined by the adjuster vehicle-height-adjustment component determiner 184.

(B) Second Embodiment

[Construction of Wheel-Body Distance Adjusting System]

Referring next to FIGS. 21-27, there will be described a wheel-body distance adjusting system 200 that is constructed according to a second embodiment of the invention. The adjusting system 200 is different from the above-described adjusting system 10 in that a pitch reduction control can be executed (for reduction a pitch of the vehicle body that is caused by, for example, operations for braking and accelerating the vehicle), in addition to the above-described roll reduction control, turning assist control and vehicle-height adjustment control, and in that not only the rear wheel-body distance but also the front wheel-body distance can be changed in execution of the vehicle-height adjustment control. In the following description, the same reference signs as used in the first embodiment will be used to identify the functionally corresponding elements, and redundant description of these elements is not provided.

The present adjusting system 200 includes a pair of rear wheel-body distance adjuster devices 208 (hereinafter referred to as "rear adjuster devices", where appropriate) that are provided for the respective rear wheels 12 and a pair of front wheel-body distance adjuster devices 210 (hereinafter referred to as "front adjuster devices", where appropriate) that are provided for the respective front wheels 14. The rear adjuster devices 208 are identical in construction with the adjuster devices 20 of the above-described adjusting system 10, so that each of the rear adjuster devices 208 is connected to the second lower arm 58 via the link rod 32 and the tie rod 30. It is noted that, in this second embodiment, the rear adjuster devices 208 correspond to the first adjuster devices while the front adjuster devices 210 correspond to a pair of right-side and left-side units of the second adjuster device.

Figure 22:
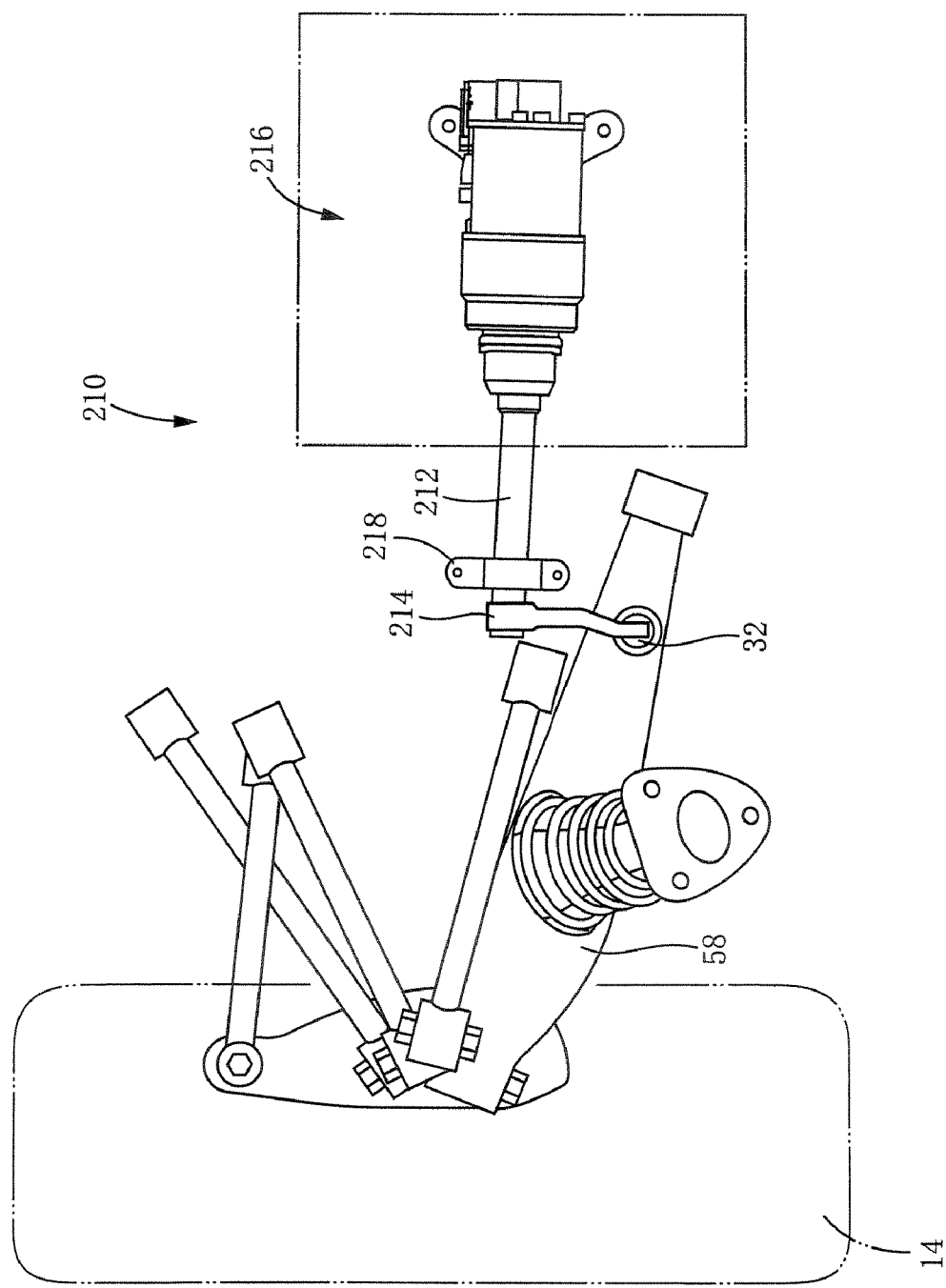
FIG. 22 is a view schematically showing a front-side wheel-body distance adjuster device included in the adjusting system of FIG. 21, and a suspension device connected to the adjuster device.

Each of the front adjuster devices 210 includes: a shaft 212; an arm 214 which is connected to the shaft 212 and which extends from the shaft 212 in a direction intersecting an axial direction of the shaft 212; and an actuator 216 which is attached to a substantially central portion of the vehicle body in the lateral direction of the vehicle and which is operable to actuate or rotate the shaft 212 about it axis, as shown in FIG. 22. The shaft 212 is held by the actuator 216 and a retainer 218 that are fixed to the vehicle body, so as to be rotatable about its axis relative to the vehicle body and unmovable in its axial direction relative to the vehicle body. The shaft 212 is serrated on the outer circumferential surface of its wheel-side end portion, so as to be held in engagement with an inner circumferential surface of a hole formed in the proximal end portion of the arm 214 that is also serrated. Owing to the serration engagement, the shaft 212 and the arm 214 are connected to each other, such that the arm 214 is unrotatable about the axis of the shaft 212 relative to the shaft 212 and unmovable in the axial direction of the shaft 212 relative to the shaft 212. The arm 214 is connected at its distal end portion to the second lower arm 58 through the link rod 32.

Figure 23:
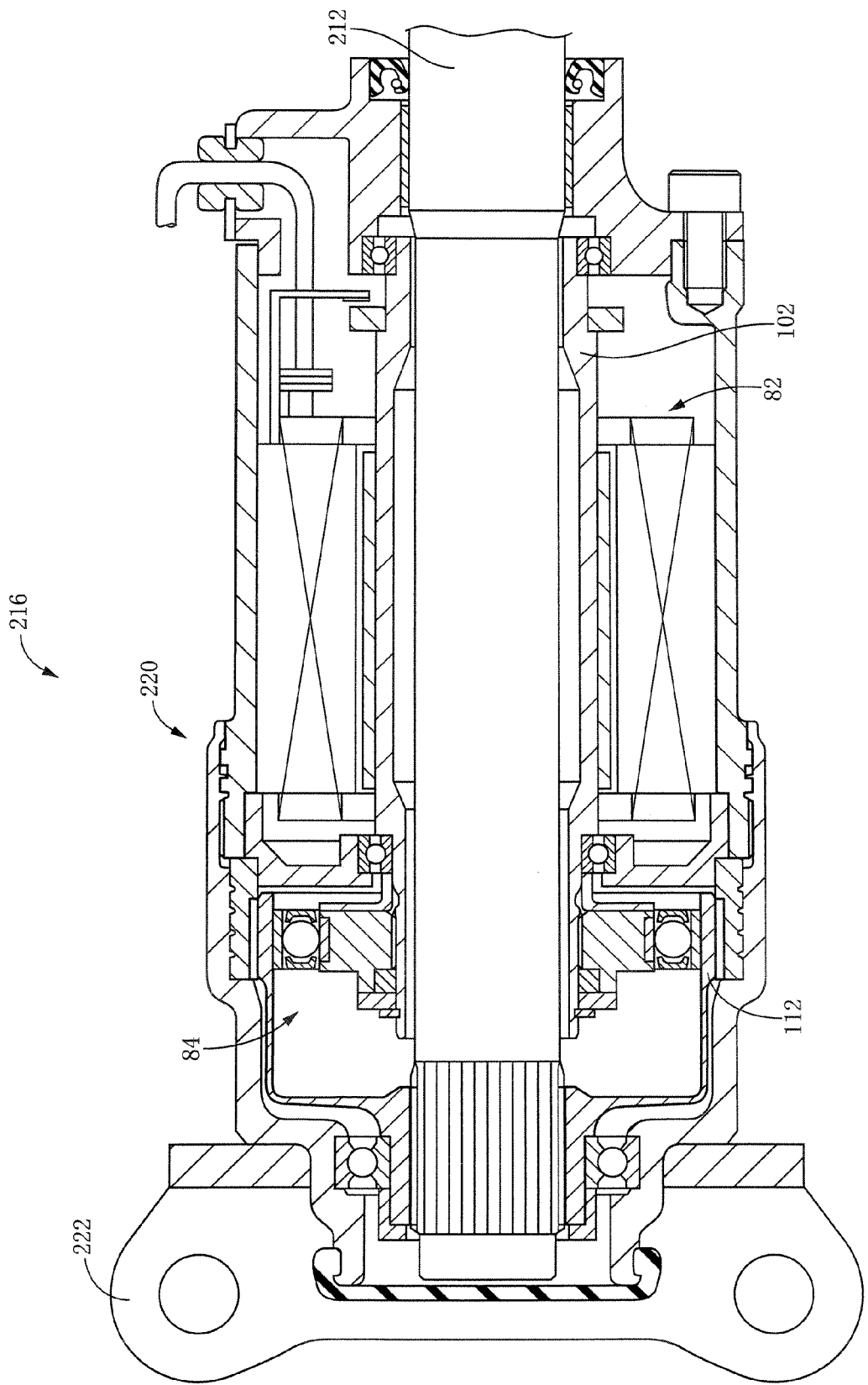
FIG. 23 is a view, partially in cross section, showing an actuator as a component of the front-side wheel-body distance adjuster device of FIG. 22.

As shown in FIG. 23, the actuator 216 of the front adjuster device 210 includes the electric motor 82 and the speed reducer 84, as the actuator 28 of the rear adjuster device 208. The electric motor 82 and the speed reducer 84 are disposed within a generally cylindrical-shaped housing 220 that is also included in the actuator 216. The housing 220 is fixedly attached to the vehicle body through an attachment member 222 that is fixed to an end portion of the housing 220. The shaft 212 is arranged to extend throughout the hollow motor shaft 102 of the motor 82 and the housing 220 and project out from another end portion of the housing 220. While extending through the hollow motor shaft 102 of the motor 82, the shaft 212 is connected, at its end portion that is located within the housing 220, to the speed reducer 84. The end portion of the shaft 212 is serrated on its outer circumferential surface, so as to be held in serration engagement with the inner circumferential surface of the hole formed through the bottom wall of the cup-shaped flexible gear 112 that is also serrated, whereby the shaft 212 and the flexible gear 112 as an output portion of the speed reducer 84 are connected to each other, unrotatably and axially unmovably relative to each other. Since the shaft 212 is axially unmovable relative to the vehicle body, each of the front adjuster devices 210 does not have a function of changing the alignment of the corresponding front wheel 14, unlike each of the rear adjuster devices 208.

In the present adjusting system 200, by controlling the pair of front adjuster devices 210, it is possible to increase and reduce one and the other of the vertical distance between the front right wheel 14R and the vehicle body and the vertical distance between the front left wheel 14L and the vehicle body, respectively, and also to increase or reduce both of the vertical distance between the front right wheel 14R and the vehicle body and the vertical distance between the front left wheel 14L and the vehicle body. That is, like the stabilizer device 22 of the above-described adjusting system 10, the front adjuster devices 210 cooperate to each other to serve as the wheel-body distance opposite adjuster device that is capable of displacing positions of the front right and left wheels 14 relative to the vehicle body in respective opposite directions. Further, unlike the stabilizer device 22, the front adjuster devices 210 are capable of displacing positions of the front right and left wheels 14 relative to the vehicle body in the same direction.

[Control of Wheel-Body Distance Adjusting System]

In the present adjusting system 200, the pair of rear distance adjuster devices 208 and the pair of front distance adjuster devices 210 are controlled for adjusting the rear right, rear left, front right and front left wheel-body distances.

In other words, each of the adjuster devices 208, 210 is capable of generating a force for changing a corresponding one of the wheel-body distances, and a magnitude of the generated force is changed by controlling the motor 82 of a corresponding one of the adjuster devices 208, 210. Therefore, in the present adjusting system 200, in addition to the above-described roll reduction control and turning assist control (that are executed as in the above-described adjusting system 10), the vehicle-height adjustment control is executed for adjusting the height of the vehicle to a level that is selected by a vehicle operator, and the turning assist control is executed for reducing a pitch of the vehicle body that is caused by, for example, acceleration and deceleration of the vehicle. That is, in the present adjusting system 200, it is possible to execute a total adjusting control incorporating these four controls. However, in this total adjusting control, the roll reduction control and the turning assist control are selectively executed based on the vehicle running speed. Specifically described, the roll reduction control is executed only when the running speed is not lower than a lower threshold value, and the turning assist control is lower than the lower threshold value, so that the understeer tendency as the turning characteristic and the roll of the vehicle body are maintained and reduced, respectively, during a turning of the vehicle at a high running speed, and so that the turning radius of the vehicle is reduced during a turning of the vehicle at a low running speed.

The adjusting system 200 is provided with a vehicle-height changing switch 226, which is operable by the vehicle operator to select one of a low-level mode and a high-level mode. While the low-level mode is being selected, the vehicle height is held in a predetermined standard level. While the high-level mode is being selected, the vehicle height is held in a higher level (higher than the standard level), for example, in case of running of the vehicle on a poorly conditioned road. In the vehicle-height adjustment control executed in the adjusting system 200, the height of the vehicle is adjusted or changed according to the mode established by operation of the vehicle-height changing switch 226.

Each rear wheel-body distance adjuster device 208 and each front wheel-body distance adjuster device 210 are different from each other with respect to the target angular position of the electric motor, due to difference between the rear wheel-body distance and front wheel-body distance adjuster devices 208, 210 with respect to construction, difference between the wheels with respect to load acting thereon, and difference between the suspension springs 68 of the suspension devices 50 (provided for the respective wheels) with respect to stiffness. The following description, however, is provided without such a difference being taken into account, for the sake of simplifying the description.

In the present adjusting control, the target angular position $\theta^*$ of each of the motors 82 is determined based on a roll-reduction component $\theta^*_R$ of the target angular position, a turning-assist component $\theta^*_S$ of the target angular position, a vehicle-height-adjustment component $\theta^*_C$ of the target angular position and a pitch-reduction component $\theta^*_P$ of the target angular position which are target angular-position components directed to the respective roll reduction, turning assist, vehicle-height adjustment and pitch reduction controls. Each of the roll-reduction component $\theta^*_R$ and turning-assist component $\theta^*_S$ of the target angular position is determined substantially in the same manner as in the above-described first embodiment, descriptions of processes of the determinations of these components are omitted. In the following description, there will be described processes of determination of the vehicle-height-adjustment component $\theta^*_C$ and pitch-reduction component $\theta^*_P$ of the target angular position. Further, there will be briefly a process of determination of electric power that is to be supplied to the motor 82 of each of the adjuster devices 208, 210.

(i) Determination of Vehicle-Height Adjustment Component

In the vehicle-height adjustment control, the vehicle-height-adjustment component $\theta^*_C$ of the target angular position of the motor 82 of each of the adjuster devices 208, 210 is determined according to the mode established by operation of the vehicle-height changing switch 226. Specifically described, in the present adjusting system 200, when the low-level mode is selected, the vehicle-height-adjustment component $\theta^*_C$ is set at 0 (zero) whereby the vehicle height is held in the predetermined standard level, i.e., a level that is established in the above-described reference state in which the luggage weight and the passenger weight are supposedly minimized. When the high-level mode is selected, the vehicle-height-adjustment component $\theta^*_C$ is set at a predetermined value $\theta_{CH}$ whereby each of the adjuster devices 208, 210 is caused to generate a force for increasing the vertical distance between a corresponding one of the wheels 12, 14 and the vehicle body. Further, with the high-level mode being selected, the toe angle and camber angle of each of the rear right and left wheels 12R, 12L are changed, by the axial force acting on the shaft 24 of a corresponding one of the rear adjuster devices 208, in the inward direction and the negative direction, respectively. Therefore, the present adjusting system 200 increases the straight-running stability of the vehicle while the high-level mode is being selected.

(ii) Determination of Pitch Reduction Component

The pitch reduction control is executed upon braking (deceleration) of the vehicle, to restrain or reduce a front-end dive of the vehicle body, and also upon acceleration of the vehicle, to restrain or reduce a rear-end squat of the vehicle body. Specifically described, when the front-end dive of the vehicle body is caused, the pair of front adjuster devices 210 are controlled to generate respective forces acting in a direction that increases the vertical distances from the front right and left wheels 14R, 14L to the vehicle body while the pair of rear adjuster devices 208 are controlled to generate respective forces acting in a direction that reduces the vertical distances from the rear right and left wheels 12R, 12L to the vehicle body, for thereby reducing the front-end dive of the vehicle body. In this instance, each of the forces generated by the respective adjuster devices 210, 208 has a magnitude dependent on a magnitude of a pitch moment that causes the front-end dive of the vehicle body. On the other hand, when the rear-end squat of the vehicle body is caused, the pair of front adjuster devices 210 are controlled to generate respective forces acting in a direction that reduces the vertical distances from the front right and left wheels 14R, 14L to the vehicle body while the pair of rear adjuster devices 208 are controlled to generate respective forces acting in a direction that increases the vertical distances from the rear right and left wheels 12R, 12L to the vehicle body, for thereby reducing the rear-end squat of the vehicle body. In this instance, each of the forces generated by the respective adjuster devices 210, 208 has a magnitude dependent on a magnitude of a pitch moment that causes the rear-end squat of the vehicle body. Specifically, the pitch-reduction component $\theta^*_P$ of the target angular position of the target angular position of the motor 82 of each of the adjuster devices 208, 210 is determined on the basis of an actual longitudinal acceleration value Gzg that is detected by a longitudinal acceleration sensor 208 that is provided in the adjusting system 200 and according to expression (7) given below.

$$\theta^*_P = K_c \cdot G_{zg} \quad (7)$$

Where "Kc" represents a gain.

Figure 24:
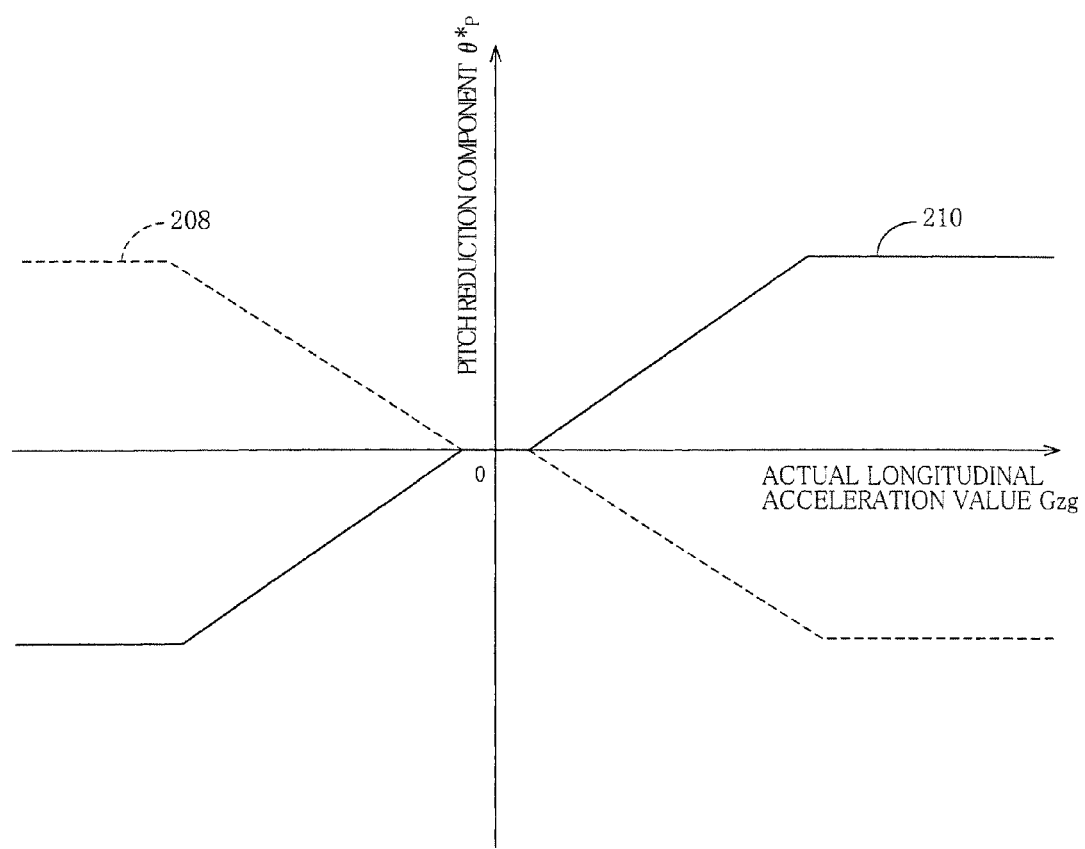
FIG. 24 is a data map representative of a relationship between an actual longitudinal acceleration value Gzg and a pitch-reduction component $\theta^*_P$ of a target angular position of a motor.

FIG. 24 is a data map representative of a relationship between the actual longitudinal acceleration value Gzg and the pitch-reduction component $\theta^*_P$. As shown in FIG. 24, the pitch-reduction component $\theta^*_P$ is substantially held at 0 (zero) while an absolute value of the actual longitudinal acceleration value Gzg is smaller than a threshold value. In FIG. 24, solid line corresponds to each of the front adjuster devices 210 provided in the respective front wheels 14, while broken line corresponds to each of the rear adjuster device 208 provided in the respective rear wheels 12. Generally, the actual longitudinal acceleration value Gzg is positive when the front-end dive of the vehicle body is caused, namely, when the vehicle is decelerated, for example, upon braking of the vehicle. On the other hand, the actual longitudinal acceleration value Gzg is negative when the rear-end squat of the vehicle body is caused, namely, when the vehicle is accelerated, for example, upon starting of the vehicle.

(iii) Determinations of Target Angular Position and Electric Power

In the present adjusting system 200 in which the roll reduction control and the turning assist control are selectively executed, the target angular position $\theta^*$ of the motor 82 of each of the adjuster devices 208, 210 is determined according to expression (8) given below when the roll reduction control is executed, and is determined according to expression (9) given below when the turning assist control is executed. It is noted that the turning assist component $\theta^*_S$ in the expression (9) corresponds to the basic turning-assist component $\theta c_S$ in the above-described adjusting system 10.

$$\theta^* = \theta^*_R + \theta^*_C + \theta^*_P \quad (8)$$

$$\theta^* = \theta^*_S + \theta^*_C + \theta^*_P \quad (9)$$

In control of each of the motors 82, which is made generally based on the target angular position $\theta^*$ of the motor, the target electric current i* as the electric power that is to be supplied to the motor 82 is determined based on the deviation $\Delta\theta$ ($=\theta^*-\theta$) of the actual angular position $\theta$ of the motor 82 from the target angular position $\theta^*$ of the motor 82, as in the above-described adjusting system 10.

[Adjusting Control Program]

Figure 25:
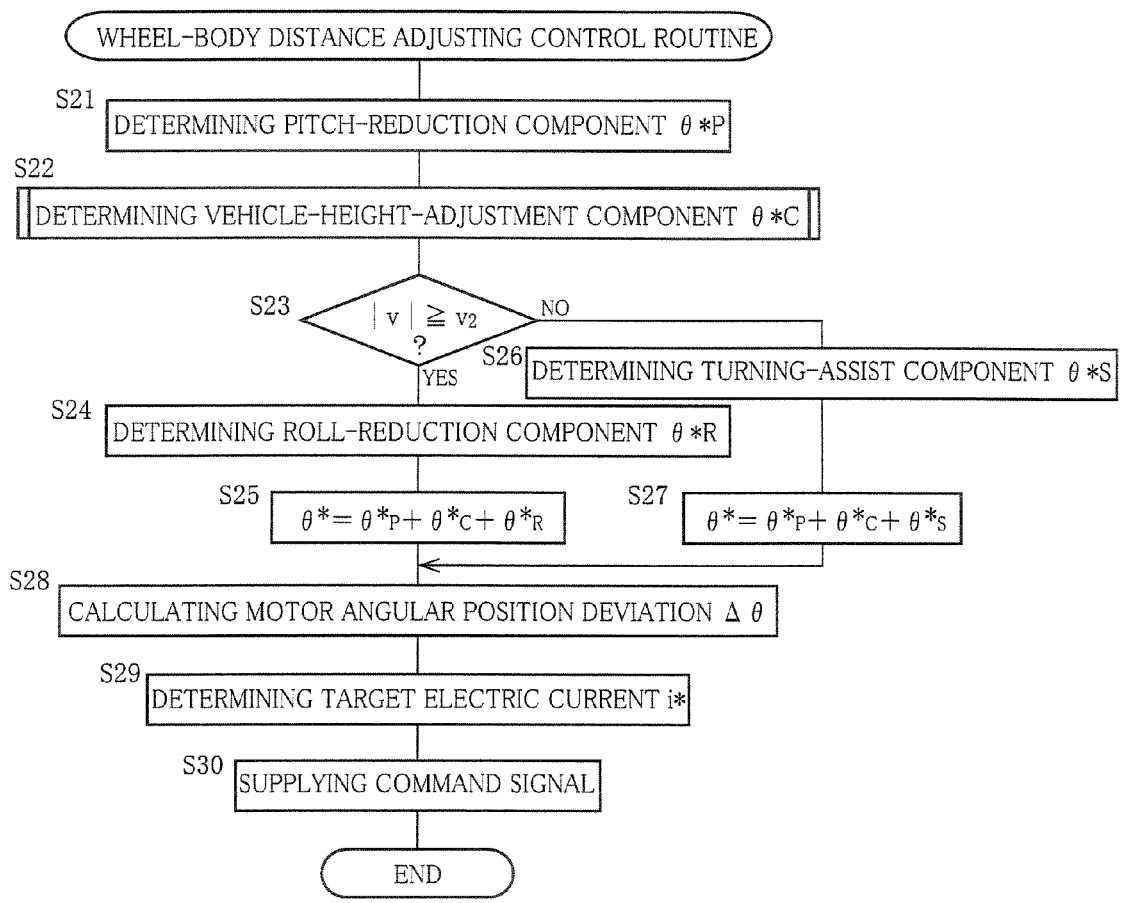
FIG. 25 is a flow chart showing a wheel-body distance adjusting control routine program that is executed in the wheel-body distance adjusting system of FIG. 2.
Figure 26:
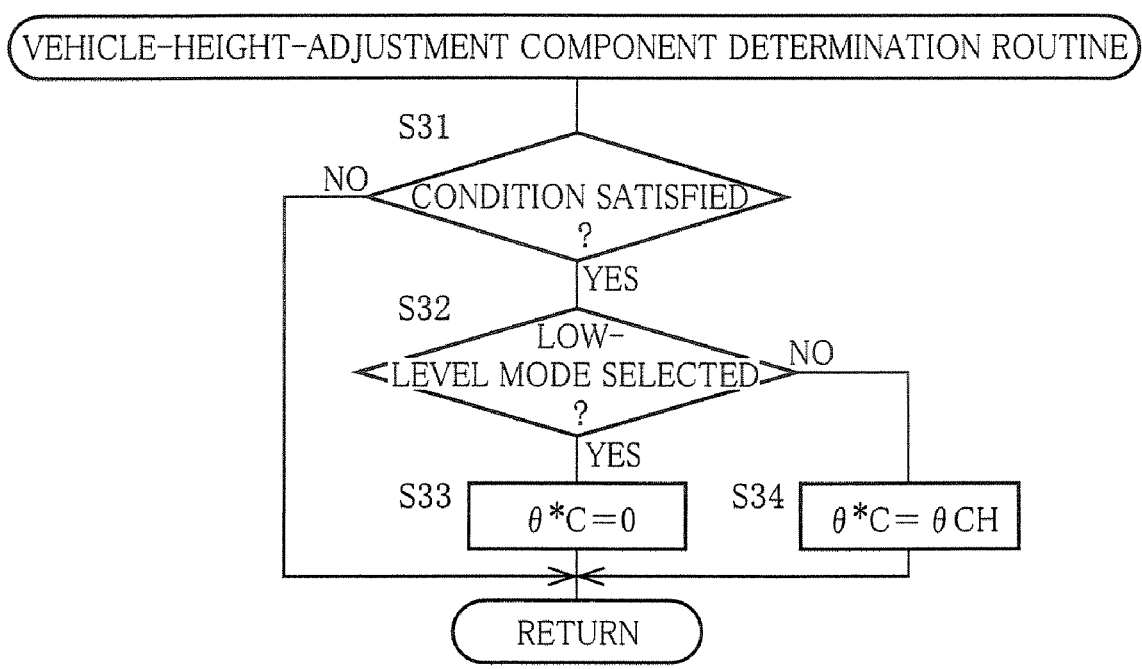
FIG. 26 is a flow chart showing a vehicle-height-adjustment component determination routine program as a subroutine program of the wheel-body distance adjusting control routine program of FIG. 25.

The above-described total adjusting control is executed by the rear-wheel controller 146 and the front-wheel controller 150, in accordance with a wheel-body distance adjusting control routine program that is illustrated in flow charts of FIGS. 25 and 26. The wheel-body distance adjusting control routine program is repeatedly executed by each of the rear-wheel controller 146 and front-wheel controller 150 at a short time interval (e.g., several tens of milliseconds) during ON state of an ignition switch of the vehicle. Hereinafter, the wheel-body distance adjusting control routine program will be described in detail by reference to FIGS. 25 and 26. It is noted that the wheel-body distance adjusting control routine program is executed by the rear-wheel controller 146 for the actuator 28 of each of the rear adjuster devices 208, and is executed by the front-wheel controller 150 for the actuator 216 of each of the front adjuster devices 210. In the following description as to the wheel-body distance adjusting control routine program, there will be described a procedure made for one of the actuators 28, 216 in execution of the routine program, for simplifying the description.

The wheel-body distance adjusting control routine program is initiated with step S21 of determining the pitch-reduction component $\theta^*_P$ of the target angular position $\theta^*$ of the motor of the actuator, based on the longitudinal acceleration, for executing the pitch reduction control. Step S21 is followed by step S22 in which a vehicle-height-adjustment component determination routine program as a sub-routine program of the wheel-body distance adjusting control routine program is executed as shown in FIG. 26. The vehicle-height-adjustment component determination routine program is initiated by step S31 that is implemented to determine whether a predetermined condition (for allowing the wheel-body distance to be changed by the vehicle-height adjustment control) is satisfied or not. In the present embodiment, the predetermined condition is that the wheel-body distance deviation $\Delta L$ in any one of the vertical distances from the respective four wheels 12, 14 to the vehicle body is not changed for a predetermined length of time. If the condition is satisfied, step S32 is implemented to determine the mode that is currently selected by the vehicle-height changing switch 226. If the low-level mode is being selected by the switch 226, step S32 is followed by step S33 in which the vehicle-height-adjustment component $\theta^*_C$ is set at 0 (zero). If the high-level mode is being selected by the switch 226, step S32 is followed by step S34 in which the vehicle-height-adjustment component $\theta^*_C$ is set at the above-described predetermined value $\theta_{CH}$. If it is determined in step S31 that the above-described condition is not satisfied, steps S32, S33 and S34 are skipped so that the vehicle-height-adjustment component $\theta^*_C$ remains as it is at the moment.

After execution of the vehicle-height-adjustment component determination routine program (as the sub-routine program of the wheel-body distance adjusting control routine program), the control flow goes to step S23 that is implemented to determine whether an absolute value of the vehicle running speed is equal to or higher than the threshold value $V_2$, for selecting one of the roll reduction control and the turning assist control that is to be executed. If it is determined in step S23 that the absolute value of the vehicle running speed is equal to or higher than the threshold value $V_2$, step S24 is implemented to determine, based on the lateral acceleration, the roll-reduction component $\theta^*_R$, for executing the roll reduction control. Step S24 is followed by step S25 that is implemented to determine the target angular position $\theta^*$ of the motor 82 which is defined, in this case, as a sum of the pitch-reduction component $\theta^*_P$, the vehicle-height-adjustment component $\theta^*_C$ and the roll-reduction component $\theta^*_R$. If it is determined in step S23 that the absolute value of the vehicle running speed is lower than the threshold value $V_2$, step S26 is implemented to determine, based on the operating angle of the steering wheel and the vehicle running speed, the turning-assist component $\theta^*_S$, for executing the turning assist control. Step S26 is followed by step S27 that is implemented to determine the target angular position $\theta^*$ of the motor 82 which is defined, in this case, as a sum of the pitch-reduction component $\theta^*_P$, the vehicle-height-adjustment component $\theta^*_C$ and the turning-assist component $\theta^*_S$.

After determination of the target angular position $\theta^*$ of the motor 82 in step S25 or S27, the control flow goes to step S28 in which the angular position deviation $\Delta\theta$ of the motor 82 is calculated based on the target angular position $\theta^*$ and the actual angular position $\theta$ of the motor 82. Step S28 is followed by step S29 in which the target electric current i* is determined according to the above expression (6). One cycle of execution of the adjuster-device control routine of FIG. 25 is completed with step S30 in which a command formulated based on the determined target electric current i* is supplied to a corresponding one of the inverters 144, 148.

In the present adjusting system 200 of the second embodiment, the vehicle height is adjusted between the standard level and the high level that are established by the selection of the low-level mode and the selection of the high-level mode, respectively. However, the system 200 can be modified such that the vehicle height can be adjusted also to a low level that is lower than the standard level. In the vehicle-height adjustment control with this modified arrangement, the vehicle height may be automatically changed from the standard level to the low level, for example, when the vehicle running speed is higher than a threshold, so that the running of the vehicle can be stabilized. Further, as in the above-described adjusting system 10 of the first embodiment, the vehicle-height adjustment control may be executed with an additional arrangement in which the rear wheel-body distance is not allowed to be changed when the posture of the vehicle body is being changed by a roll or pitch of the vehicle body, so that the vehicle-height adjustment control is executed to cope with the change in the posture of the vehicle body that is caused by change in the luggage weight and the passenger weight.

[Construction of Controller]

Figure 27:
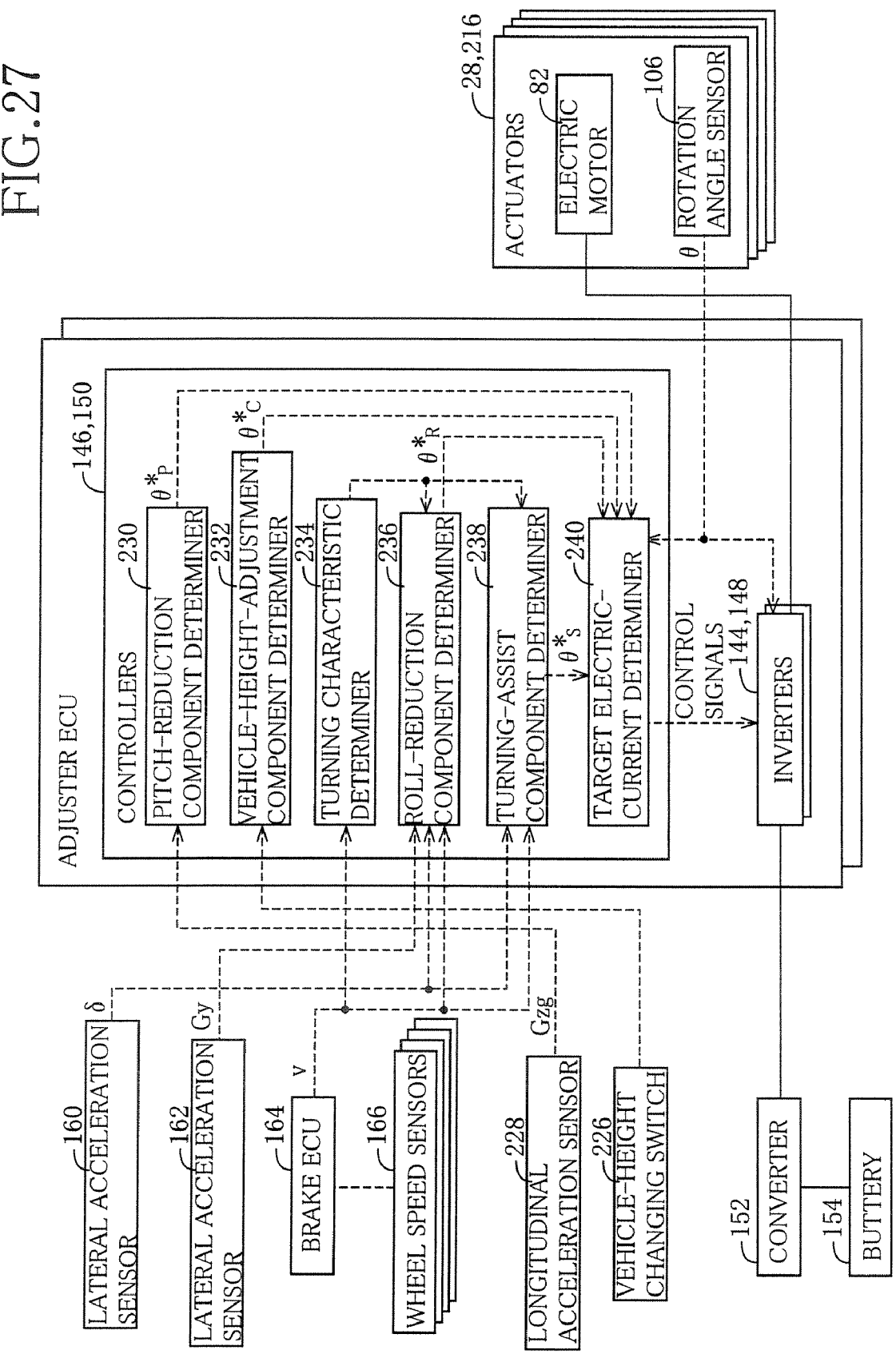
FIG. 27 is a block diagram showing various functional portions of a controller for controlling the wheel-body distance adjusting system of FIG. 21.
Figure 28:
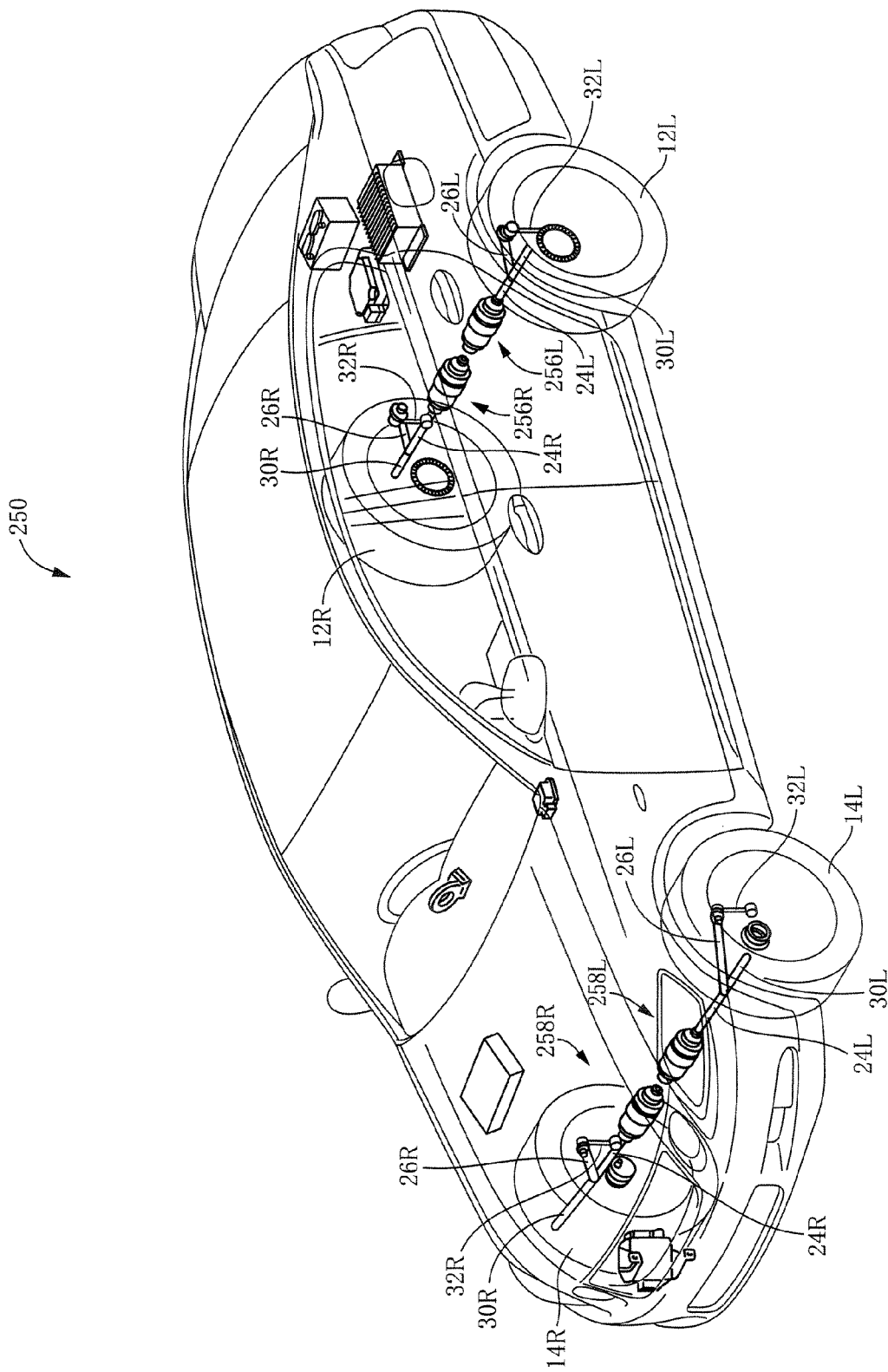
FIG. 28 is a view schematically showing an overall construction of a wheel-body distance adjusting system according to a third embodiment of the invention.

The rear-wheel controller 146 and the front-wheel controller 150 of the present adjusting system 200, which execute the wheel-body distance adjusting control routine program, can be considered to include functional portions as shown in FIG. 27, in view of the procedures in the execution of the control routine programs. Described specifically, each of the rear-wheel and front-wheel controllers 146, 150 includes: a pitch-reduction component determiner 230, as a functional portion assigned to implement step S21, which is operable to determine the pitch-reduction component $\theta^*_P$; a vehicle-height-adjustment component determiner 232, as a functional portion assigned to implement step S22, which is operable to determine the vehicle-height-adjustment component $\theta^*_C$; a turning characteristic determiner 234, as a functional portion assigned to implement step S23, which is operable to determine which one of the roll reduction control and the turning assist control is to be executed so that the understeer tendency as the turning characteristic of the vehicle is increased by execution of the roll reduction control or so that the oversteer tendency as the turning characteristic of the vehicle is increased by execution of the turning assist control; a roll-reduction component determiner 236, as a functional portion assigned to implement step S24, which is operable to determine the roll-reduction component $\theta^*_R$; a turning-assist component determiner 238, as a functional portion assigned to implement step S26, which is operable to determine the turning-assist component $\theta^*_S$; and a target electric-current determiner 240, as a functional portion assigned to implement steps S25 and S27, which is operable to determine the target electric current i*.

(C) Third Embodiment

[Construction of Wheel-Body Distance Adjusting System]

Referring next to FIGS. 28-33, there will be described a wheel-body distance adjusting system 250 that is constructed according to a third embodiment of the invention. The adjusting system 250 is different from the above-described adjusting system 100 of the first embodiment in that not only the alignment of each rear wheel 12 but also the alignment of each front wheel 14 can be changed. In the following description, the same reference signs as used in the first embodiment will be used to identify the functionally corresponding elements, and redundant description of these elements is not provided. It is noted that, in the present adjusting system 250, only the roll reduction control is executed while the vehicle-height adjustment control and turning assist control are not executed.

The present adjusting system 250 includes a pair of rear wheel-body distance adjuster devices 256 (hereinafter referred to as "rear adjuster devices", where appropriate) that are provided for the respective rear wheels 12 and a pair of front wheel-body distance adjuster devices 258 (hereinafter referred to as "front adjuster devices", where appropriate) that are provided for the respective front wheels 14. The rear adjuster devices 256 are identical in construction with the adjuster devices 20 of the above-described adjusting system 10. Meanwhile, the front adjuster devices 258 are identical in construction with the adjuster devices 20 of the above-described adjusting system 10, except for ballscrew mechanisms 260 that are included in the respective front adjuster devices 258. Like each of the adjuster devices 20 of the adjusting system 10, each of the adjuster devices 256, 258 is connected to the second lower arm 58 via the link rod 32 and the tie rod 30. It is noted that, in this third embodiment, the rear adjuster devices 256 correspond to the first adjuster devices while the front adjuster devices 258 correspond to the pair or right-side and left-side units of the second adjuster device.

In the present adjusting system 250 constructed as described above, the pair of rear adjuster devices 256 and the pair of front adjuster devices 258 are controlled for adjusting the rear right, rear left, front right and front left wheel-body distances. In other words, each of the adjuster devices 256, 258 is capable of generating a force for changing a corresponding one of the wheel-body distances, and a magnitude of the generated force is changed by controlling the motor 82 of a corresponding one of the adjuster devices 256, 258, for thereby executing the roll reduction control.

Figure 29A:
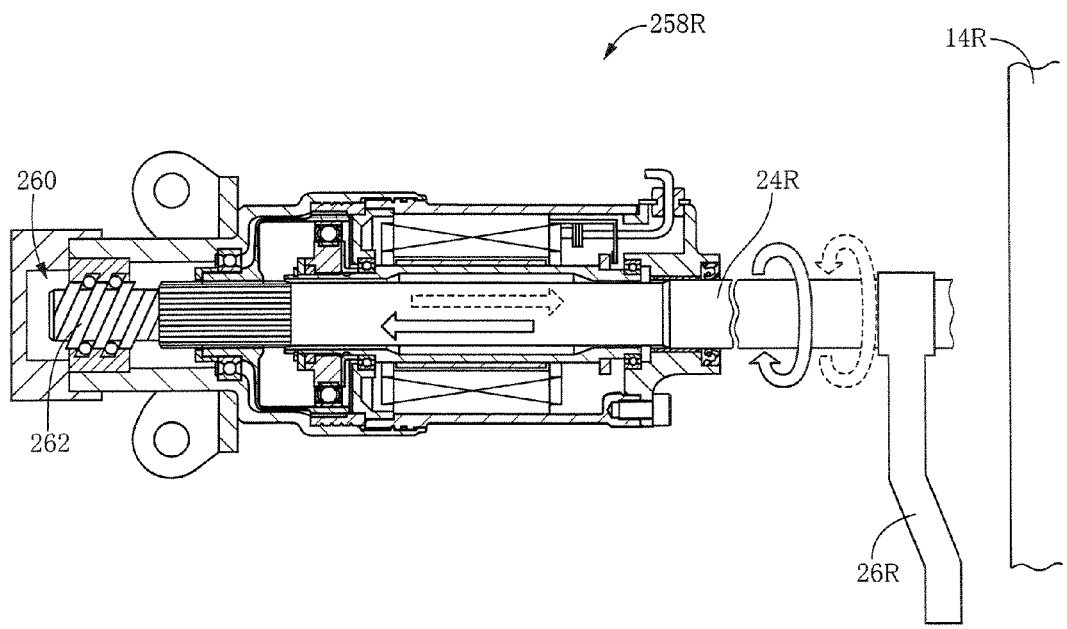
FIG. 29A is a view showing a front-right-side wheel-body distance adjuster device included in the adjusting system of FIG. 28, and indicating a relationship between directions of rotation and axial movement of a shaft as a component of the adjuster device.
Figure 29B:
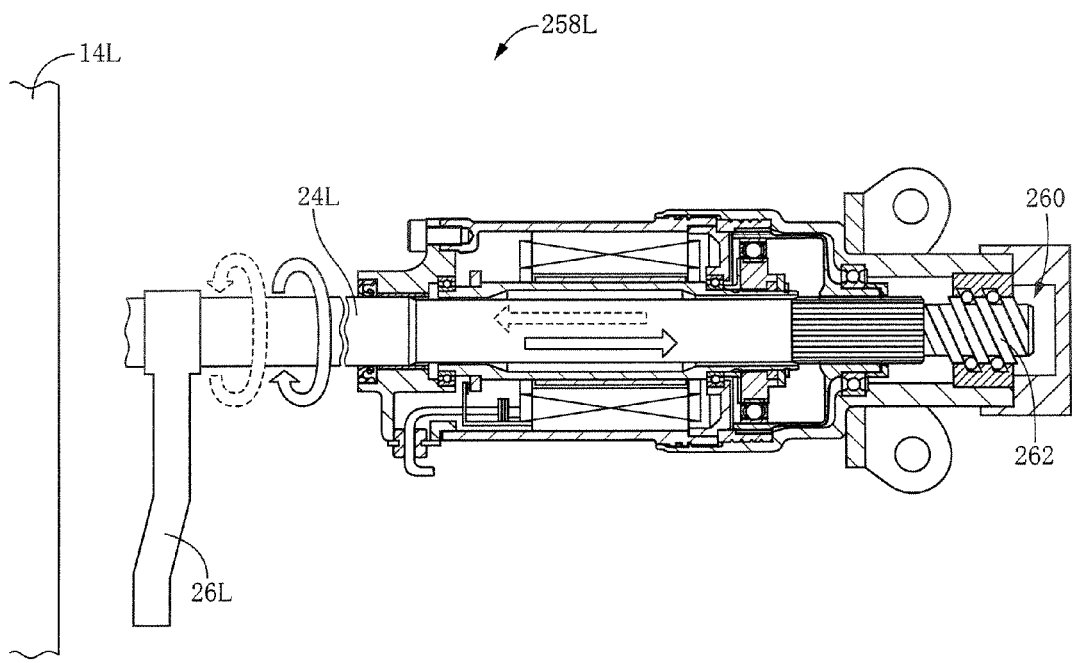
FIG. 29B is a view showing a front-left-side wheel-body distance adjuster device included in the adjusting system of FIG. 28, and indicating a relationship between directions of rotational force and axial force applied to a shaft as a component of the adjuster device.

FIG. 29A shows one of the pair of front distance adjuster devices 258 which is provided for the front right wheel 14R, while the FIG. 29B shows the other of the pair of front distance adjuster devices 258 that is provided for the front left wheel 14L. As is apparent from FIG. 29A, an externally threaded portion 262 of the ballscrew mechanism 260 of the right-side adjuster device 258R is provided by a left-hand screw, unlike the externally threaded portion 96 of the ballscrew mechanism 92 of the right-side adjuster device 20R, which is provided by the right-hand screw (see FIG. 7A). Meanwhile, as is apparent from FIG. 29B, the externally threaded portion 262 of the ballscrew mechanism 260 of the left-side adjuster device 258L is provided by a right-hand screw, unlike the externally threaded portion 96 of the ballscrew mechanism 92 of the left-side adjuster device 20L, which is provided by the left-hand screw (see FIG. 7B). Therefore, when the distal end portion of the arm 26 is displaced downwardly for generating the rotational force acting on the shaft 24 in a direction (as indicated by arrows of solid lines in FIGS. 29A and 29B) that causes increase in the wheel-body distance, the axial force acts on the shaft 24 in a direction away from the wheel 14 (as indicated by arrows of solid lines in FIGS. 29A and 29B). On the other hand, when the distal end portion of the arm 26 is displaced upwardly for generating the rotational force acting on the shaft 24 in a direction (as indicated by arrows of broken lines in FIGS. 29A and 29B) that causes reduces in the wheel-body distance, the axial force acts on the shaft 24 in a direction toward the wheel 14 (as indicated by arrows of broken lines in FIGS. 29A and 29B).

[Wheel Alignment Change in Execution of Roll Reduction Control]

In the present adjusting system 250, when the rear and front adjuster devices 256, 258 are operated in a manner that reduces the roll of the vehicle body, the toe and camber angles of each rear wheel 12 are changed by the axial force applied to the shaft 24 of each of the rear adjuster devices 256 as in each of the adjuster devices 20 of the adjusting system 10. Further, in this instance of the operations of the adjuster devices 256, 258 in that manner, the toe and camber angles of each front wheel 14 are changed by the axial force applied to the shaft 24 of each of the front adjuster devices 258 that are construed as described above.

Figure 31A:
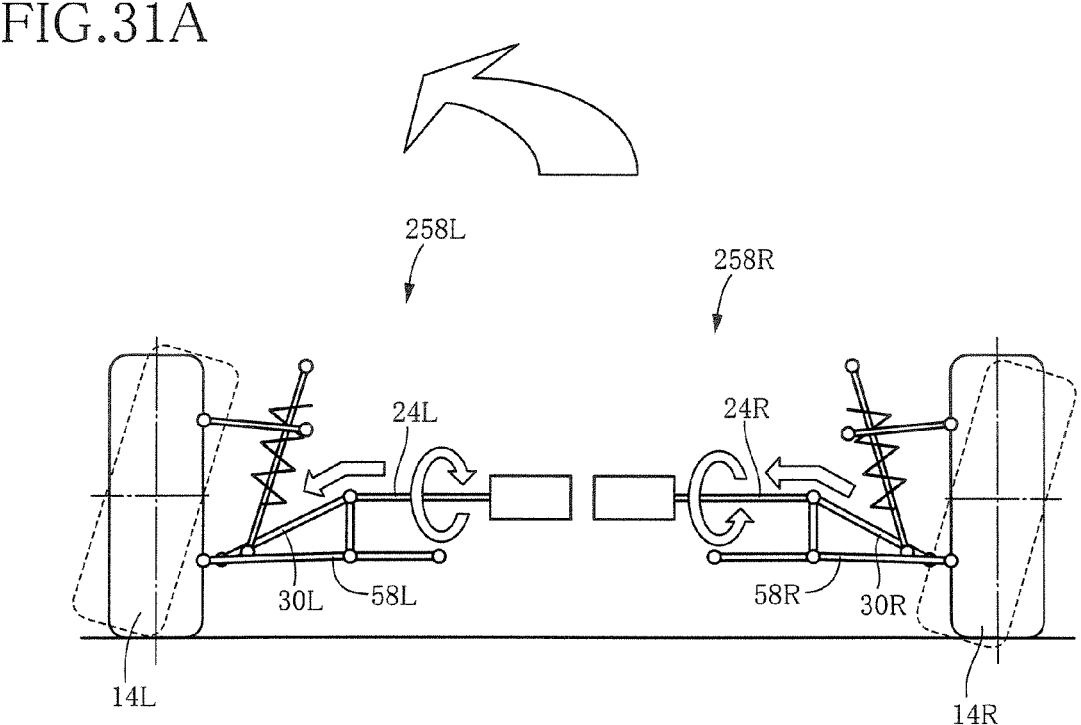
FIGS. 31A and 31B are views showing directions of the rotational and axial forces applied to the shaft of each of the wheel-body distance adjuster device and also a direction of change in a camber angle of each wheel when the roll reduction control is executed during the left turn of the vehicle.
Figure 31B:
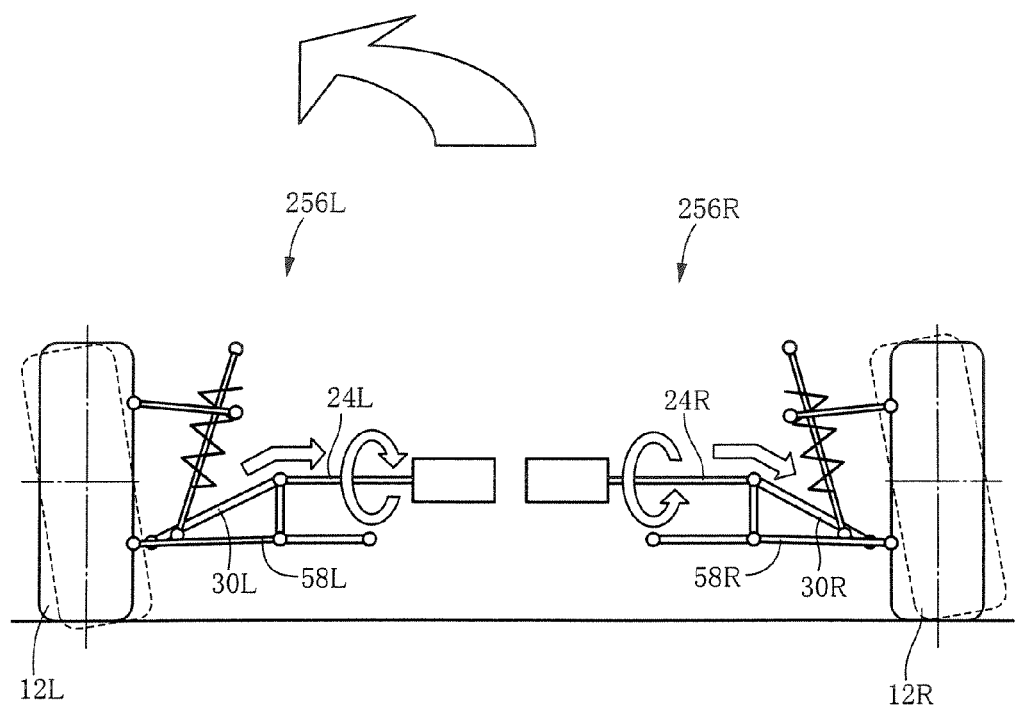

FIG. 30 shows directions of the rotational and axial forces applied to each of the shafts 24 of the respective adjuster devices 256, 258 and also a direction of change in the toe angle of each of the wheels 12, 14 when the roll reduction control is executed during left turn of the vehicle. FIG. 31A shows directions of the rotational and axial forces applied to each of the shafts 24 of the respective front adjuster devices 258 and also a direction of change in the camber angle of each of the front wheels 14 when the roll reduction control is executed during the left turn of the vehicle. FIG. 31B shows directions of the rotational and axial forces applied to each of the shafts 24 of the respective rear adjuster devices 256 and also a direction of change in the camber angle of each of the rear wheels 12 when the roll reduction control is executed during the left turn of the vehicle. As is apparent from FIGS. 30, 31A and 31B, during the left turn of the vehicle, the toe angle and the camber angle of each of the front left wheel 14L and the rear right wheel 12R are changed in the inward direction and in the negative direction, respectively, with application of the axial force to the corresponding shaft 24 in a direction indicated by arrow, while the toe angle and the camber angle of each of the front right wheel 14R and the rear left wheel 12L are changed in the outward direction and in the positive direction, respectively, with application of the axial force to the corresponding shaft 24 in a direction indicated by arrow. Thus, the alignments of all the wheels 12, 14 are changed in such manners that increase the understeer tendency of the vehicle. During right turn of the vehicle, the toe and camber angles of each of the wheels 12, 14 are changed in respective directions that are opposite to those during the left turn of the vehicle, so that the alignments of all the wheels 12, 14 are changed in the manners that increase the understeer tendency during the right turn of the vehicle, too. That is, in the vehicle equipped with the adjusting system 250, the understeer tendency is increased by operations of both of the front and rear adjuster devices 258, 256 during execution of the roll reduction control.

[Roll Reduction Control Program]

Figure 32:
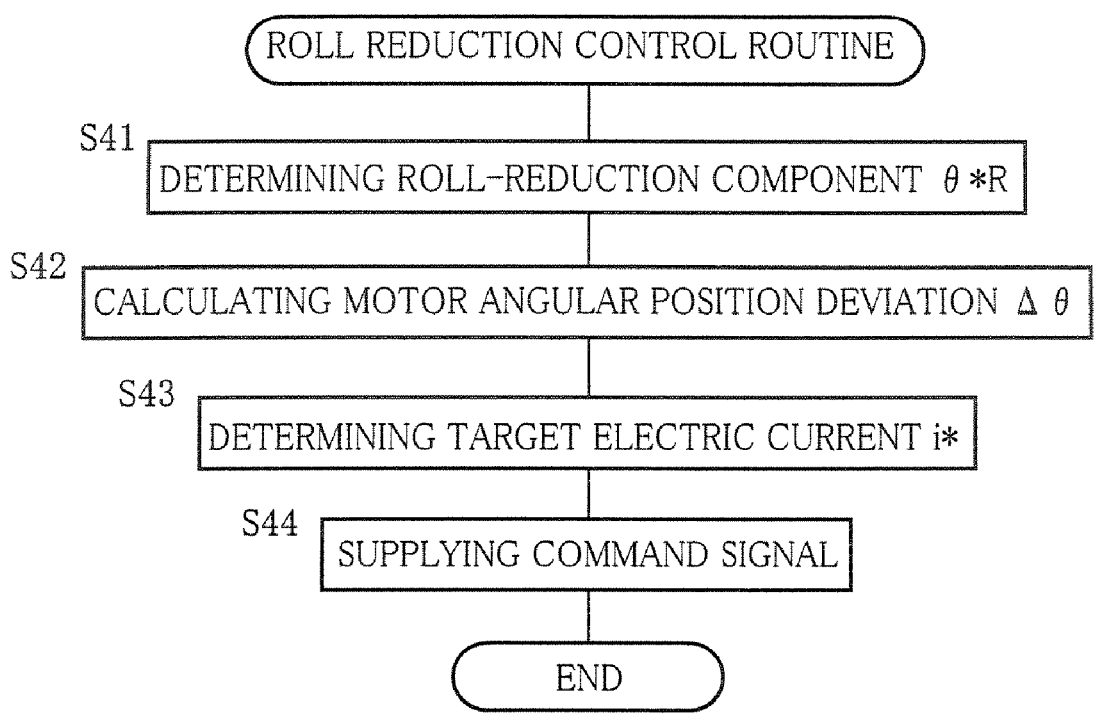
FIG. 32 is a flow chart showing a roll-reduction control routine program that is executed in the wheel-body distance adjusting system of FIG. 28.
Figure 33:
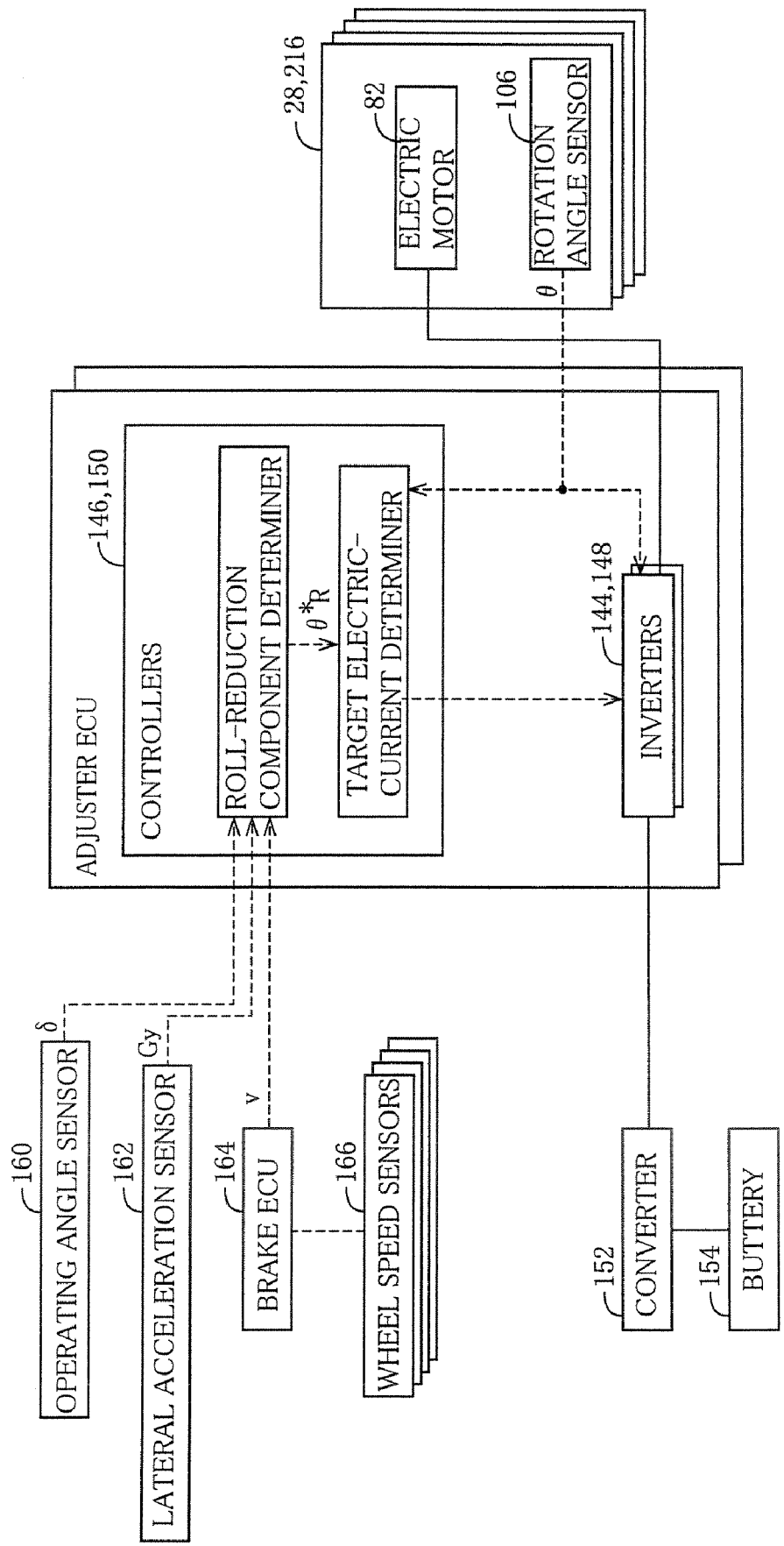
FIG. 33 is a block diagram showing various functional portions of a controller for controlling the wheel-body distance adjusting system of FIG. 28.

The above-described roll reduction control is executed by the rear-wheel controller 146 and the front-wheel controller 150, in accordance with a roll reduction control routine program that is illustrated in flow chart of FIG. 32. The roll reduction control routine program is repeatedly executed by the rear-wheel controller 146 at a short time interval (e.g., several tens of milliseconds) during ON state of an ignition switch of the vehicle. Since the process of the roll reduction control includes steps implemented substantially in the same manner as those of the process of the roll reduction control executed in the above-described adjusting system 10, description will be briefly made as to the process of the roll reduction control. It is noted that the roll reduction control routine program is executed by the rear-wheel controller 146 for the actuator 28 of each of the rear adjuster devices 256, and is executed by the front-wheel controller 150 for the actuator 28 of each of the front adjuster devices 258. In the following description as to the roll reduction control routine program, there will be described a procedure made for one of the actuators 28 in execution of the routine program, for simplifying the description.

The roll reduction control routine program of FIG. 32 is initiated with step S41 of determining the roll reduction component $\theta^*_R$ of the target angular position $\theta^*$ of the motor 82 of the actuator 28, based on the lateral acceleration, for executing the roll reduction control. In the present adjusting system 250, since the roll-reduction component $\theta^*_R$ is the target angular position $\theta^*$ as such, the angular position deviation $\Delta\theta_A$ of the motor 82 is calculated based on the roll reduction component $\theta^*_R$ and the actual angular position $\theta$ of the motor 82 in step S42. Then, in step S43, the target electric current i* is determined according to the above expression (6). One cycle of execution of the adjuster-device control routine of FIG. 32 is completed with step S44 in which a command formulated based on the determined target electric current $i^*_A$ is supplied to a corresponding one of the inverters 144, 148.

(D) Modification of Wheel-Body Distance Adjusting System

Figure 34:
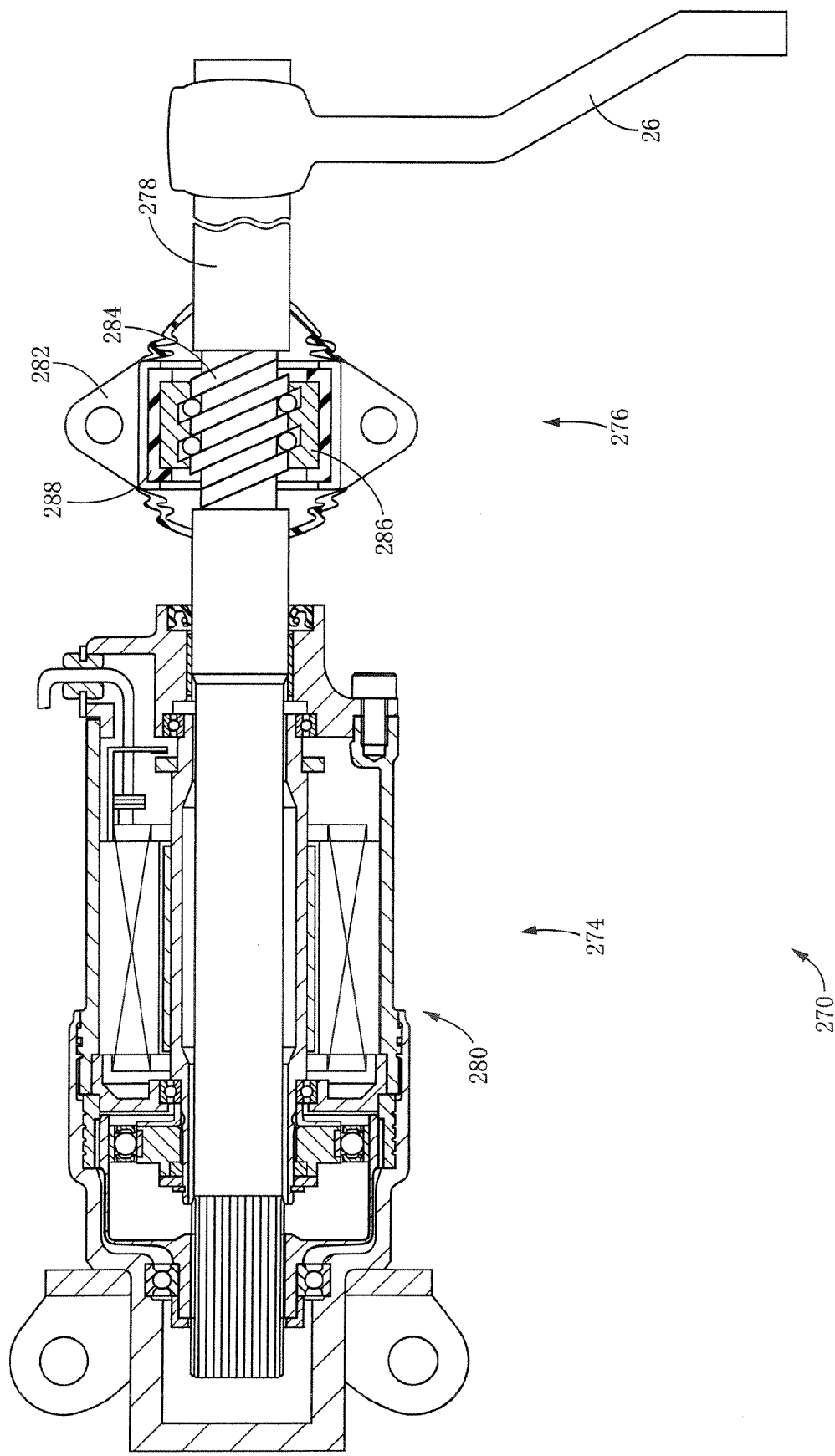
FIG. 34 is a view, partially in cross section, showing a wheel-body distance adjuster device that can be employed as a modification in each of the wheel-body distance adjusting systems of the first through third embodiments of the invention.

FIG. 34 shows a wheel-body distance adjuster device 270 that can be employed in place of each of the above-described adjuster devices 20, 208, 256, 258 of the adjusting systems 10, 200, 250 of the first through third embodiments of the invention. The adjuster device 270 is different from each of the above-described adjuster devices 20, 208, 256, 258 with respect to the ballscrew mechanism as the motion converter. Specifically described, a ballscrew mechanism 276 of the adjuster device 270 is disposed outside an actuator 274 of the adjuster device 270, while the ballscrew mechanism of each of the adjuster devices 20, 208, 256, 258 is disposed inside the actuator 28. The adjuster device 270 is substantially identical in construction with the above-described adjuster device 20 except for the ballscrew mechanism 276. In the following description of the adjuster device 270 that will be focused mainly on the ballscrew mechanism 276, the same reference numerals as used in the description of the adjuster device 20 are used to identify the same or similar elements, and redundant description of these elements will not be provided.

The adjuster device 270 has a shaft 278, which is held by a housing 280 as an outer shell member of the actuator 274 so as to be rotatable and axially movable relative to the housing 280, as the shaft 24 of the adjuster device 20. Further, the shaft 278 includes a projecting portion projecting out from an end portion of the housing 280, and is held at the projecting portion by a retainer 282 that is fixed to the vehicle body. That is, the shaft 278 is held by the vehicle body through the housing 280 and the retainer 282. The projecting portion of the shaft 278 is held by the retainer 282 through the ballscrew mechanism 276 that is established by an external thread and an internal thread that are held in engagement with each other via bearing balls interposed therebetween. The external thread is provided by an externally threaded portion 284 (first threaded portion) that is provided by a part of the above-described projecting portion. The internal thread is provided by a nut 286 (second threaded portion) fixed to the retainer 282 via a dumper bushing 288 that is made of a rubber material. The thus constructed ballscrew mechanism 276, which is disposed outside the actuator 274, serves as the motion converter for converting between the rotation of the shaft 278 and the axial movement of the shaft 278.

The adjuster device 270 having the above-described construction is capable of changing the wheel-body distance and also changing the wheel alignment. It should be noted that the actuator 274 of the adjuster device 270 is constructed more simply than the actuator 28 of each of the adjuster devices 20, 208, 256, 258, owing to the above-described arrangement in which the ballscrew mechanism 276 is disposed outside the actuator 274.

What is claimed is:

1. An adjuster device for a vehicle that has a suspension device including (i) an axle carrier rotatably holding a wheel of the vehicle and (ii) at least one suspension arm interconnecting the axle carrier and a body of the vehicle, said adjuster device comprising:
(a) a shaft held by the body of the vehicle, so as to be rotatable about an axis thereof relative to the body of the vehicle and movable in an axial direction thereof relative to the body of the vehicle;
(b) an arm connected at a proximal end portion thereof to said shaft, unrotatably about said axis of said shaft relative to said shaft, and extending from said shaft in a direction intersecting said axial direction of said shaft;
(c) an actuator causing one of rotation of said shaft about said axis and axial movement of said shaft in said axial direction; and
(d) a motion converter converting said one of the rotation of said shaft and the axial movement of said shaft, into the other of the rotation of said shaft and the axial movement of said shaft,
wherein said arm is connected at a distal end portion thereof to one of the at least one suspension arm, so as to enable the rotation of said shaft to cause change in a vertical distance between the wheel and the body of the vehicle,
and wherein said shaft is connected to one of the at least one suspension arm or to the axle carrier, so as to enable the axial movement of said shaft to cause change in an alignment of the wheel.

2. The adjuster device according to claim 1, wherein said actuator causes the rotation of said shaft, and includes (d-1) a housing held by the body of the vehicle, (d-2) a motor held by said housing, and (d-3) a speed reducer held by said housing and reducing a speed of rotation of said motor while transmitting the rotation of said motor to said shaft.

3. The adjuster device according to claim 1,
wherein said motion converter includes an external thread and an internal thread that are held in engagement with each other,
and wherein said external thread is provided by one of a first threaded portion that is included in said shaft and a second threaded portion that is unmovable and unrotatable relative to the body of the vehicle, while said internal thread is provided by the other of said first threaded portion and said second threaded portion.

4. The adjuster device according to claim 1,
wherein said motion converter converts said one of the rotation of said shaft in a roll reducing direction and the axial movement of said shaft in a understeer-tendency increasing direction, into the other of the rotation of said shaft in the roll reducing direction and the axial movement of said shaft in the understeer-tendency increasing direction,
wherein the vertical distance between the wheel and the body of the vehicle is changed such that a roll of the body of the vehicle is reduced, by the rotation of said shaft in the roll reducing direction,
and wherein the alignment of the wheel is changed such that an understeer tendency of the vehicle is increased, by the axial movement of said shaft in the understeer-tendency increasing direction.

5. The adjuster device according to claim 1, provided for a front wheel as the wheel of the vehicle, so as to change the vertical distance between the front wheel and the body of the vehicle and the alignment of the front wheel,
wherein said motion converter converts said one of the rotation of said shaft in a vertical-distance increasing direction and the axial movement of said shaft in a first direction, into the other of the rotation of said shaft in the vertical-distance increasing direction and the axial movement of said shaft in the first direction, and to convert said one of the rotation of said shaft in a vertical-distance reducing direction and the axial movement of said shaft in a second direction, into the other of the rotation of said shaft in the vertical-distance reducing direction and the axial movement of said shaft in the second direction,
wherein the vertical distance is increased by the rotation of said shaft in the vertical-distance increasing direction, and is reduced by the rotation of said shaft in the vertical-distance reducing direction,
wherein at least one of a toe angle and a camber angle of the front wheel as the alignment of the wheel is changed by the axial movement of said shaft in the first direction, such that front and rear portions of the front wheel are displaced outwardly and inwardly in a lateral direction of the vehicle, respectively, where the toe angle is changed, and such that upper and lower portions of the front wheel are displaced outwardly and inwardly in the lateral direction, respectively, where the camber angle is changed,
and wherein at least one of the toe angle and the camber angle of the front wheel as the alignment of the wheel is changed by the axial movement of said shaft in the second direction, such that the front and rear portions of the front wheel are displaced inwardly and outwardly in the lateral direction of the vehicle, respectively, where the toe angle is changed, and such that the upper and lower portions of the front wheel are displaced inwardly and outwardly in the lateral direction, respectively, where the camber angle is changed.

6. The adjuster device according to claim 1, provided for a rear wheel as the wheel of the vehicle, so as to change the vertical distance between the rear wheel and the body of the vehicle and the alignment of the rear wheel,
wherein said motion converter converts said one of the rotation of said shaft in a vertical-distance increasing direction and the axial movement of said shaft in a first direction, into the other of the rotation of said shaft in the vertical-distance increasing direction and the axial movement of said shaft in the first direction, and to convert said one of the rotation of said shaft in a vertical-distance reducing direction and the axial movement of said shaft in a second direction, into the other of the rotation of said shaft in the vertical-distance reducing direction and the axial movement of said shaft in the second direction,
wherein the vertical distance is increased by the rotation of said shaft in the vertical-distance increasing direction, and is reduced by the rotation of said shaft in the vertical-distance reducing direction,
wherein at least one of a toe angle and a camber angle of the front wheel as the alignment of the wheel is changed by the axial movement of said shaft in the first direction, such that front and rear portions of the front wheel are displaced inwardly and outwardly in a lateral direction of the vehicle, respectively, where the toe angle is changed, and such that upper and lower portions of the front wheel are displaced inwardly and outwardly in the lateral direction, respectively, where the camber angle is changed, and wherein at least one of the toe angle and the camber angle of the front wheel as the alignment of the wheel is changed by the axial movement of said shaft in the second direction, such that the front and rear portions of the front wheel are displaced outwardly and inwardly in the lateral direction of the vehicle, respectively, where the toe angle is changed, and such that the upper and lower portions of the front wheel are displaced outwardly and inwardly in the lateral direction, respectively, where the camber angle is changed.

7. An adjusting system comprising:

a pair of right-side and left-side adjuster devices each provided by the adjuster device defined in claim 1; and a controller controlling said pair of right-side and left-side adjuster devices, wherein said right-side adjuster device is provided for a right wheel as the wheel of the vehicle, so as to change the vertical distance between the right wheel and the body of the vehicle and the alignment of the right wheel, wherein said left-side adjuster device is provided for a left wheel as the wheel of the vehicle, so as to change the vertical distance between the left wheel and the body of the vehicle and the alignment of the left wheel, and wherein said controller controls said actuator of each of said pair of right-side and left-side adjuster devices, for thereby changing the vertical distance between the right wheel and the body, the alignment of the right wheel, the vertical distance between the left wheel and the body and the alignment of the left wheel.

8. The adjusting system according to claim 7, being capable of executing a roll reduction control for reducing a roll of the body of the vehicle, during turning of the vehicle during which one of the right and left wheels as an inside wheel is positioned between a center of the turning of the vehicle and the other of the right and left wheels as an outside wheel, wherein said pair of right-side and left-side adjuster devices are controlled by said controller, during execution of the roll reduction control, such that the vertical distance between the inside wheel and the body of the vehicle is restrained from being increased and such that the vertical distance between the outside wheel and the body of the vehicle is restrained from being reduced.

9. The adjusting system according to claim 8, wherein said motion converter of each of said pair of right-side and left-side adjuster devices converts, during execution of the roll reduction control, said one of the rotation of said shaft of said each of said adjuster devices in a roll reducing direction and the axial movement of said shaft of said each of said adjuster devices in a understeer-tendency increasing direction, into the other of the rotation in the roll reducing direction and the axial movement in the understeer-tendency increasing direction, wherein the vertical distance between the right wheel and the body of the vehicle and the vertical distance between the left wheel and the body of the vehicle are changed such that the roll of the body of the vehicle is reduced, by the rotation of said shaft of each of said adjuster devices in the roll reducing direction, and wherein the alignment of the right wheel and the alignment of the left wheel are changed such that an understeer tendency of the vehicle is increased, by the axial movement of said shaft of each of said adjuster devices in the understeer-tendency increasing direction.

10. The adjusting system according to claim 8, being capable of executing a vehicle-height adjustment control for adjusting a height of the vehicle, wherein said controller controls, during execution of the vehicle-height adjustment control, said pair of right-side and left-side adjuster devices such that the vertical distance between the right wheel and the body of the vehicle and the vertical distance between the left wheel and the body of the vehicle are both selectively increased and reduced.

11. The adjusting system according to claim 8, further comprising a second adjuster device in addition to first adjuster devices as said right-side and left-side adjuster devices, wherein said first adjuster devices are provided for respective rear right and left wheels of the vehicle, so as to change the vertical distance between the rear right wheel and the body of the vehicle, the vertical distance between the rear left wheel and the body of the vehicle and the alignments of the rear right and left wheels, wherein said second adjuster device is provided for front right and left wheels of the vehicle, so as to change a front-right vertical distance as the vertical distance between the front right wheel and the body of the vehicle and a front-left vertical distance as the vertical distance between the front left wheel and the body of the vehicle, such that one of the front-right vertical distance and the front-left vertical distance is increased while the other of the front-right vertical distance and the front-left vertical distance is reduced, and wherein said controller controls, during execution of the roll reduction control, said second adjuster device such that the vertical distance between one of the front right and left wheels as the inside wheel and the body of the vehicle is restrained from being increased and such that the vertical distance between the other of the front right and left wheels as the outside wheel and the body of the vehicle is restrained from being reduced.

12. The adjusting system according to claim 11, wherein said motion converter of each of said first adjuster devices converts, during execution of the roll reduction control, said one of the rotation of said shaft of said each of said first adjuster devices in a roll reducing direction and the axial movement of said shaft of said each of said first adjuster devices in a understeer-tendency increasing direction, into the other of the rotation in the roll reducing direction and the axial movement in the understeer-tendency increasing direction, wherein the vertical distance between the rear right wheel and the body of the vehicle and the vertical distance between the rear left wheel and the body of the vehicle are changed such that the roll of the body of the vehicle is reduced, by the rotation of said shaft of each of said first adjuster devices in the roll reducing direction, and wherein the alignment of the rear right wheel and the alignment of the rear left wheel are changed such that an understeer tendency of the vehicle is increased, by the axial movement of said shaft of each of said first adjuster devices in the understeer-tendency increasing direction, said adjusting system being capable of executing a turning assist control for assisting turning of the vehicle, during the turning of the vehicle during which one of the front right and left wheels as a front inside wheel is positioned between the center of the turning of the vehicle and the other of the front right and left wheels as a front outside wheel, wherein said first adjuster devices are controlled by said controller during execution of the turning assist control, to axially move said shaft of each of said first adjuster devices in an oversteer-tendency increasing direction that is opposite to the understeer-tendency increasing direction, whereby the alignment of the rear right wheel and the alignment of the rear left wheel are changed such that an oversteer tendency of the vehicle is increased, and wherein said second adjuster device is controlled by said controller during the execution of the turning assist control, to reduce the vertical distance between the front inside wheel and the body of the vehicle and to increase the vertical distance between the front outside wheel and the body of the vehicle, for reducing the roll of the body of the vehicle that is increased by said first adjuster devices during the execution of the turning assist control.

13. The adjusting system according to claim 12, wherein said controller causes the turning assist control to be executed based on at least one of a running speed of the vehicle and an operating amount of a steering operating member.

14. The adjusting system according to claim 12, wherein said controller allows the turning assist control to be executed only when the running speed of the vehicle is lower than a lower threshold value.

15. The adjusting system according to claim 12, wherein said controller controls said first adjuster devices such that each of the alignment of the rear right wheel and the alignment of the rear left wheel is changed by a degree that is dependent on at least one of a running speed of the vehicle and an operating amount of a steering operating member, during the execution of the turning assist control.

16. The adjusting system according to claim 15, wherein said controller controls said first adjuster devices such that each of the alignment of the rear right wheel and the alignment of the rear left wheel is changed by a degree that corresponds to an amount of increase in the operating amount of the steering operating member.

17. The adjusting system according to claim 11, wherein said second adjuster device includes: a stabilizer bar that is connected at respective opposite end portions to one of the at least one suspension arm of a front right suspension device as the suspension device that is provided for the front right wheel and to one of the at least one suspension arm of a front left suspension device as the suspension device that is provided for the front left wheel; and a stabilizer actuator changes stiffness of said stabilizer bar against roll of the body of the vehicle.

18. The adjusting system according to claim 17,
wherein said stabilizer bar is provided by a pair of stabilizer bar members, wherein said stabilizer bar members include: respective torsion bar portions each of which extends in a lateral direction of the vehicle; and respective arm portions each of which extends in a direction intersecting a corresponding one of the torsion bar portions, from the corresponding torsion bar portion, to be connected to said one of the at least one suspension arm of a corresponding one of said front right and left suspension devices, and wherein said stabilizer actuator rotates said torsion bar portions of said respective stabilizer bar members relative to each other, so as to change the stiffness of said stabilizer bar against the roll of the body of the vehicle.

19. The adjusting system according to claim 18,
wherein said stabilizer actuator of said second adjuster device includes: a housing; a motor held by said housing; and a speed reducer held by said housing and reducing a speed of rotation of said motor while transmitting the rotation of said motor to one of said torsion bar portions of said pair of stabilizer bar members via an output portion of said speed reducer, wherein the other of said torsion bar portions is connected to said housing, unrotatably relative to said housing, and wherein said one of said torsion bar portions is connected to said output portion of said speed reducer, unrotatably relative to said output portion.

20. The adjusting system according to claim 11,
wherein said second adjuster device includes a pair of right-side and left-side units that are provided for the front right and left wheels, respectively, so as to change the front-right vertical distance and the front-left vertical distance, respectively, wherein said right-side and left-side units include: (α) respective shafts each of which is held by the body of the vehicle, so as to be rotatable about an axis thereof relative to the body of the vehicle; (β) respective arms each of which is connected at a proximal end portion thereof to a corresponding one of said shafts, unrotatably about said axis of the corresponding one of said shafts relative to the corresponding shaft, and extending from said corresponding shaft in a direction intersecting said axial direction of said corresponding shaft; and (γ) respective actuators each of which causes rotation of said corresponding shaft about said axis, and wherein said actuators are controlled by said controller such that said one of the front-right vertical distance and the front-left vertical distance is increased while said other of the front-right vertical distance and the front-left vertical distance is reduced.

21. The adjusting system according to claim 20, wherein each of said actuators includes (γ-1) a housing held by the body of the vehicle, (γ-2) a motor held by said housing, and (γ-3) a speed reducer held by said housing and reducing a speed of rotation of said motor while transmitting the rotation of said motor to a corresponding one of said shafts.

* * * * *